United States Patent
Freda et al.

(10) Patent No.: US 12,501,433 B2
(45) Date of Patent: Dec. 16, 2025

(54) L2 PROCEDURES FOR UNICAST AND/OR MULTICAST LINK ESTABLISHMENT AND MAINTENANCE

(71) Applicant: INTERDIGITAL PATENT HOLDINGS, INC., Wilmington, DE (US)

(72) Inventors: Martino M. Freda, Laval (CA); Tao Deng, Roslyn, NY (US); Tuong Duc Hoang, Montreal (CA); Aata El Hamss, Laval (CA); Michelle Perras, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 413 days.

(21) Appl. No.: 17/279,272

(22) PCT Filed: Sep. 25, 2019

(86) PCT No.: PCT/US2019/052972
§ 371 (c)(1),
(2) Date: Mar. 24, 2021

(87) PCT Pub. No.: WO2020/068991
PCT Pub. Date: Apr. 2, 2020

(65) Prior Publication Data
US 2021/0410129 A1  Dec. 30, 2021

Related U.S. Application Data

(60) Provisional application No. 62/886,102, filed on Aug. 13, 2019, provisional application No. 62/783,952, (Continued)

(51) Int. Cl.
*H04W 72/20* (2023.01)
*H04W 72/542* (2023.01)

(52) U.S. Cl.
CPC ......... *H04W 72/20* (2023.01); *H04W 72/542* (2023.01)

(58) Field of Classification Search
CPC ............................ H04W 72/20; H04W 72/542
See application file for complete search history.

(56) References Cited

U.S. PATENT DOCUMENTS

2013/0287012 A1* 10/2013 Pragada ................ H04W 76/22
370/338
2014/0286225 A1  9/2014  Yu et al.
(Continued)

FOREIGN PATENT DOCUMENTS

CN  106470384 A  3/2017
WO  2016022849 A1  2/2016
(Continued)

OTHER PUBLICATIONS

Ericsson, "Traffic Management in V2X," 3GPP TSG-RAN WG2 #93bis, R2-162820, Dubrovnik, Croatia (Apr. 11-15, 2016).
(Continued)

*Primary Examiner* — Michael Thier
*Assistant Examiner* — Nevena Zecevic Sandhu
(74) *Attorney, Agent, or Firm* — Volpe Koenig

(57) ABSTRACT

Systems, methods, and devices for unicast and/or multicast link establishment and maintenance. A wireless transmit receive unit (WTRU) may send a link establishment request broadcast message, wherein in the link may be for multicast, unicast, or groupcast. The WTRU may receive a link establishment response broadcast message and a connectivity report. The WTRU may then send a link establishment confirmation broadcast message once a multicast or unicast link has been established, at which point the WTRU may send and receive a multicast message. The link establishment request message may be sent based on one or more
(Continued)

triggers: receiving a QoS flow, needing a new sidelink radio bearer, determining that a new QoS flow or radio bearer requires network controlled admission control, and/or receive a unicast and/or multicast establishment request. The WTRU may transmit a unicast and/or multicast usability signal (UMUS). The WTRU may preempt the established multicast or unicast link.

15 Claims, 12 Drawing Sheets

Related U.S. Application Data filed on Dec. 21, 2018, provisional application No. 62/752,865, filed on Oct. 30, 2018, provisional application No. 62/736,251, filed on Sep. 25, 2018.

(56) References Cited

U.S. PATENT DOCUMENTS

| | | | |
|---|---|---|---|
| 2015/0052580 A1* | 2/2015 | Delsol | H04L 63/20 455/509 |
| 2015/0109910 A1 | 4/2015 | Hurd et al. | |
| 2017/0188404 A1 | 6/2017 | Fodor et al. | |
| 2019/0394830 A1* | 12/2019 | Mildh | H04W 76/38 |
| 2020/0178282 A1* | 6/2020 | Yi | H04W 28/02 |
| 2020/0404625 A1* | 12/2020 | Roth-Mandutz | H04W 4/40 |
| 2021/0168814 A1* | 6/2021 | Chen | H04W 72/02 |
| 2021/0185513 A1* | 6/2021 | Liu | H04W 8/24 |
| 2021/0329487 A1* | 10/2021 | Wang | H04W 28/24 |

FOREIGN PATENT DOCUMENTS

| | | |
|---|---|---|
| WO | 2017/158515 | 9/2017 |
| WO | 2020/033226 | 2/2020 |

OTHER PUBLICATIONS

Huawei et al., "Discussion on mobility in idle and inactive mode for NR-U," 3GPP TSG-RAN WG2 Meeting 105bis, R2-1904420, Xi'an, China (Apr. 8-12, 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "Further Details on Link Establishment Procedure," 3GPP RAN WG2 Meeting #105, R2-1901580, Athens, Greece (Feb. 25-Mar. 1, 2019).
Interdigital Inc., "QoS Management for NR V2X," 3GPP RAN WG2 Meeting #103bis, R2-1814018, Chengdu, China (Oct. 8-12, 2018).
Interdigital Inc., "QoS Management for NR V2X," 3GPP RAN WG2 Meeting #104, R2-1816790, Spokane, USA (Nov. 12-16, 2018).
Interdigital Inc., "RAN2 Aspects and TP for Simultaneous Support of Mode 1 and Mode 2," 3GPP RAN WG2 Meeting #105, R2-1901578, Athens, Greece (Feb. 25-Mar. 1, 2019).
Interdigital Inc., "Support For Unicast and Groupcast in NR V2X," 3GPP RAN WG2 Meeting #103bis, R2-1814015, Chengdu, China (Oct. 8-12, 2018).
Third Generation Partnership Project, "Technical Specification Group Services and System Aspects; Enhancement of 3GPP support for V2X scenarios; Stage 1 (Release 15)," 3GPP TS 22.186 V15.2.0 (Sep. 2017).
Third Generation Partnership Project, "Technical Specification Group Services and System Aspects; Enhancement of 3GPP support for V2X scenarios; Stage 1 (Release 16)," 3GPP TS 22.186 V16.2.0 (Jun. 2019).
Third Generation Partnership Project, "Technical Specification Group Services and System Aspects; Enhancement of 3GPP support for V2X scenarios; Stage 1 (Release 16)," 3GPP TS 22.186 V16.0.0 (Sep. 2018).
Third Generation Partnership Project, "Technical Specification Group Services and System Aspects; Study on enhancement of 3GPP Support for 5G V2X Services (Release 16)," 3GPP TR 22.886 V16.2.0 (Dec. 2018).
Third Generation Partnership Project, "Technical Specification Group Services and System Aspects; Study on enhancement of 3GPP Support for 5G V2X Services (Release 16)," 3GPP TR 22.886 V16.1.0 (Sep. 2018).
Third Generation Partnership Project, "Technical Specification Group Services and System Aspects; Proximity-based services (ProSe); Stage 2 (Release 15)," 3GPP TS 23.303 V15.1.0 (Jun. 2018).
Third Generation Partnership Project, "Technical Specification Group Services and System Aspects; Architecture enhancements for V2X services (Release 15)," 3GPP TS 23.285 V15.3.0 (Mar. 2019).
Third Generation Partnership Project, "Technical Specification Group Services and System Aspects; System Architecture for the 5G System; Stage 2 (Release 15)," 3GPP TS 23.501 V15.3.0 (Sep. 2018).
Third Generation Partnership Project, "Technical Specification Group Services and System Aspects; System Architecture for the 5G System (5GS); Stage 2 (Release 15)," 3GPP TS 23.501 V15.7.0 (Sep. 2019).
Third Generation Partnership Project, "Technical Specification Group Services and System Aspects; System Architecture for the 5G System (5GS); Stage 2 (Release 16)," 3GPP TS 23.501 V16.2.0 (Sep. 2019).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); Physical layer procedures (Release 15)," 3GPP TS 36.213 V15.2.0 (Jun. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.6.0 (Jun. 2019).
Third Generation Partnership Project, "Technical Specification Group Radio Access Network; NR; Radio Resource Control (RRC); Protocol specification (Release 15)," 3GPP TS 38.331 V0.0.5 (Aug. 2017).

(56) References Cited

OTHER PUBLICATIONS

Third Generation Partnership Project, "Technical Specification Group Radio Access Network; NR; Radio Resource Control (RRC) protocol specification (Release 15)," 3GPP TS 38.331 V15.6.0 (Jun. 2019).
Third Generation Partnership Project, "Technical Specification Group Services and System Aspects; Study on architecture enhancements for EPS and 5G System to support advanced V2X services (Release 16)," 3GPP TR 23.786 V0.8.0 (Aug. 2018).
Third Generation Partnership Project, "Technical Specification Group Services and System Aspects; Study on architecture enhancements for the Evolved Packet System (EPS) and the 5G System (5GS) to support advanced V2X services (Release 16)," 3GPP TR 23.786 V16.1.0 (Jun. 2019).
Third Generation Partnership Project, "Technical Specification Group Services and System Aspects; Architecture enhancements for V2X services (Release 15)," 3GPP TS 23.285 V15.1.0 (Jun. 2018).
Third Generation Partnership Project, "Technical Specification Group Services and System Aspects; Architecture enhancements for V2X services (Release 16)," 3GPP TS 23.285 V16.1.0 (Sep. 2019).
Huawei et al., "Potential AS layer impacts on SL connection setup and configuration in unicast," 3GPP TSG-RAN WG2 # 104, R2-1816517, Spokane, USA (Nov. 12-16, 2018).
Huawei et al., "Radio bearer configuration and management for NR sidelink," 3GPP TSG-RAN WG2 # 104, R2-181652, Spokane, USA (Nov. 12-16, 2018).
Qualcomm Incorporated, "Discussion on connection setup for V2X unicast communication," 3GPP TSG-RAN WG2 Meeting #104, R2-1817108, Spokane, USA (Nov. 12-16, 2018).
Third Generation Partnership Project, "Technical Specification Group Radio Access Network; NR; NR and NG-RAN Overall Description; Stage 2 (Release 15)," 3GPP TS 38.300 V15.2.0 (Jun. 2018).
Third Generation Partnership Project, "Technical Specification Group Radio Access Network; NR; NR and NG-RAN Overall Description; Stage 2 (Release 15)," 3GPP TS 38.300 V15.6.0 (Jun. 2019).
Vivo, "Sidelink unicast procedures in NR," 3GPP TSG-RAN WG2 Meeting #104, R2-1817108, Spokane, USA (Nov. 12-16, 2018).
ETSI MCC, "Report of 3GPP TSG RAN2#106 meeting, Reno, USA," 3GPP TSG-RAN WG2 meeting #107, R2-1908601 (Aug. 25, 2019).
Huawei et al., "Support of QoS for PC5-based V2X transport," 3GPP TSG-RAN WG2 Meeting #95, R2-164917, Gothenburg, Sweden (Aug. 22-26, 2016).
Interdigital Inc., "QoS Management for NR V2X," 3GPP RAN WG1 Meeting #94, R1-1808600, Gothenburg, Sweden (Aug. 20-24, 2018).
Qualcomm Incorporated, "Coexistence between Rel-14 and Rel-15 V2X UEs," 3GPP TSG RAN WG2 Meeting #100, R2-1713407, Reno, USA (Nov. 27-Dec. 1, 2017).

* cited by examiner

L2 PROCEDURES FOR UNICAST AND/OR MULTICAST LINK ESTABLISHMENT AND MAINTENANCE

CROSS-REFERENCE TO RELATED APPLICATIONS

This application is the U.S. National Stage, under 35 U.S.C. § 371, of International Application No. PCT/US2019/052972 filed Sep. 25, 2019, which claims the benefit of U.S. Provisional Application No. 62/736,251 filed on Sep. 25, 2018; U.S. Provisional Application No. 62/752,865 filed on Oct. 30, 2018; U.S. Provisional Application No. 62/783,952 filed on Dec. 21, 2018 and U.S. Provisional Application No. 62/886,102 filed on Aug. 13, 2019, the contents of each of which are hereby incorporated by reference herein.

BACKGROUND

Wireless communication use cases may deal with vehicle communications relating to traffic, transportation, safety, navigation, and the like. For example, vehicle to everything (V2X) communication may involve sending and receiving wireless communications to and from a vehicle. As wireless communications capabilities and requirements develop, it may be desired to provide systems, methods, and devices that operate in such environments.

SUMMARY

Some embodiments provide a method implemented in a wireless transmit/receive unit (WTRU) for determining whether to establish a Sidelink Radio Bearer (SLRB). The method includes configuring the WTRU with a SLRB resource selection criterion; receiving, by the WTRU, a plurality of SCI transmissions from another WTRU in a pool during a time window; for each of a plurality of time periods within the time window, determining, by the WTRU, based on the plurality of SCI transmissions and the SLRB resource selection criterion, whether SLRB resource selection would have failed; and determining, by the WTRU, whether to establish a new SLRB based on a percentage of resource selection failures; and on a condition that a percentage of the time periods where resource selection would have failed is determined to be below a threshold percentage, establishing the new SLRB with the other WTRU in the pool.

Some embodiments provide a WTRU configured to determine whether to establish a SLRB. The WTRU includes a processor operatively coupled to a transmitter and a receiver. The processor is configured with a SLRB resource selection criterion. The receiver is configured to receive a plurality of SCI transmissions from another WTRU in a pool during a time window. The processor is configured to determine, for each of a plurality of time periods within the time window, based on the plurality of SCI transmissions and the SLRB resource selection criterion, whether SLRB resource selection would have failed. The processor is further configured to determine whether to establish a new SLRB based on a percentage of resource selection failures. The transmitter is configured to, on a condition that a percentage of the time periods where resource selection would have failed is determined to be below a threshold percentage, transmit a message establishing the new SLRB with the other WTRU in the pool.

Some embodiments provide a method implemented in a WTRU, to determine whether to establish a SLRB. The method includes configuring the WTRU with a mapping of bearer QoSs to SLRB resource densities; receiving, by the WTRU, broadcasts which indicate a QoS of a SLRB of another WTRU in a pool; determining, by the WTRU, a total SLRB resource density in the pool based on the received QoS and the mapping; and determining, by the WTRU, whether to establish a new sidelink bearer with another WTRU in the pool based on whether the total resource density exceeds a threshold that is based on the QoS of the new sidelink bearer. The method also includes establishing the new sidelink bearer with the other WTRU in the pool if the WTRU determines to establish the new sidelink bearer.

Some embodiments provide a WTRU configured to determine whether to establish a SLRB. The WTRU includes a processor operatively coupled to a receiver and a transmitter. The receiver configured to receive broadcasts which indicate a quality of service (QoS) of a SLRB of another WTRU in a pool. The processor is configured to determine a total SLRB resource density in the pool based on the received QoS and a mapping of bearer QoSs to SLRB resource densities. The processor is further configured to determine whether to establish a new sidelink bearer with another WTRU in the pool based on whether the total resource density exceeds a threshold that is based on the QoS of the new sidelink bearer. The transmitter is configured to transmit message establishing the new sidelink bearer with the other WTRU in the pool, on a condition that the processor determines to establish the new sidelink bearer.

BRIEF DESCRIPTION OF THE DRAWINGS

A more detailed understanding of the drawings may be had from the following description but is not intended to limit the scope of the embodiments but to merely serve as examples in conjunction with the accompanying drawings, wherein like reference numerals in the figures indicate like elements, and wherein.

DETAILED DESCRIPTION

Figure 1A:
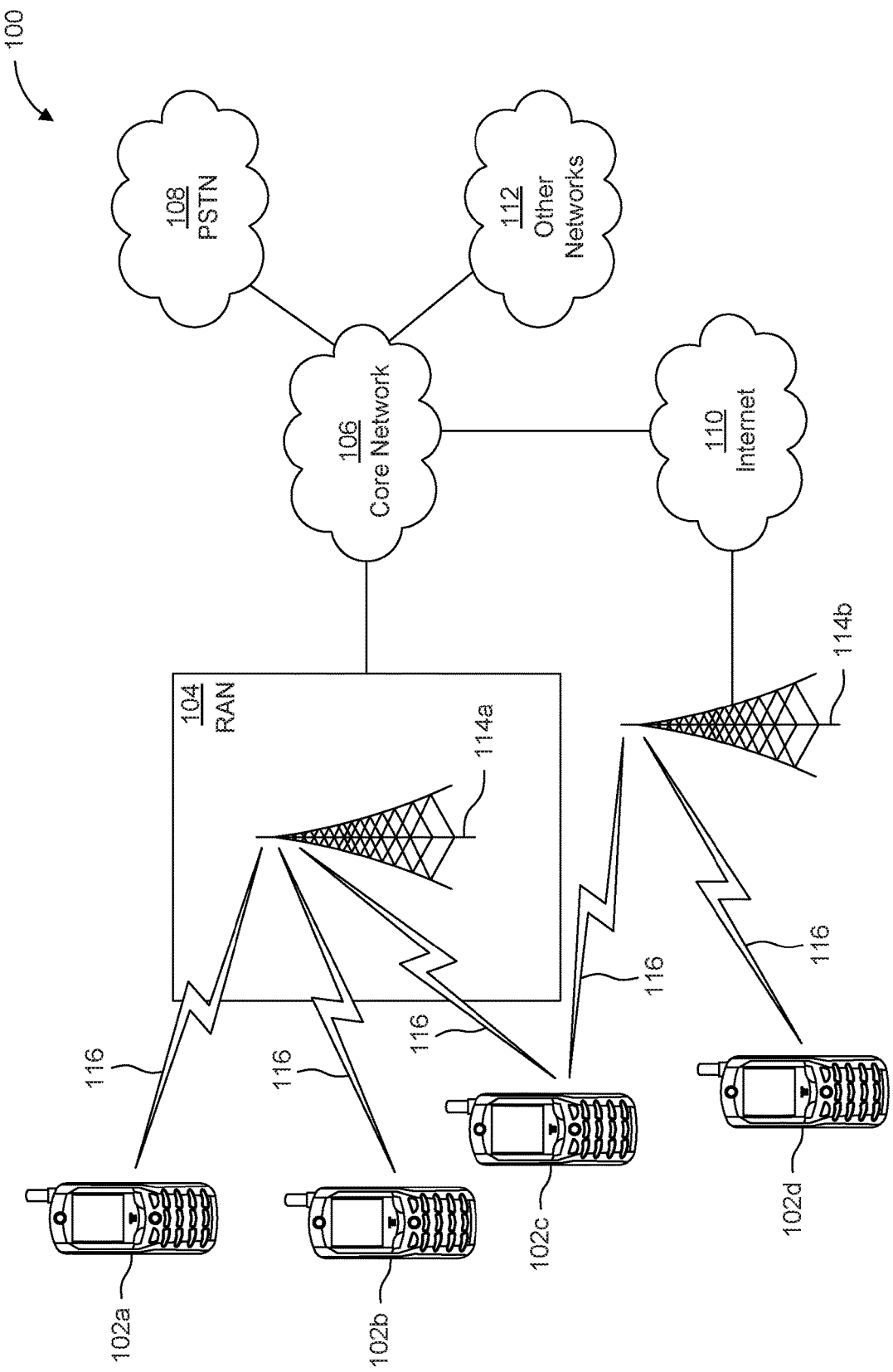
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, prepaid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
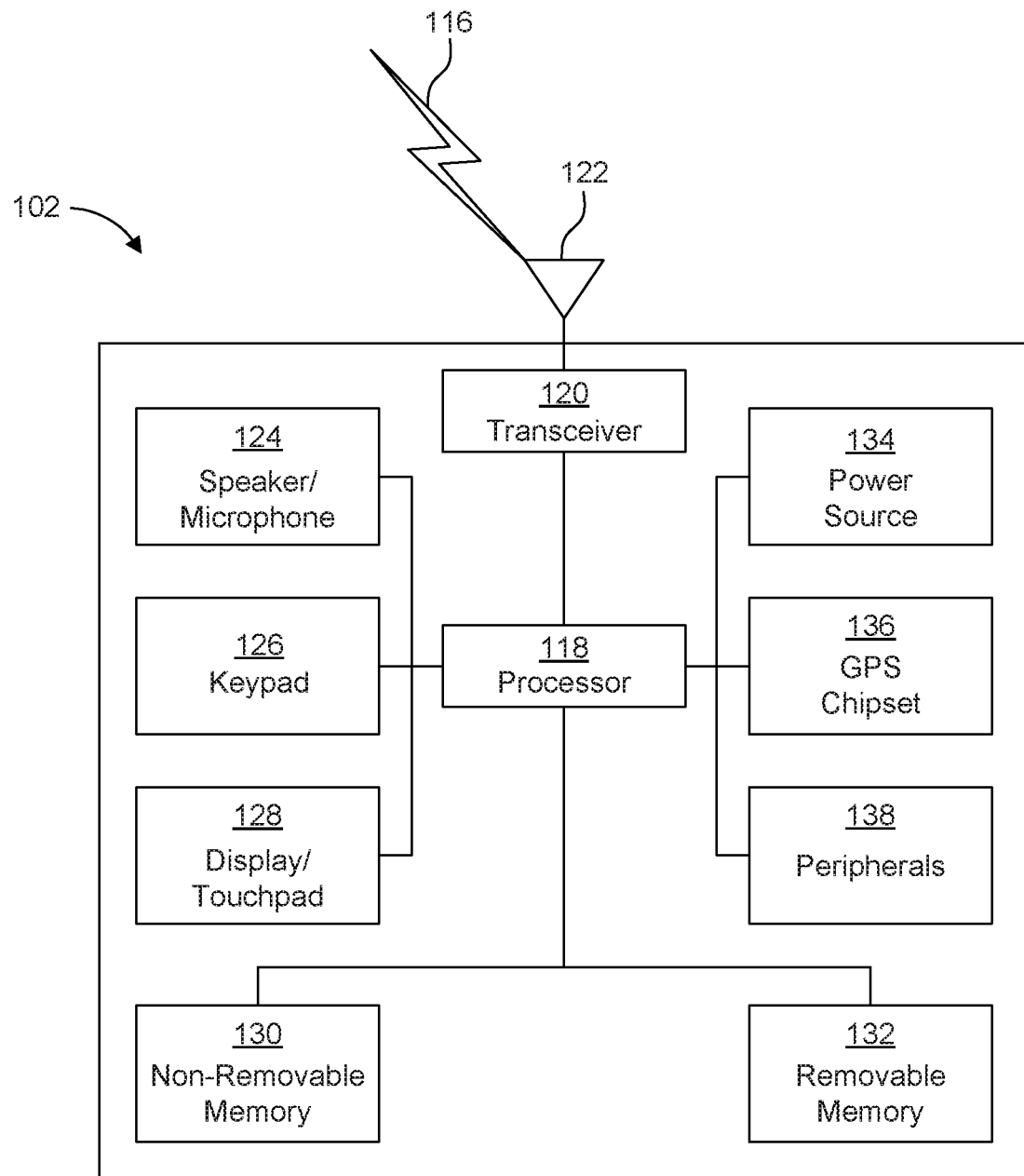
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (10), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
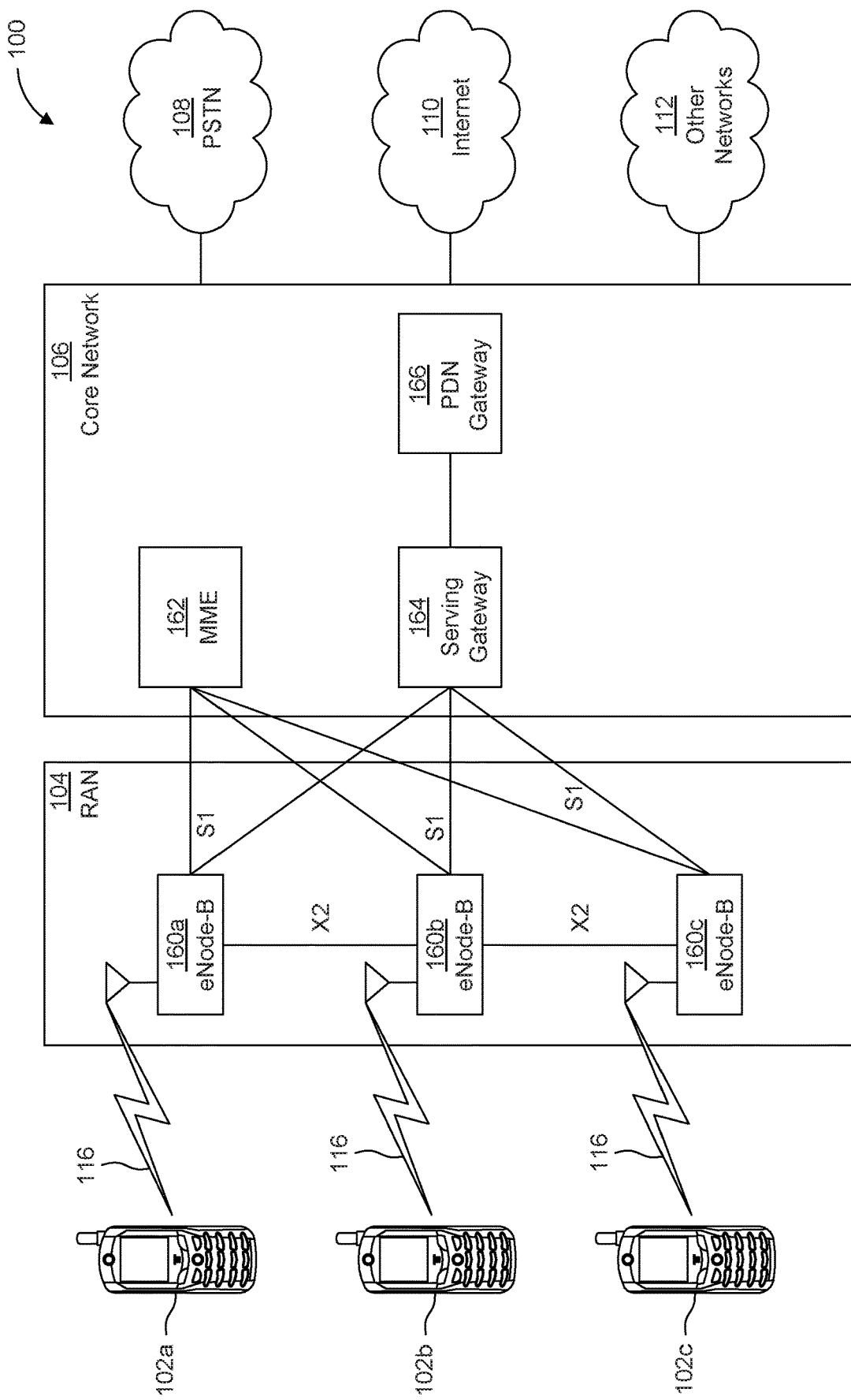
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
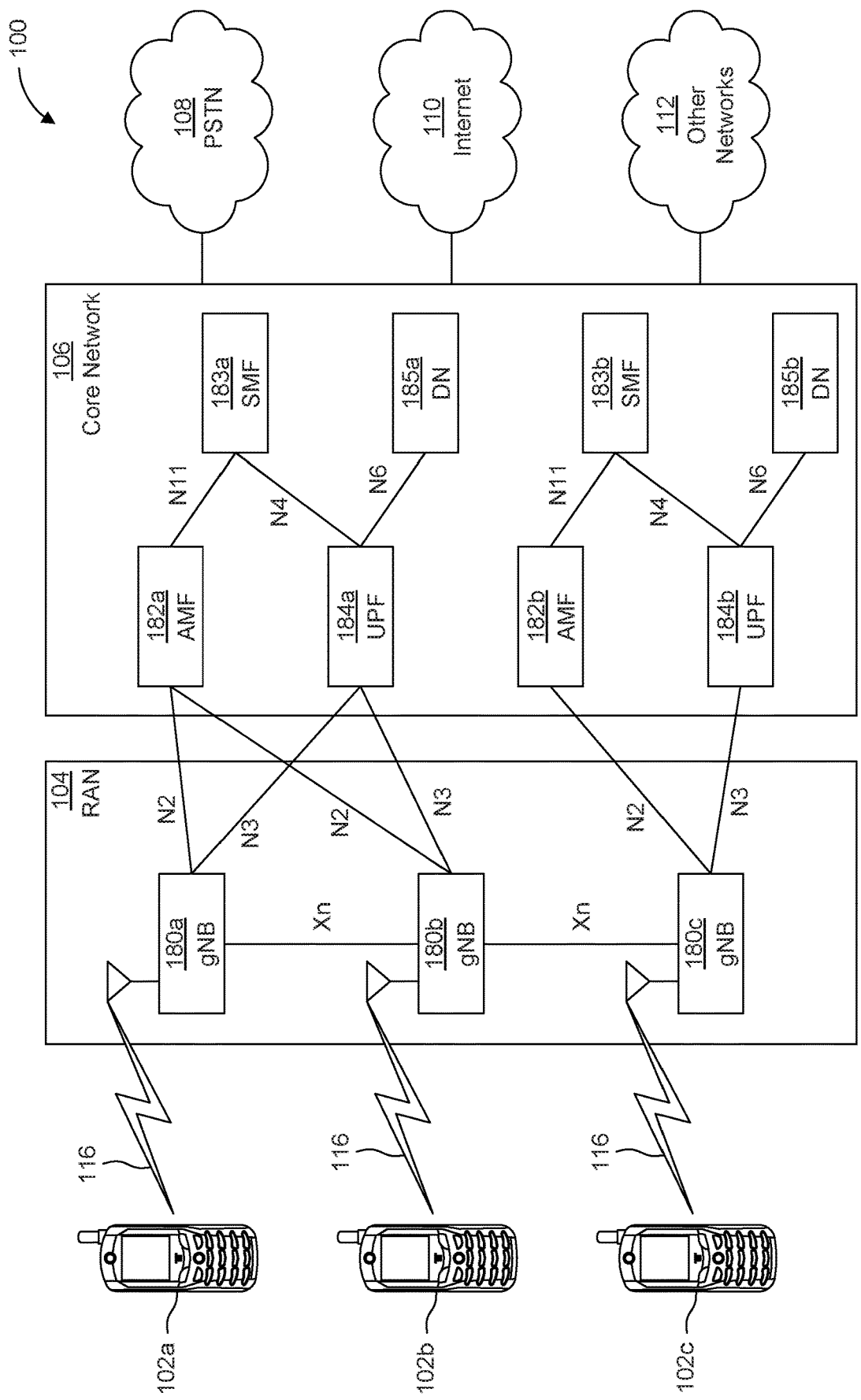
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different packet data unit (PDU) sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*ab*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Vehicle to Everything (V2X) communications may pass information between vehicles and other entities, such as other vehicles, road side units (RSU), pedestrian user devices (e.g., WTRUs), and the like. In some cases, vehicular V2X communications include modes of communication whereby WTRUs communicate with each other directly. V2X operations may include in-coverage scenarios and out-of-coverage scenarios. In-coverage scenarios may include operations where WTRUs receive assistance from the network to begin transmitting and receiving V2X messages. Out-of-coverage scenarios may include operations where WTRUs begin transmitting and receiving V2X messages based on preconfigured parameters.

V2X communications may be supported by LTE, and may be related to work on Device-to-Device (D2D) communications. V2X communications may include different types of services, such as V2V (Vehicle to Vehicle), V2I (Vehicle to infrastructure), V2N (Vehicle to Network), and V2P (Vehicle to Pedestrian) services. V2V services may facilitate direct communication between vehicular WTRUs. V2I services may facilitate communication between vehicular WTRUs and RSUs and/or eNBs. V2N services may facilitate communication between vehicular WTRUs and a core network. V2P services may facilitate communication between vehicular WTRUs and WTRUs with special conditions, such as low battery capacity, and so forth.

V2X communications may include different modes of operation for resource allocation. For example, LTE defines Mode 3 and Mode 4 operations. Mode 3 operations may include a network device, such as an eNB, providing a WTRU with a resource scheduling assignment for a V2X sidelink (SL) transmission. Mode 4 operations may include the WTRU autonomously selecting resources from a configured or preconfigured resource pool. V2X (e.g., LTE V2X) may include two categories of resource pools: receiving pools, and transmitting pools. WTRUs may monitor V2X resources (e.g., time and/or frequency) in receiving resource pools to receive V2X transmissions. WTRUs may select transmission resources from V2X transmitting resource pools, for example, in Mode 4 operations. In some implementations, WTRUs configured for Mode 3 operations may not use transmitting pools.

Resource pools may be semi-statically signaled to WTRUs via RRC signaling (e.g., in LTE). In Mode 4 operations, the WTRU may use V2X sensing (e.g., including decoding control channel transmissions of other WTRUs) before selecting a resource from the RRC configured transmitting pool. LTE V2X may not support dynamic resource pool reconfiguration. In some implementations, LTE resource pool configurations may only be carried via a SIB and/or dedicated RRC signaling.

New Radio (NR) may support several use cases, such as enhanced mobile broadband (eMBB), ultra-high reliability and low latency (URLLC), and other technologies. Enhanced V2X (eV2X) communication may be used with NR systems. In NR, eV2X may accommodate new services for safety and non-safety scenarios (e.g., sensor sharing, automated driving, vehicle platooning, remote driving, and the like). Different eV2X services may require different performance requirements, such as scenarios that require 3 ms latency.

NR V2X may support several use cases, such as vehicle platooning, advanced driving, extended sensors, and remote driving.

Vehicle platooning may enable vehicles travelling together to dynamically form a group. All the vehicles in the platoon may receive periodic data from the leading vehicle in order to carry on platoon operations. Such information may facilitate extremely small distances between vehicles (i.e., the gap distance translated to time, i.e., communication latency can be very low, e.g., sub-second latency). Platooning applications may facilitate vehicles following the leading vehicle to be autonomously driven.

Advanced driving may enable semi-automated or fully-automated driving for greater inter-vehicle distances. For example, V2X devices may include vehicles or other mobile nodes, and roadside units (RSU) or other stationary nodes. Each vehicle and/or road side unit (RSU) may share data obtained from its local sensors with vehicles in its proximity, thus allowing vehicles to coordinate their trajectories or maneuvers. Further, each vehicle may share its driving intention with vehicles in proximity. For example, a vehicle may transmit messages to other vehicles which include various information, such as changes in speed and/or direction, to indicate the driving intention of the vehicle. Advanced driving may facilitate safer travel, collision avoidance, and improved traffic efficiency.

Extended Sensors may enable the exchange of raw or processed data gathered through local sensors or live video data among vehicles, RSUs, devices of pedestrians, and/or V2X application servers. The vehicles may enhance perception of their environment beyond what their own sensors may detect, e.g., providing a holistic view of the local situation.

Remote Driving may enable a remote driver or a V2X application to operate a remote vehicle. This may be advantageous, for example, to provide vehicle operation for passengers who cannot drive themselves or remote operation for a vehicle located in a dangerous environment. In some cases where variability is limited and routes are predictable, such as public transportation, driving based on cloud computing may be used to control or facilitate remote driving. Cloud-based back-end service platforms may be used for remote deriving. For example, vehicles or other V2X devices may exchange messages with a central server, or cloud server, to perform computations.

LTE V2X may rely on broadcast communication only, and therefore, may not utilize link establishment. D2D, on which V2X sidelink is based, may utilize link establishment over sidelink however. For example, in D2D operations, two WTRUs may establish a one-to-one ProSe Direct Communication over a PC5 protocol layer, above the PDCP layer in the protocol stack.

One-to-one ProSe Direct Communications may be realized, for example, by establishing a secure layer-2 link over PC5 between two WTRUs. Each WTRU may have a Layer-2 ID for unicast communication that is included in the Source Layer-2 ID field of each frame that it sends on the layer-2 link, and included in the Destination Layer-2 ID of every frame that it receives on the layer-2 link. The layer-2 link for one-to-one ProSe Direct Communication may be identified by a combination of the Layer-2 IDs of each of the two WTRUs in the direct communication. The WTRU may engage in multiple layer-2 links for one-to-one ProSe Direct Communication using the same Layer-2 ID, e.g., because the layer-2 link is identified by the combination of the Layer-2 IDs of each of the two WTRUs in the direct communication.

WTRUs engaged in isolated (i.e., non-relay) one-to-one communications may negotiate IP address allocation mechanisms, and may optionally exchange link-local IPv6 addresses if needed during the link establishment procedure.

Figure 2:
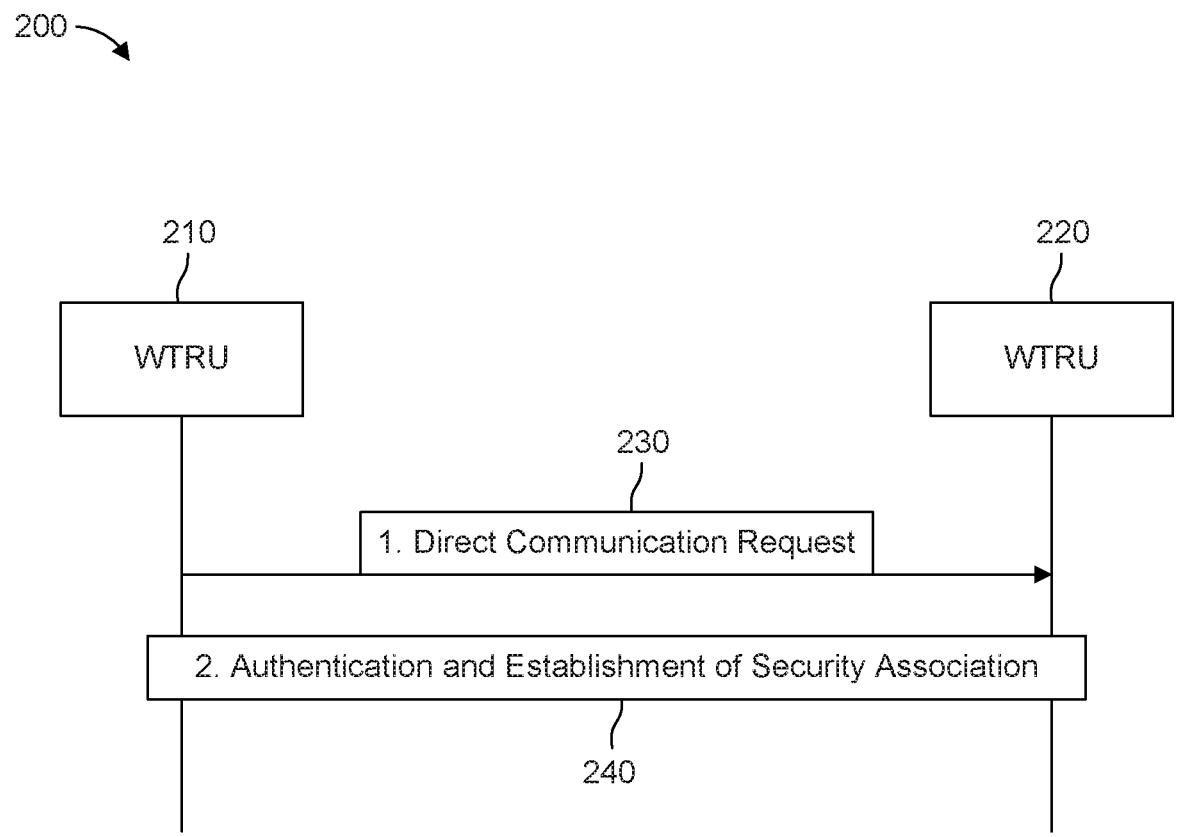
FIG. 2 is a message sequence chart illustrating an example link establishment procedure between two WTRUs.

FIG. 2 is a message sequence chart illustrating an example procedure 200 for link establishment between WTRU 210 and WTRU 220. In a first step, WTRU 210 may send a Direct Communication Request message 230 to WTRU 220 in order to trigger mutual authentication. Contents of the Direct Communication Request message 230 may be referred to as User Info. In a second step, WTRU 220 initiates a procedure 240 for mutual authentication. The successful completion of the authentication procedure completes the establishment of the secure layer-2 link over PC5. As part of this step, WTRU 220 includes the User Info in a response message to WTRU 210.

The PC5 Signaling Protocol supports keep-alive functionality that may be used to detect if the WTRUs are not in ProSe Communication range, in which case they may proceed with implicit layer-2 link release.

NR V2X may include link establishment enhancements (e.g., as compared to D2D). For example, procedures may be provided for establishment and maintenance of a secure L2 link over PC5. Such procedures may be enhanced and adapted for the V2X use, or similar signaling may be defined at RRC layer. V2X the link/group handling may also require further considerations. For example, not all WTRUs may support or use unicast communications in V2X communication. To support link establishment, a WTRU may transmit a service announcement to inform a peer of the existence of the WTRU and the capabilities of the WTRU, if any, for unicast communication (e.g., channels on which the WTRU can operate for unicast, services supported, and so forth). Such service announcement may be made accessible to all WTRUs that are interested in using the service (e.g., an application). For example, such an announcement may be either configured to be sent over a dedicated channel, similar to how WAVE Service Advertisement (WSA) is handled, or to be piggybacked on (e.g., added or appended to) periodic messages from the supporting WTRUs.

NR V2X may include QoS enhancements. For example, QoS over PC5 may be supported with ProSe Per-Packet Priority (PPPP). The application layer may be permitted to mark the packets with a PPPP which indicates a required QoS level. Other enhancements may be added (e.g., permitting derivation of PDB from the PPPP).

QoS requirements for NR V2X may include performance KPIs. Such performance KPIs may be specified with one or more of the following parameters: Payload (Bytes); Transmission rate (Message/Sec); Maximum end-to-end latency (ms); Reliability (%); Data rate (Mbps); and/or Minimum required communication range (meters).

A same set of service requirements may apply to both PC5 based V2X communication and Uu based V2X communication. For example, such QoS characteristics may be represented with 5QI. Therefore, a unified QoS model may be used for PC5 and Uu (e.g., 5QI may also be used for V2X communication over PC5, such that the application layer may have a consistent way of indicating QoS requirements, regardless of the link used).

5GS V2X capable WTRUs may support three different types of traffic: broadcast, multicast, and unicast.

The same QoS model as for Uu may be utilized for unicast traffic (i.e., each unicast link may be treated as a bearer, and QoS flows may be associated with it). All the QoS characteristics defined in 5QI, and an additional data rate parameter may apply. Further, a minimum required communication range may be treated as an additional parameter specific to PC5 use.

The same or similar considerations may apply to multicast traffic, which may be treated as a special case of unicast (i.e., with multiple defined receivers of the traffic).

For broadcast traffic, there may be no bearer concept; i.e., no association between the packets and a logical link having certain configured parameters. Each broadcast message may have different characteristics according to application requirements. 5QI accordingly be used in a similar manner to PPPP and/or ProSe Per-Packet Reliability (PPPR) (i.e., each packet is associated (or "tagged") with a QoS value). 5QI may have the capability of representing all of the characteristics needed for PC5 broadcast operation (e.g., latency, priority, reliability, etc.). A group of V2X broadcast-specific 5G Quality Service Indicators (V2X 5QIs) or (VQIs) may be defined for PC5 use.

PC5 QoS parameters may be negotiated at the establishment of a one-to-one communication procedure. Accordingly, one-to-one communication establishment procedures may be enhanced to support PC5 QoS parameter negotiation between two WTRUs. After PC5 QoS parameter negotiation, the same QoS may be used in both directions of the one-to-one communication.

The example procedure 200 illustrated with respect to FIG. 2 can be modified for negotiation of PC5 QoS parameters between WTRU 210 and WTRU 220. For example, in the first step, Direct Communication Request message 230 may, in addition to or instead of the User Info, include requested PC5 QoS parameters. In the second step, procedure 240 may, in addition to or instead of the User Info, include the accepted PC5 QoS parameters in a response message to WTRU 210.

In some cases, establishment of unicast and multicast links for NR V2X based on a QoS model, may raise several issues. For example, in some implementations, signaling for unicast link establishment (for D2D one-to-one establishment) may support only a unicast link, and not a multicast link.

Also, in some implementations, link establishment decisions (e.g., for one-to-one communication in D2D) may be based on reachability requirements (e.g., Received Signal Received Power (RSRP)), whereas NR V2X may have more stringent requirements (e.g., latency, reliability, etc.) and/or additional requirements (e.g., range, rate, etc.). These various requirements may rely on unicast and/or multicast at the AS layers to achieve these requirements. A radio-bearer type model may be used for unicast and/or multicast, which may require new sidelink procedures that were not previously needed and/or specified for D2D or V2X. For example, an admission control procedure that is handled autonomously by a WTRU may be required for Uu (e.g., for Mode 4 operations), whereas typically this may have been performed by the network. In another example, a link maintenance procedure for QoS over sidelink may require that the AS layer maintains a certain quality level for SL transmissions.

Also, in some implementations, the model for QoS may assume that a set of flows are mapped to a specific bearer (e.g., similar to Uu). For Uu, the mapping may be done by a gNB based on available DL/UL resources. For SL, the decisions may need to be performed by the WTRU (e.g., for Mode 4 operations) and may need to be based on properties of the available SL resources and SL bearer characteristics which the WTRU may set up itself.

Some embodiments may provide systems, methods, and devices for link establishment and maintenance. Link establishment and maintenance are discussed for unicast or groupcast transmissions herein. Substantially similar link establishment and maintenance procedures may also be applied to a "broadcast link", whereby a broadcast link may require a less involved admission control evaluation and/or link maintenance procedure, or no admission control evaluation and/or link maintenance procedure. Nevertheless, link establishment signaling may still be applicable for broadcast transmission cases insofar as a radio bearer may be established for a broadcast service associated with a transmission for a group destination ID, or a L2 destination ID. Accordingly, techniques and approaches discussed herein may also be applicable to broadcast transmissions.

Figure 3:
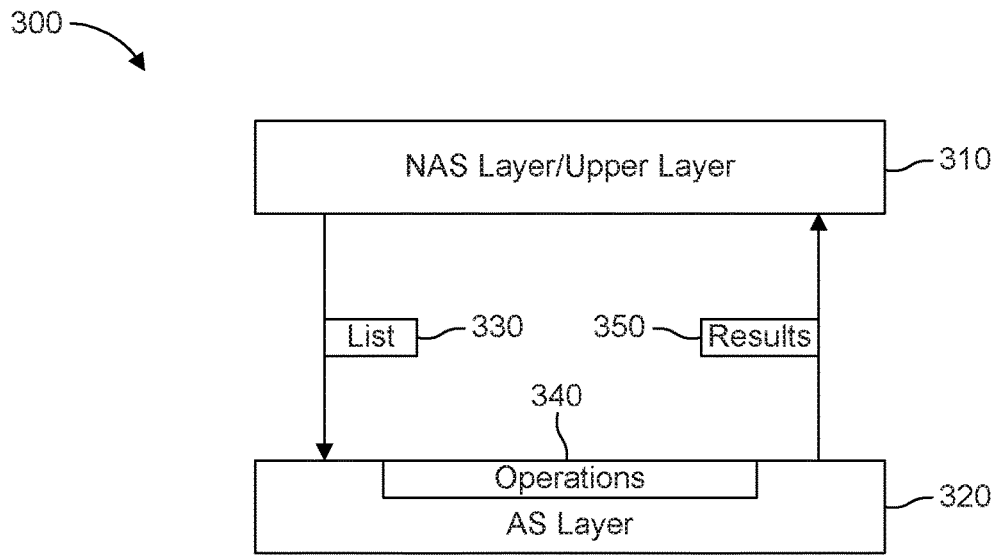
FIG. 3 is a block diagram of a link establishment model which illustrates an example procedure for a connection establishment decision performed by the AS layer.

The term "upper layers" as used herein may refer to a NAS layer, an application layer, V2X layer or may indicate interactions among both a NAS layer, V2X layer and an application layer. In some examples, a procedure for a connection (i.e., link) may include a link establishment decision performed by the AS layer. AS/NAS layer signaling for link establishment may be based on several models. FIG. 3 illustrates an example of such a model.

Some embodiments provide procedures for SL radio bearer link establishment. For example, FIG. 3 is a block diagram of a link establishment model 300 which illustrates example communications among a NAS layer and/or one or more upper layers 310 and an AS layer 320 to establish a connection between a WTRU and a peer WTRU. Link establishment model 300 illustrates a connection establishment decision performed by the AS layer 320.

NAS and/or one or more upper layers 310 may communicate a list 330 of WTRUs between which it is desired to establish a connection. List 330 may be communicated in the form of a request, a packet marked as unicast with a specific L2 ID of the peer WTRUs, or in any other suitable manner. Based on list 330, AS layer 320 may perform operations 340 to determine reachability (e.g., whether a WTRU can communicate with (i.e., reach) another WTRU), perform admission control, and initiate connection establishment. AS layer 320 may provide the results of operations 340 to NAS and/or one or more upper layers 310 in a communication 350 (e.g., an inter-layer message).

In some implementations, parts of operations 340 may be performed in a separate discovery procedure which may or may not be performed at the same time as link establishment. For example, a WTRU may perform a reachability determination as part of a separate discovery procedure which occurs prior to the link establishment procedure. Similarly, responses to the link establishment procedure (e.g., reachability reports, such as those discussed further herein) may also be part of a separate discovery procedure performed prior to link establishment.

Figure 4:
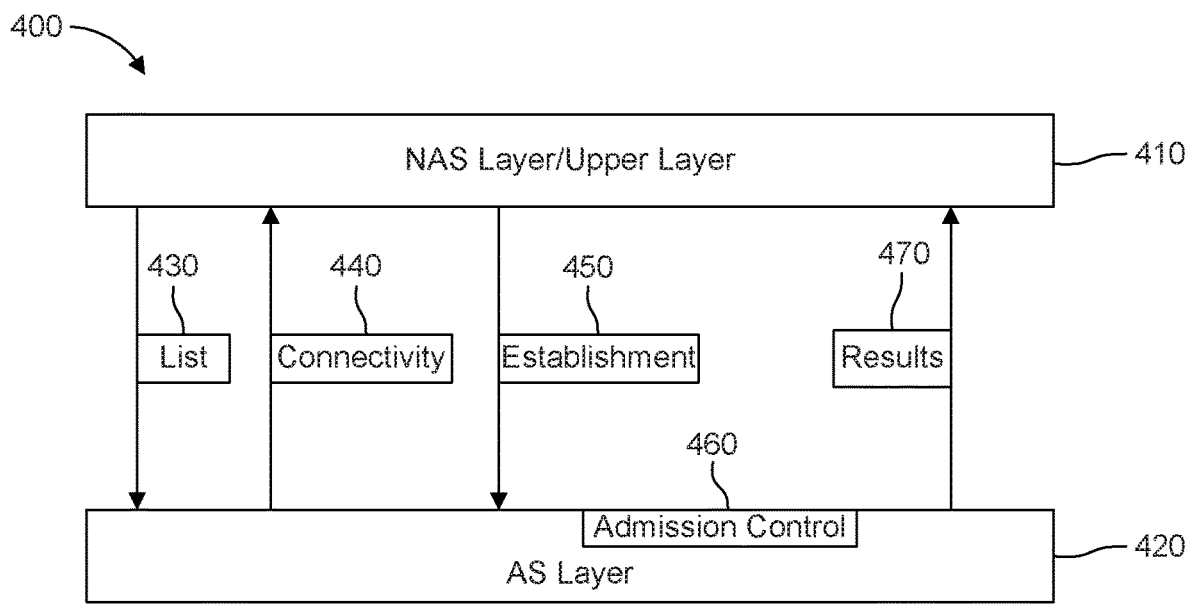
FIG. 4 is a block diagram of a link establishment model which illustrates an example procedure where upper layers perform a connection establishment decision based on information from the AS layer.

FIG. 4 is a block diagram of a link establishment model 400 which illustrates example communications among an NAS and/or one or more upper layers 410 and an AS layer 420 for link establishment where NAS and/or one or more upper layers 410 may make a decision based on information from the AS layer 420.

NAS and/or one or more upper layers 410 may send a discovery or service announcement in a communication 430 to AS layer 420 to obtain a list of WTRUs in range (e.g., that support the unicast service). Communication 430 may be in the form of a request, in the form of a packet with a specific L2 ID of the peer WTRU or WTRUs, or in the form of an identifier of the announced service or application, for example. AS layer 420 may provide connectivity-related information to NAS and/or one or more upper layers 410 in a communication 440 (e.g., an inter-layer message). For example, connectivity-related information may information regarding whether two WTRUs can communicate with one another, the quality of their link, etc.

NAS and/or one or more upper layers 410 may initiate connection establishment by a connection establishment communication 450 (e.g., an inter-layer message). After receiving the connection establishment communication 450, AS layer 420 may perform an admission control procedure 460 such as discussed further herein. AS layer 420 may provide results from admission control procedure 460 to NAS and/or one or more upper layers 410 in a communication 470.

In model 400, communications 430 and 440 and the associated procedures for generating, transmitting, receiving, and processing these communications may be optional, or may be performed entirely by NAS and/or one or more upper layers 410. For example, NAS and/or one or more upper layers 410 may communicate upper-layer discovery or service announcement messages and may initiate connection establishment (i.e., corresponding to communication 450) among the NAS and/or one or more upper layers 410, without any information from AS layer 420. AS layer 420 may further provide connectivity-related information to NAS and/or one or more upper layers 410 in communication 470.

Some embodiments may provide AS/NAS layer signaling to support unicast, multicast link, and/or SLRB communications. Some examples include interactions between upper layers and AS layers to facilitate or ensure QoS of a service (e.g., broadcast service, which may or may not be transported as a SLRB) or flow (e.g., which may be mapped by AS layers to a SLRB). In some examples, such interactions may be used in any transmission mode (e.g., mode 1 or mode 2) and/or for any type of transmission (e.g., unicast, groupcast, or broadcast). In some examples, a WTRU performing an admission control procedure for a broadcast service may make its own admission control determination (i.e., for mode 2) or may receive an admission control decision from the network (i.e., mode 1). The WTRU may inform upper layers of such decision. Alternatively, for the case of unicast and/or multicast link and/or SLRB establishment, a WTRU may initiate link establishment signaling. Each WTRU associated with unicast or multicast establishment may perform its own admission control and may either inform its own upper layers of the admission control results, or may inform a peer WTRU of the admission control results, where the peer WTRU is responsible for interacting with upper layers based on admission control results of all WTRUs. The examples described in the following situations may apply to any of the above cases without loss of generality.

In some examples, a list of WTRUs may be provided by the NAS layer and/or upper layers to the AS layer (e.g., list 330 as shown and described with respect to FIG. 3), or a connection establishment request may be made by the NAS layer and/or upper layers to the AS layer (e.g., connection establishment communication 450 as shown and described with respect to FIG. 4.). In some such examples, the NAS layer and/or upper layers may provide various information and/or parameters to the AS layer, such as a list of L2 source IDs identifying the WTRU(s) to be included in the unicast and/or multicast connection (e.g., a single WTRU in the unicast case); a unicast and/or multicast indication (i.e., an indication of whether the connection will be unicast or multicast); data packets (e.g., an upper layer service announcement) to be transmitted; QoS requirements for the unicast and/or multicast link (e.g., VQI, QoS profile); an expected time period over which transmission between the two or more WTRUs may occur (e.g., to help AS layer with decision of AS layer link establishment); and/or a link identifier for L2 unicast and/or multicast. Such link identifier may include the L2 source ID of a peer WTRU, which the WTRU may include in a link establishment request message (e.g., connection establishment communication 450). Alternatively, in the unicast case, such link identifier may include the L2 source ID of the peer WTRU as the destination for unicast and the upper layers (e.g., NAS and/or one or more upper layers 410) may identify the WTRU with another ID).

In some examples, an AS layer may provide connectivity information. FIG. 4 is a block diagram of a link establishment model which illustrates an example procedure where upper layers determine link establishment based on information by the AS layer. For example, AS layer 420, as shown and described with respect to FIG. 4, may provide connectivity information in communication 440 or communication 470. In some examples, an AS layer may provide various information/parameters to the NAS/upper layers, such as a list of WTRUs in range of the WTRU that support the announced service or application; reachability (e.g., a yes/no indication of whether a WTRU can communicate with (i.e., reach) another WTRU) for a specific WTRU, where reachability may be evaluated by the AS layer based on the VQI provided by upper layers; a measurement value or level (e.g., based on a preconfigured mapping of RSRP to level) associated with measured signals (e.g., PHY layer signals, such as reference signals, included in the messages) transmitted between the WTRUs, where the measurement may be based on transmission of discovery or service announcement messages or of an associated RRC message transmitted in response to the connection establishment initiated by the upper layers; a result of the upper layer service announcement (e.g., such result may be carried in a NAS packet); Potential trends in the discovery or message transmission results (e.g., information indicating an increase, decrease, or no change in a measured RSRP, or a period of time x during which the WTRU can be discovered by or overheard by another WTRU); and/or vehicle trajectory information.

In some examples, a WTRU AS may send results of the SL radio bearer link establishment procedure to upper layers. For example, AS layer 420, as shown and described with respect to FIG. 4, may provide results in communication 470, or AS 320, as shown and described with respect to FIG. 3, may provide results in communication 350. Such results may include an indication of success or failure of link establishment; may include an error code indicating cause of failure for failed link establishment; and/or may include a subset of WTRUs (e.g., a list of L2 IDs) which are connected (i.e., fully connected) in a multicast link, in successful link establishment.

In some examples, a WTRU AS may send an indication of failed link establishment to upper layers. Such failure may result from a failed admission control for a requested service, packet, link and/or SLRB. Such an indication may occur at any time during the active time of an SLRB, such as if an SLRB fails link monitoring, or is preempted by another WTRU. Such an indication may be sent by any of the WTRUs associated with the procedure (e.g., at the initiating WTRU or the peer WTRU). The AS may provide upper layers with such indication in the same message as any or a combination of information relating to failed link establishment, such as information indicating a WTRU (e.g., WTRU ID) for which the QoS was not met, or for which the link could not be established (e.g., an indication that the WTRU interacting with the upper layer, or the peer WTRU, could not establish the link), where the WTRU ID provided may be the source L2 ID; information indicating a WTRU (e.g., WTRU ID) which preempted the SLRB; QoS parameters, the SLRB ID, or a Flow ID of the link and/or SLRB or packet which caused preemption of the SLRB; a specific QoS parameter which could not be met; an indication of other WTRUs (e.g., WTRU IDs) and/or SLRBs (SLRB ID, QoS flow ID, or similar), currently established, which prevent establishing the new SLRB/link, or do not allow the new SLRB/link to be established (e.g., an indication that the new SLRB conflicts with existing unicast links, and/or an indication of which existing unicast links conflict with the new SLRB); and/or a failure cause. Examples of a failure cause include admission control failure, inability to preempt an ongoing service, capability failure (e.g., link could not be established or QoS could not be met), insufficient resources (e.g., Physical Sidelink Shared Channel (PSSCH), RS resources, feedback channel, preemption resources) to establish the link, and/or preemption of the SLRB/link.

In some examples, the WTRU falls back to best effort. For example, the WTRU AS layer may indicate to the WTRU NAS layer that the link was established but that the QoS requirements associated with the link may not be satisfied. The WTRU AS layer may further be allowed (e.g., depending on the configuration of the WTRU, or a standard or specification) to send such an indication to the upper layers if instructed by the AS layer during link establishment initiation. The WTRU AS may indicate the specific QoS parameters (e.g., latency) that can be satisfied, and the ones which will only be satisfied as best effort.

In some examples, the WTRU AS layer may negotiate or renegotiate with the WTRU NAS layer to determine an appropriate QoS that can be supported by the AS layer link and/or SLRB. This negotiation or renegotiation may take place during link establishment/SLRB setup, or at any time while the link is established, such as at the detection of a failure in link monitoring, following a trigger for AS-layer reconfiguration (e.g., as described herein), at reception of a preemption indication for a link, or as initiated by upper layers. This negotiation or renegotiation may be performed by any of the WTRUs associated with the procedure (e.g., at the initiating WTRU or the peer WTRU).

For example, the WTRU AS layer may indicate that the QoS cannot be met, and may wait for the upper layers to provide a new VQI, or indicate termination of the procedure. The WTRU AS layer may wait for an indication from the upper layers for a time indicated by a value of a configured, preconfigured, or defined timer, after which it may indicate a failure in the AS-layer signaling associated with link establishment or AS-layer reconfiguration (e.g., by transmitting a reject or failure RRC message). Alternatively, if the upper layers provide a new VQI, the AS-layer signaling procedure (e.g., link establishment or AS-layer reconfiguration) may proceed using the new VQI.

In another example, the WTRU AS layer may indicate that a QoS cannot be met, and may suggest an alternate QoS (e.g., VQI) that can be met instead. The AS layer may wait for the upper layers to provide an acknowledgement of the suggested QoS parameters, or to indicate that the suggested QoS is not acceptable for the associated flow or SLRB. The WTRU AS layer may wait for an indication from the upper layers for a time indicated by a value of a configured, preconfigured, or defined timer, after which it may indicate failure in the AS-layer signaling associated with link establishment or AS-layer reconfiguration (e.g., by transmitting a reject or failure RRC message). Alternatively, if the upper layers acknowledge the new QoS parameters as acceptable, the AS-layer signaling procedure (e.g., link establishment or AS-layer reconfiguration) may proceed using the new QoS parameters.

In the examples of negotiation/renegotiation situation described above where the AS layer indicates that the QoS cannot be met, the upper layers may inform the AS-layer as to whether the AS-layer signaling should continue for the link establishment or AS-layer renegotiation. For example, if QoS negotiation is successful (e.g., the upper layers are able to configure a new QoS for the SLRB), the new QoS may need to be provided to the other WTRU associated with the link establishment or AS-layer reconfiguration. The new QoS parameter or parameters may be provided in RRC signaling (e.g., the upper layers may provide the new QoS parameter or parameters to the AS-layer, and the AS-layer may include the new QoS parameter or parameters in the RRC message) or by upper layer signaling (e.g., RRC signaling includes the new QoS parameter or parameters in a transparent (e.g., encapsulated) message transmitted by RRC). In either case, the upper layers may indicate to the AS layer to continue the RRC signaling exchange in order to deliver the new QoS parameter or parameters to the other WTRU. If the QoS renegotiation procedure fails, the WTRU may initiate transmission of an RRC failure message associated with the RRC signaling exchange, at which point the link establishment procedure or AS-layer reconfiguration procedure may be considered to have failed.

In some examples, QoS negotiation or renegotiation is condition on upper layer PDU presence. For example, the WTRU may determine whether to perform QoS negotiation or renegotiation based on the presence of, absence of, and/or size of, an upper-layer PDU or PDUs (i.e., a transparent, e.g., encapsulated, message) in a received RRC message. In some examples, a WTRU may receive a link establishment request RRC message. If the RRC message includes an upper layer PDU (or if an upper layer PDU is of a given size), the WTRU may determine that a failed admission control and/or failed AS-layer reconfiguration can initiate a QoS negotiation or renegotiation procedure with the upper layers. Alternatively, if such PDU is not included in the RRC message, a WTRU may indicate a failed link establishment or reconfiguration procedure upon failed admission control. Without loss of generality, such an upper layer PDU may be included in any of the RRC messages associated with link establishment and/or AS-layer reconfiguration. Further, a WTRU may also maintain knowledge of (e.g., stored information indicating) whether a QoS renegotiation procedure is allowed for cases of failed link monitoring based on whether an upper layer PDU was included in the signaling during link establishment for the SLRB.

Some embodiments may provide sidelink signaling to support unicast and/or multicast link and/or SLRB. Some examples include proactive discovery. For example, a WTRU may proactively perform periodic discovery to maintain a list of potential unicast and/or multicast targets. Such proactive discovery transmissions may be initiated by the AS layer, Application Layer, or NAS layer. The WTRU may employ a discovery message broadcast on PSSCH, using a dedicated destination L2 ID. Such ID may be associated with unicast service discovery.

The WTRU (e.g., AS layer and/or upper layers) may maintain a list of responding WTRUs and certain quality measures associated with such WTRUs. For example, a WTRU may maintain a list of L2 Source IDs which responded to the discovery broadcast message. The WTRU may further maintain certain trends for use during AS link establishment decision, such as an absolute quality value of the measured discovery response; a consecutive number of responses and/or period of time in which discovery response was above a threshold; and/or a period of time or number of responses in which discovery response quality did not change by more than a certain amount.

The WTRU may determine link establishment criteria, or indicate such to upper layers, based on any of the information described above (e.g., discovery response measured above a threshold for at least the last T time units). The WTRU may respond to a discovery message using the source L2 ID of the initiating WTRU as the destination address.

Figure 5:
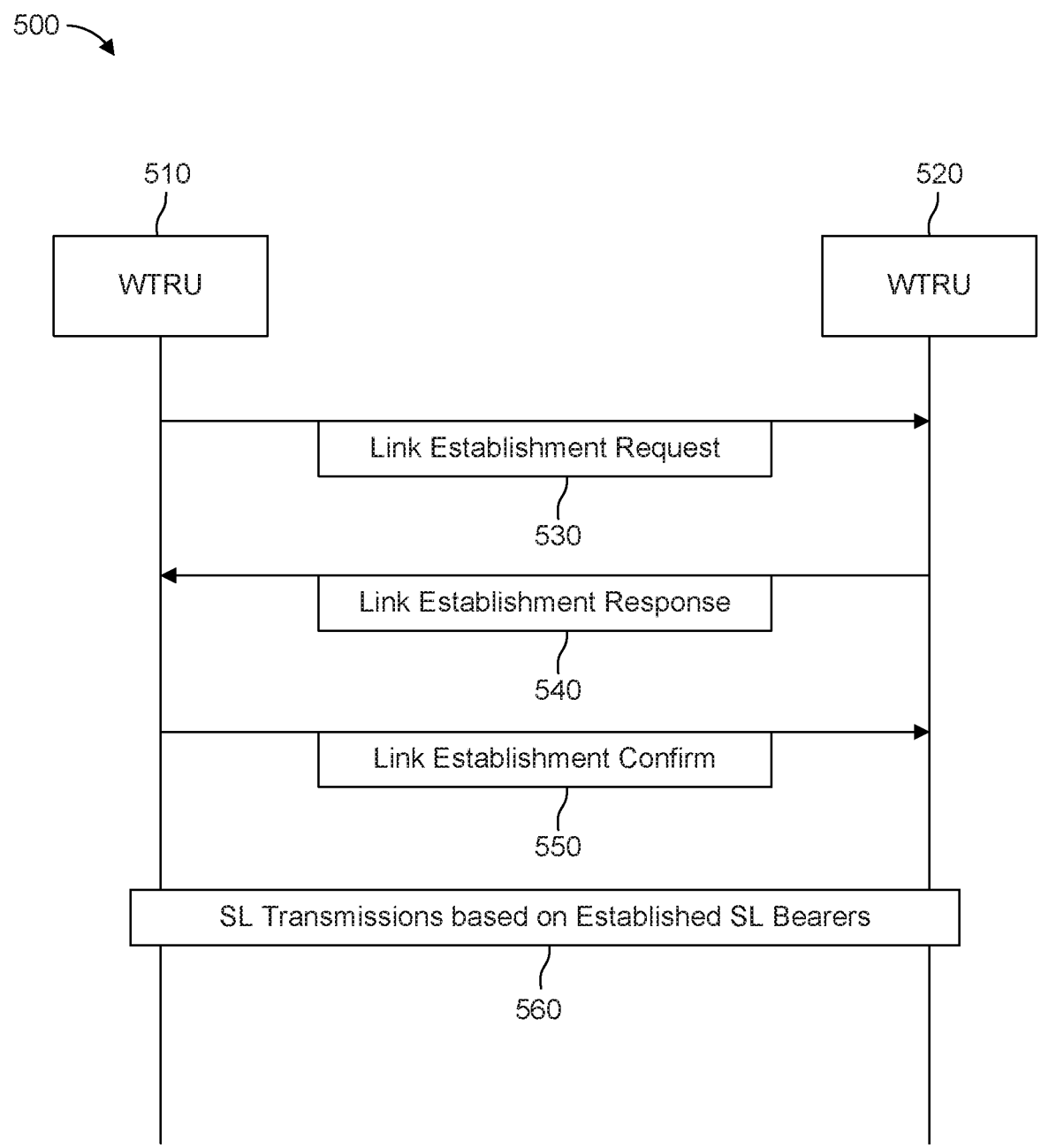
FIG. 5 is a message sequence chart which illustrates an example sidelink link establishment procedure at the AS layer between WTRUs.

Some examples include signaling for autonomous link establishment. by a WTRU. For example, FIG. 5 is a message sequence chart illustrating an example sidelink link establishment procedure 500 at the AS layer between a WTRU 510 and a WTRU 520. The link establishment may involve a link establishment request message 530 from WTRU 510 to WTRU 520, a link establishment response message 540 from WTRU 520 to WTRU 510, and/or a link establishment confirmation message 550 from WTRU 510 to WTRU 520. WTRUs 510 and 520 may transmit each message as an RRC message (e.g., the link establishment request message 530 may be an RRCReconfiguration message, a WTRUSidelinkInformation message, or any other such message supported by the RRC protocol). Alternatively, the messages illustrated in procedure 500 may include a mixture of upper layer messages and RRC messages. After link establishment message 550 is received by WTRU 520, SL transmissions may commence on established SL bearers in step 560.

In some examples, following an indication for link establishment from higher layers, WTRU 510 may first perform an admission control procedure based on a measurement or measurements at WTRU 510. If admission control is successful, or if QoS renegotiation is triggered is successful, then the WTRU 510 may send link establishment request message 530. Link establishment request message 530 may include any or all of a source L2 ID of the WTRU or WTRUs to which a unicast and/or multicast link is being requested; a multicast ID for a multicast link that is being requested; a source L2 ID of the WTRU transmitting the link establishment request; QoS related information; information regarding a proposed AS configuration for the link or the SL bearer to be established; information regarding a capability or capabilities of WTRU 510; information required at the peer WTRU or WTRUs (e.g., WTRU 520) to perform link and/or bearer admission control; and/or an embedded upper layer message or messages and/or information for upper layer link establishment.

QoS related information that is included in link establishment request message 530 may include QoS information of the link (e.g., a VQI or VQIs associated with the bearers which will be established). Alternatively, the link may be established prior to any QoS related information being provided, in which case, the AS layer may determine whether link establishment is possible, based only on proximity information. Alternatively, in the absence of any QoS information from the upper layers regarding flow information, the AS layer may determine the associated QoS information (e.g., a VQI or similar) to be used for the signaling connection between the WTRUs. Such default or signaling VQI may be configured, preconfigured, or determined by the WTRU based on Channel Busy Ratio (CBR), carrier bandwidth (BW), bandwidth part (BWP), or similar physical layer parameters or measurements.

Information required to perform link and/or bearer admission control that is included in link establishment request message 530 may include information indicating a gNB and/or PLMN in which WTRU 510 is camped/connected; an area ID of the SI currently being used by WTRU 510; location information regarding WTRU 510 (e.g., geolocation information, a zone ID, etc.), and/or motion-related information (e.g., speed, heading, an identification of a head WTRU such as scheduling WTRU or platoon leader, an indication of whether the WTRU is part of a platoon or group-based scheduling; QoS-related measurements measured by WTRU 510, and/or QoS-related metrics measured by WTRU 510.

Information related to upper layer link establishment that is included in link establishment request message 530 may include upper layer QoS and/or service related information. Such information may be included in a transparent (e.g., encapsulated) message and delivered directly (e.g., without decoding the message) to the upper layers by WTRU 520. Such information may include information necessary for QoS renegotiation, as discussed herein. In another example, link establishment request message 530 may include a PC5 protocol or NAS protocol establishment message, submitted to the lower layers by upper layers to initiate a connection establishment, where the message may be carried as the payload of an RRC message which serves as a connection establishment request.

Link establishment request message 530 may include information regarding a proposed AS configuration for the link or the SL bearer that will be established, the signaling connection may itself be associated with a default SL bearer configuration. Further descriptions of the potential parameters associated with the AS configuration are provided herein.

In some examples, WTRU 510 may determine the AS configuration for the SL bearer to be established based on various parameters/information, such as CBR measurements; Sensing results performed over a configurable time period prior to sending the link establishment request; Admission control results determined at WTRU 510 based on the requested QoS of the bearer or based on a determined QoS of the signaling-only connection; and/or measurements (e.g., RSRP) of transmissions from WTRU 520, assuming a discovery process was initiated prior to link establishment request 520. Alternatively, such measurements may be taken after link establishment and may be used to update parameters or send a failure indication in link establishment confirmation message 550.

WTRU 510 may transmit reference signals along with (e.g., within the message, e.g., at the PHY layer) link establishment request message 530. Alternatively, WTRU 510 may begin a repeating periodic transmission of a reference signal after transmitting link establishment request message 530.

A link establishment request, such as link establishment request message 530, may be sent using a broadcast L2 destination ID. In such a case, the receiving WTRU (e.g., WTRU 520) may determine if it is the intended recipient of the link establishment request by decoding the L2 address included in the link establishment request RRC message. Alternatively the link establishment request may be sent using the source ID of WTRU2 as the destination ID of the message in the MAC header and/or sidelink control information (SCI). For example, in the case of multicast link establishment, the link establishment request RRC message may contain the list of L2 source IDs of the WTRUs to be associated with the multicast link. The MAC header and/or SCI may contain a broadcast ID associated with the service, or may contain a dedicated broadcast L2 ID associated with RRC signaling.

After receiving link establishment request message 530 (e.g., based on receiving message 530), the WTRU 520 may perform admission control using measurements at WTRU 520. WTRU 520 may also perform admission control using measurements at the WTRU 510, e.g., as provided in the link establishment request message 530. If admission control is not successful, WTRU 520 may perform a QoS renegotiation procedure as discussed herein. In either the admission control or QoS renegotiation case, WTRU 520 may transmit a link establishment response message 540 to WTRU 510. Link establishment response message 540 may include any or all of an acknowledgement or rejection of the link; an indication of success or failure in applying a configuration suggested by WTRU 510; an alternative suggested AS configuration; alternative suggested QoS parameters for the link; a response message (e.g., using the NAS or PC5 protocol) embedded in the RRC message; and/or capability information regarding WTRU 520.

In some examples, an alternative suggested AS configuration may be included in link establishment response message 540 if an AS configuration proposed in link establishment message 530 is not supported by WTRU 520, or does not ensure that a QoS is met. In another example, if the proposed configuration is supported, WTRU 520 may still propose an alternative configuration (e.g., to support better QoS. This may be requested by higher layers during the establishment procedure). If WTRU 510 rejects the alternative configuration, the initial proposed configuration may be used instead.

In some examples, an alternative suggested QoS parameter or parameters for the link may be included in link establishment response message 540 where WTRU 520 fails admission control and informs its upper layers. In response, the upper layers may provide a new QoS parameter or parameters, which may be provided to WTRU 510 in the link establishment response message 540 (e.g., either in a RRC message, or as part of a NAS/PC5 message embedded in the RRC message).

In some examples, WTRU 520 may perform its own admission control, as measured at the location of WTRU 520. WTRU 520 may also or alternatively make a reachability determination based on reference signals transmitted by WTRU 510. Without loss of generality, the link establishment response message 540 may also contain the contents described in the link establishment request message 530.

After receiving link establishment response message 540 (e.g., based on receiving message 540), WTRU 510 may transmit a link establishment confirmation message 550 to WTRU 520 which confirms or rejects AS configuration changes proposed in link establishment response 540. At or prior to the transmission of link establishment confirmation message 550, WTRU 510 may inform its upper layers of the successful establishment of the unicast link requested in link establishment request message 530. Link establishment confirmation message 550 may include the AS layer configuration of the unicast and/or multicast link, if link establishment was successful. After reception of link establishment confirmation message 550, WTRU 520 may inform its upper layers of the successful establishment of the unicast link between WTRU 510 and WTRU 520. Without loss of generality, link establishment confirmation message 550 may also contain the contents described in the link establishment request message 530.

The various messages described above may include a combination of upper layer messages and RRC messages. For example, each message may be an upper layer message (e.g., a message sent between the NAS, Application, and/or V2X layer entries, and not interpreted or decoded by lower layers) which includes a lower-layer portion. In another example, one or more messages may be upper layer messages, and one or more messages may be lower layer messages.

In some examples, WTRU 510 may transmit the link establishment request to WTRU 520 using a PC5-S (i.e., upper layer) message (e.g., as link establishment request 530). WTRU 520 may receive the message and trigger lower layers (e.g., the AS layer) to begin an admission control procedure, as well as trigger an RRC message sending link establishment response message 540. In response to the link establishment response message 540, The WTRU 510 RRC may perform an admission control procedure and transmit a he link establishment confirmation message 550 as an RRC message. After a successful admission control procedure at each of WTRU 510 and WTRU 520, and/or reception of the corresponding RRC message at WTRU 510 and WTRU 520, the WTRU's RRC may inform the upper layers of successful AS-link layer establishment, after which, the upper layers may initiate a security establishment procedure (e.g., similar to LTE PC5-based authentication and security establishment). If the upper layer authentication procedure is successful, the upper layers may inform the lower layers of successful link establishment at the upper layers, and may provide the lower layers with security keys to be used for messages transmitted by the AS over the secure link.

SLRB configuration may comprise L1 and/or L2 configurations and/or configurations for a flow to bearer mapping. L1 and/or L2 configurations may include, but are not limited to, a HARQ configuration; BWP configuration; a number of carriers and/or specific carriers usable for the unicast and/or multicast link; LCH/LCG configuration; RS resource configuration; configuration of a resource pool or resource pattern/signature usable by WTRUs communicating over the unicast and/or multicast link; feedback configuration, such as CQI reporting configuration, associated transmit power, and the like; monitoring configuration, such as rules for determining link failure and/or failure to maintain QoS as described herein (e.g., a representative sensing configuration or conditions for failed sensing); and/or preemption resource configuration.

In some examples, a WTRU may determine whether to perform admission control during and/or after link and/or SLRB establishment, or whether admission control is to be performed by the other WTRU or WTRUs in the unicast and/or multicast link. This determination may be made by the peer WTRU during the unicast and/or multicast link. Alternatively, the initiating WTRU may make this determination and may signal the result of the determination to the peer WTRU to indicate that the initiating WTRU will perform admission control. Such decision may be based on an indication by upper layers; based on NW configuration or pre-configuration; and/or based on the received power of a message (e.g., a discovery message, or the link establishment message) received from the other WTRU. In some cases where the decision is based on an indication by upper layers, the upper layers of the initiating WTRU may determine whether admission control is to be performed by the peer WTRU and may signal the result of this determination either explicitly in inter-layer signaling, may signal the result of the determination implicitly (e.g., via the inclusion and/or size of a PDU to be transmitted by the initiating WTRU to the peer WTRU as part of the link establishment), or the peer WTRU may determine the need for admission control based on the presence and/or size of the PDU in the AS-layer message.

A WTRU which determines that admission control is to be performed at the peer WTRU may also include information associated with admission control into the RRC messages related to link establishment and/or AS-layer reconfiguration. Such information may include QoS information (e.g., VQI); rules and/or configuration information associated with admission control; and/or upper layer information (e.g., user info, application layer information, QoS, etc.), which may be in the form of a PDU provided by upper layers during initiation of a link establishment by the upper layers.

A WTRU may maintain the admission control enablement state (i.e., whether the WTRU is to perform admission control) that was determined during link establishment for the duration of the link. Alternatively, a WTRU may change its admission control enablement state (e.g., the WTRU may assume that it is to perform admission control) a trigger occurs. Example triggers include where the WTRU velocity increases beyond a threshold; where the received power of a message from the other WTRU or WTRUs falls below a threshold, and/or the distance between the WTRUs in the link exceeds a threshold, where such distance may be computed based on the reception of geographical information transmitted by the peer WTRU(s) associated with the unicast link (e.g., a zone ID transmission in the SCI, or a dedicated RRC message for exchange of geolocation information between two WTRUs);

Some examples include a configuration negotiation between WTRUs. FIG. 5 is a message sequence chart which illustrates an example sidelink link establishment procedure at the AS layer between WTRUs. In some examples, an AS-layer configuration may be selected which meets the required link QoS and does not exceed the AS layer capabilities of either WTRU. Such negotiation may be performed as part of the request/response/confirm (3-step) signaling procedure as discussed above, as exemplified by the procedure 500 as shown and described with respect to FIG. 5. In some examples, the WTRU whose upper layer initiated a link establishment may perform the configuration selection. In some examples, the WTRU receiving the connection establishment request message from the WTRU whose upper layers initiated the link establishment may perform the configuration selection. Alternatively, both WTRUs may be associated with configuration selection (e.g., the initiating WTRU makes the initial selection and the peer WTRU makes the alternate selection).

A WTRU may select one or more AS-layer configurations with which the unicast and/or multicast link is to be established, based on the QoS of the links to be established; based on the capability of one or more of the WTRUs; based on a measurement of the current sidelink resource usage, as measured by the WTRU; and/or based on the exchange of the aforementioned information and/or preferred configuration between WTRU(s) associated with link establishment.

In some cases where the WTRU selects the AS-layer configurations based on the QoS of the link to be established, for example, a link may be associated with a VQI provided by upper layers. Such VQI may further be associated (e.g., by a configuration or preconfiguration) with one or more AS layer configurations. Which AS layer configuration or configurations to use for each VQI may further depend on CBR, CR, or similar measurements of channel utilization at the WTRU; the number of carriers supported for the unicast link (e.g., where the number of carriers supported may depend on capability of either WTRU, or may depend on the carriers configured for the service for which the unicast and/or multicast link will be established); BWP (e.g., the size of the current SL BWP); and/or the allowable resources (e.g., the resource pool or pools configured or usable by the WTRU for unicast link establishment).

In some cases where the WTRU selects the AS-layer configurations based on the capability of one or more of the WTRUs, for example, a WTRU may be limited to the use of a subset of AS configurations or may be limited in a particular element of an AS configuration if any of the WTRUs associated with the link establishment do support a configuration or elements of a configuration. This may be determined at the time of link establishment (e.g., based on the number of carriers, resource selection mode, configuration of the reference signal (RS) location/pattern/power, etc., at the time of link establishment).

In some cases where the WTRU selects the AS-layer configurations based on the currently measured resource usage, for example, the WTRU may select from one of a number of AS-layer configurations based on measurements of the current sidelink resource usage, e.g., in order to avoid conflict with currently utilized resources.

Some examples provide different options for AS-configuration selection during link establishment between an initiating WTRU (e.g., the WTRU that receives the indication from upper layers to initiate connection establishment) and the peer WTRU (e.g., the WTRU that receives an AS-layer or upper layer connection establishment message over SL from the initiating WTRU).

In some examples, the initiating WTRU may determine an AS configuration to use based on QoS requirements (e.g., VQI) received from upper layers or from the network. This determination may be based on a network provided configuration or preconfiguration (e.g. stored at the WTRU) mapping of VQI to AS configuration, the AS-layer capability of the WTRU, as well as selection of specific resources for configuration which minimize and/or avoid collision, conflict, and/or interference with existing unicast links (e.g., avoidance of RS patterns, preemption resources, and the like, which are already being used by other WTRUs or links). The determination may also be made as part of an admission control procedure, such as the examples discussed herein. After the WTRU selects an AS configuration, the WTRU may send the selected AS configuration to the peer WTRU using AS layer signaling. This signaling may be included in the link establishment signaling. The peer WTRU may receive the selected AS configuration and may accept the configuration or may select an alternative configuration based on criteria similar to the selection criteria described above. The peer WTRU may decide to select an alternative configuration, for example, because the initially selected configuration cannot be met given the capabilities of the peer WTRU (e.g., number of SL carriers, etc.) satisfying the QoS based on measurements taken at the location of the peer WTRU. The alternate configuration, or an indication accepting the initial configuration, may be sent in a link establishment response. If a WTRU receives a link establishment response with an alternate configuration, the WTRU may determine whether to accept the configuration and send a link establishment confirmation message to the peer WTRU, or to reject the configuration and send a link establishment rejection message to the peer WTRU. In either case, either or both WTRUs may inform the upper layers of the result.

In some examples, the initiating WTRU may determine a set of AS-layer configurations using similar selection criteria as the above scenario and may send the set of selected AS-layer configurations (e.g., configurations, or and indication of which configurations) to the peer WTRU. The peer WTRU may select one AS-layer configuration from the provided list and may transmit an indication of this selection in the link establishment response or may transmit a failure indication if none of the selected configurations allow the peer WTRU to meet the required QoS at the location of the peer WTRU or none of the selected configurations align with the capabilities (e.g., support for different features, parameter settings at the AS layer, such as HARQ, which HARQ parameters are supported, power control parameters, etc.) of the peer WTRU.

In some examples, the initiating WTRU may determine an AS-layer configuration using selection criteria as described above and herein, and may send the selected AS-layer configuration, or an indication of the selected AS-layer configuration, to the peer WTRU. The peer WTRU may determine whether the selected AS-layer configuration meets the QoS requirements provided by the upper layers (e.g., based on measurements and/or admission control at the location of the peer WTRU), and/or requirements for WTRU capabilities. If the AS-layer configuration meets the QoS and/or capabilities requirements at the peer WTRU, the peer WTRU may send a success indication in the response message. If the AS-layer does not meet the QoS requirements and/or does not support required capabilities, the peer WTRU may provide its own capabilities, QoS and/or admission control-related measurements to the initiating WTRU in the response message. After receiving such measurements and/or capabilities, the initiating WTRU may reselect an AS-layer configuration, based on the measurements and/or capabilites, which meets the QoS and/or supports required capabilities at both WTRUs and may provide this new AS-layer configuration to the peer WTRU in the link establishment confirmation message. Depending on whether an appropriate configuration can be selected or not, either WTRU, (or both WTRUs) may inform its upper layers of the success or failure of the link establishment procedure.

In some examples, the initiating WTRU may send its capabilities and/or QoS-related measurements to the peer WTRU. The peer WTRU may perform AS-layer configuration selection based on its own capability-related and/or QoS-related measurements, and/or based on as capability-related and/or QoS-related measurements received from the initiating WTRU. The peer WTRU may send the selected AS-layer configuration to the initiating WTRU in a link establishment response message. The initiating WTRU may accept or reject the selected configuration and may indicate the acceptance or rejection in a link establishment confirmation.

In the examples described above, QoS-related measurements may include any of the measurements described herein, for example, including measurements used for admission control as further described herein.

In some examples, a WTRU may determine whether to transmit its capability information to another WTRU (e.g., during link establishment signaling) based on whether it has transmitted such information in the past. For example, a WTRU may determine to include its capability information in AS-layer signaling based on whether it has transmitted its capability information to the same WTRU in the past, (e.g., where such WTRU may be identified by its L2 source ID, NW controlled ID (e.g. I-RNTI, S-TMSI, C-RNTI) or combination), based on whether it has transmitted its capability information to the same WTRU within a predefined time period in the past; and/or based on whether its capabilities have changed since the last transmission of its capability information to the same WTRU. A WTRU may omit transmission of its WTRU capabilities when performing link establishment to a WTRU to which it previously transmitted its capabilities (e.g., assuming such capabilities did not change).

A WTRU may be configured to store the capability information of another WTRU after a unicast link with the WTRU is terminated. The WTRU may receive such capability information during sidelink link establishment. A WTRU may be configured to perform selection of an appropriate AS-layer configuration or link establishment based on stored capability information. The WTRU may determine that it should use stored capability information if link establishment signaling from the other WTRU does not contain its capability information.

A WTRU may be configured to delete or clear any stored capability information for another WTRU based on one or more triggers, such as expiry of a timer; an indication from upper layers; reception of new capability information for the same WTRU; and/or movement between different coverage scenarios, such as between in-coverage and out-of coverage, or between coverage of different gNB and/or PLMN and/or RAT.

Some examples include updating an AS-layer configuration. In some examples, a WTRU associated with a unicast and/or multicast link may initiate an AS-layer reconfiguration of a specific unicast and/or multicast link. For example, a WTRU may initiate a reconfiguration of one or more AS-layer parameters associated with a link based on one or more triggers, such as a link monitoring failure; change of CBR measured at the WTRU; reception of a preemption for the unicast and/or multicast link; indication from upper layers; and/or determination that a WTRU has exceed its radio capabilities.

In some cases where the trigger includes a link monitoring failure, in some examples, a WTRU may determine that the required QoS for a link is no longer met, and may initiate an AS-layer configuration update procedure based on that determination; In another example, after the link monitoring failure, the WTRU may determine that an alternate AS-layer configuration may be selected which satisfies the required QoS (e.g., the WTRU may determine whether a different configuration that satisfies QoS is available). In some examples, after the link monitoring failure, the WTRU may negotiate a new or alternate QoS with upper layers and may perform an AS-layer reconfiguration to satisfy the new QoS for the unicast and/or multicast link.

In some cases where the trigger includes a change of CBR measured at the WTRU, in some examples, a WTRU may be permitted, configured, or preconfigured to use a specific AS-layer configuration for a specific range of CBR, in which case a change of CBR to a value outside of that configured range may trigger reselection of the AS-layer configuration.

In some cases where the trigger includes a reception of a preemption for the unicast and/or multicast link, in some examples, a WTRU may receive a preemption for the unicast and/or multicast link which provides further information regarding conflicting static resources (e.g., via a reference signal, feedback channels, etc.) or regarding the limitation of utilized resources (e.g., a pool, pattern, amount of resources, etc.). The WTRU may determine to perform AS-layer reconfiguration of the unicast link to facilitate continued operation with acceptable or sub-optimal QoS, while avoiding the conflicts indicated in the preemption signal.

In some cases where the trigger includes an indication from upper layers, in some examples, a WTRU may receive an indication from the upper layers to modify the QoS requirements (e.g., VQI) associated with a specific unicast and/or multicast link and/or SLRB. Such indication may include an addition of a new QoS flow to be mapped to the same unicast and/or multicast link and/or SLRB.

New AS-layer configurations may be determined following a negotiation procedure similar to those described herein for initial link establishment.

In some examples, a WTRU that initiates an AS-layer reconfiguration may transmit a reconfiguration request message over sidelink. The reconfiguration request message may include one or more selected AS-layer configurations (e.g., configurations or indications of such configurations) for the peer WTRU; may include new and/or updated capability information for the peer WTRU; and/or may include QoS-based measurements for the peer WTRU. The peer WTRU may transmit a reconfiguration response message to the initiating WTRU. The reconfiguration response message may include one or more selected or alternate AS-layer configurations for the peer WTRU; may include new and/or updated capability information for the initiating WTRU; may include QoS-based measurements for the initiating WTRU; and/or may include an indication of acceptance or failure of the selected AS-layer configuration to the peer WTRU. In response, the initiating WTRU may transmit a reconfiguration confirmation message. The reconfiguration confirmation message may which may confirm, or indicate failure of, the AS-layer reconfiguration procedure; and/or may include a selected or alternate AS-layer configuration (e.g., configuration or indication of such configuration) to be used. In some cases where the AS-layer reconfiguration procedure fails, the WTRU may perform actions related to releasing the unicast and/or multicast link or SLRB, as described herein.

Successful link establishment at a WTRU may be considered to have completed at any of various time instants, possibly depending on whether the WTRU in question is the initiating WTRU or the peer WTRU. For example, successful link establishment may occur upon transmission of the link establishment confirmation message, or upon transmission of the last RRC message associated with the establishment/reconfiguration RRC procedure; upon reception of the link establishment confirmation message, or reception of the last RRC message associated with the establishment/reconfiguration RRC procedure; reception of an acknowledgement of the link establishment confirmation message, or the reception of an acknowledgement of the last RRC message associated with the establishment/reconfiguration RRC procedure; transmission of a successful link establishment response message (e.g., response or reconfiguration response); reception of a successful response message (establishment response or reconfiguration response); and/or reception of an acknowledgement of a successful link establishment response message (establishment response or reconfiguration response).

A WTRU (e.g., initiating or peer) may perform any or a combination of actions at (e.g., exactly at or a time following) successful establishment and/or reconfiguration of a unicast and/or multicast link or SLRB, or may be performed at a different time instants during the link establishment procedure. Such actions may include, for example, informing upper layers of the completion of link establishment at the AS layers; indicating to the upper layers to initiate an upper layer authentication and security association; initiating a security information exchange at the AS layer (which may include security information provided by upper layers and transparently carried in an AS layer message); starting or restarting transmission of RS based on the AS-layer configuration; starting or restarting reception of RS and/or transmission of SL CQI based on the AS-layer configuration; initiating transmission of UMUS, e.g., as described herein; initiating a resource reservation signal transmission (e.g., via an SCI) e.g., for an arbitrary resource; initiating a resource selection or reselection procedure (e.g., taking into account newly established logical channels associated with the unicast link or SLRB and/or service requirements of the flows associated with the SLRB); and/or initiating transmission of a group-based resource reservation procedure.

Some examples include actions relating to release of a unicast and/or multicast link or SLRB. For example, the WTRU may perform one or more of various actions during release of a unicast and/or multicast link or SLRB. Such actions may include releasing all unicast resources related to a unicast link or SLRB, such as dedicated channels (e.g. a dedicated feedback channel), resource pools, reference signal resources, preemption resources, and any or all other resources which may be part of the AS-layer configuration specific to the unicast and/or multicast link; stopping transmission and/or reception of any RSs, RLM signals, or similar signals, that are associated only with the unicast and/or multicast link or SLRB being released; cancelling any ongoing resource selection procedures that are associated with the unicast link and/or SLRB being released; triggering a SL resource reselection procedure, e.g., taking into account the current data in SL buffers without the logical channels associated with the SLRB; transmitting the remaining data in the buffers associated with the SLRB using an SL broadcast mechanism (e.g., changing the L2 destination address to a broadcast destination address associated with the service, rather than the L2 source address of the destination WTRU); triggering an immediate broadcast of a UMUS message or a UMUS cancellation message to indicate release of resources associated with the unicast link and/or SLRB; informing upper layers of the release (e.g., in some cases where the release is initiated by the lower layers, such as preemption); and/or, transmitting an RRC release message or RRC failure message to the other WTRU or WTRUs associated with the unicast and/or multicast link or SLRB.

In some cases where the action includes transmission of an RRC release message or RRC failure message to the other WTRU or WTRUs associated with the unicast and/or multicast link or SLRB, if the upper layers inform the WTRU of the release of an SLRB, the WTRU may transmit a sidelink release message, and the WTRU may maintain the link (e.g., resources, etc.) until it receives an acknowledgement of the release message from the peer WTRU.

In some cases where the action includes transmission of an RRC release message or RRC failure message to the other WTRU or WTRUs associated with the unicast and/or multicast link or SLRB, if the release is initiated by the failure of an AS-reconfiguration procedures, the WTRU may transmit a release message (i.e., if reconfiguration failed at the initiating WTRU) or may transmit a reject or failure response to a request RRC message (i.e., if reconfiguration failed at the WTRU receiving a reconfiguration request message, or reconfiguration response message).

In some examples, a WTRU may perform actions related to the release of a unicast and/or multicast link or SLRB as a result of one or more triggers. Such triggers may include an explicit indication from the upper layers or AS layer to release a flow, set of flows, unicast and/or multicast link or SLRB (e.g., the upper layers may indicate a release of a flow or set of flows, and no remaining flows may be carrier by the SLRB, in which case, the WTRU may initiate actions related to the release of the SLRB); a failed AS-layer link monitoring procedure, possibly if followed by failed QoS renegotiation procedure and/or failed AS-layer reconfiguration procedure; a reception of a preemption indication for a specific flow or SLRB from another WTRU; a reception of a SL release message or reject message; and/or a failed AS-layer reconfiguration procedure.

In some cases where the trigger includes a failed AS-layer reconfiguration procedure, a WTRU may initiate a failed AS-layer reconfiguration procedure if it detects a QoS monitoring failure and cannot renegotiate new QoS parameter or parameters with upper layers and/or cannot determine a new AS-layer configuration which meets the currently configured QoS parameter or parameters for the SLRB. In some cases where the trigger includes a failed AS-layer reconfiguration procedure, a WTRU may initiate a failed AS-layer reconfiguration procedure if it receives a reconfiguration request message over sidelink and cannot apply the proposed AS-layer configuration and/or cannot renegotiate a new QoS parameter or parameters with upper layers and/or cannot determine a new AS-layer configuration which meets the currently configured QoS parameter or parameters for the SLRB. In some cases where the trigger includes a failed AS-layer reconfiguration procedure, the WTRU may initiate a failed AS-layer reconfiguration procedure if it receives an AS-layer reconfiguration response message with a new AS-layer configuration and cannot apply the proposed AS-layer configuration and/or cannot renegotiate a new QoS parameter or parameters with upper layers and/or cannot determine a new AS-layer configuration which meets the currently configured QoS parameter or parameters for the SLRB.

Some examples include a SL release message. For example, a WTRU may perform transmission of a SL release message following one or more triggers, such as the example triggers described above. In some examples, the SL release message may be an RRC message defined for that purpose. In some examples, the SL release message may be an upper layer message (e.g., a NAS or PC5-C message) included in a generic RRC message (e.g., a transparent container), or a SL data message. The SL release message may contain information regarding a QoS flow and/or an SL bearer index of the flow or SLRB to be released; a cause of the release; the L2 ID or IDs of the WTRU or WTRUs to be released from a link (e.g., in the case of a multicast link, a SL release message may release only a subset of the WTRUs); a timescale associated with the release (e.g., an amount of time during which the WTRU or WTRUs cannot initiate a new link establishment, and/or an amount of time after which the WTRU(s) should re-establish the same link with similar QoS); and/or an indication to continue the unicast and/or multicast link on a different carrier or set of carriers and the specific carrier.

If the SL release message is sent using RRC signaling, the WTRU may inform upper layers of the release and may initiate actions associated with release of an SLRB. If the SL release message is sent using an upper layer message (e.g., embedded in an RRC message or SL data), the WTRU AS may receive a release indication from the upper layers after the upper layers process the release.

Some examples include an upper layer SL bearer establishment or bearer reconfiguration. For example, a WTRU may initiate a new bearer establishment, or a reconfiguration of an existing bearer based on one or more triggers. Such triggers may include an upper layer indication of the initiation of a new QoS flow, where the WTRU decides to map the flow to an existing bearer or a new bearer; an upper layer indication of the termination of a flow, where the WTRU may perform reconfiguration of a bearer; and/or an upper layer indication of the change of the source and/or destination L2 ID or IDs of an existing link, where the WTRU may associate the new L2 IDs with existing bearer. A WTRU may use the same or similar signaling as above and herein for establishment of the new bearer. In some examples, the WTRU may use the same or similar signaling as above and herein for establishment of the new bearer without the steps associated with reachability determination.

Some examples include gNB controlled link establishment signaling. In some examples of gNB controlled link establishment, signaling may be similar to the WTRU autonomous case, with some differences.

Figure 6:
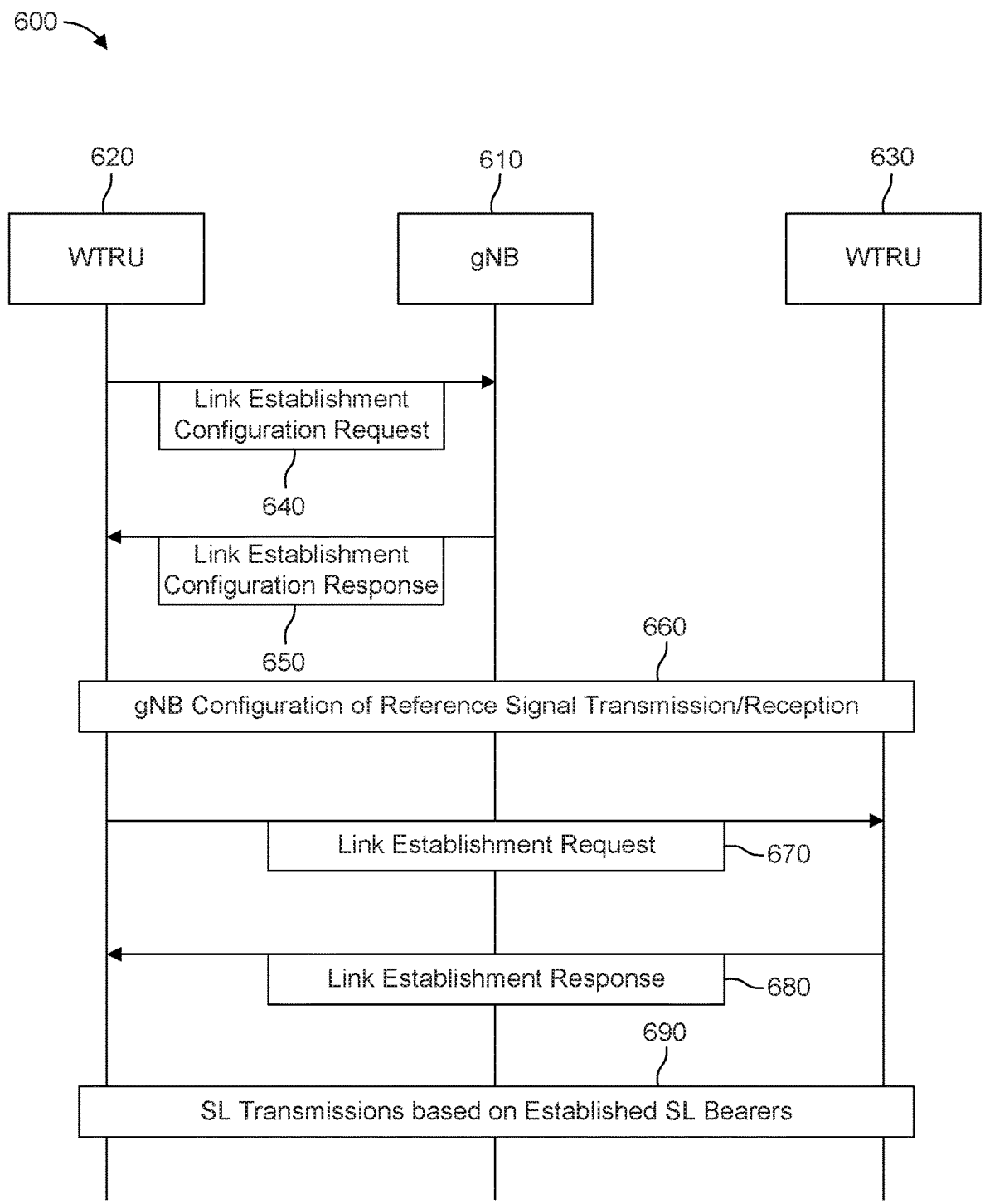
FIG. 6 is a message sequence chart which illustrates example multicast link establishment signaling and decision criteria.

FIG. 6 is a message sequence chart which illustrates an example procedure 600 for gNB controlled link establishment. Example procedure 600 includes WTRU 610 transmitting a link establishment configuration request message 640 to gNB 630, which responds with a link establishment configuration response message 650. After link establishment configuration response message 650 is received by WTRU 610, gNB configuration of reference signal transmission and reception is performed in step 660. After step 660, WTRU 610 transmits a link establishment request message 670 to WTRU 620, which responds with a link establishment response message 680. After link establishment response message 680 is received by WTRU 610, SL transmissions based on the established SL bearers commence between WTRU 610 and WTRU 620 at step 690.

WTRU 610 may determine the AS layer configuration to be sent in the link establishment request message 670 using signaling with gNB 630 (e.g., in a link establishment configuration request message 640, and/or in a link establishment configuration response message 650). WTRU 610 may send the VQI for the link and/or bearer to gNB 630 for use by gNB 630 in determining the configuration. WTRU 610 may also send measurements performed by WTRU 610 of the discovery responses transmitted by WTRU 620 during previous discovery signaling.

In another example, configuration of the reference signals for reachability detection may be under gNB control. This may be so whether the reachability detection is performed before or after Link Establishment Configuration Request message 640.

Some examples may include signaling to establish a multicast link. Establishment of a multicast link may require knowledge of some or all of the connectivity between multiple/all pairs of WTRUs.

In some examples, a source WTRU may reserve resources for multiple WTRU transmissions/responses. For example, a WTRU may broadcast a request message which schedules the timing and/or reserves the resources for a response message from multiple WTRUs. The request message may be a link establishment configuration request message transmitted by the WTRU. Such message may include the information described herein (e.g., regarding link establishment in the unicast case). The request message may also contain other information, such as an indication of the reserved time, frequency, and/or beam resources for one or more response messages; an indication of which WTRUs should respond to the request message; an indication of an order of transmission of the WTRUs for transmission of the response message; a contention resolution rule to resolve contention between the WTRUs for transmission of the response message; and/or an request for a connectivity report, e.g., as further discussed herein.

The source WTRU may perform resource reservation for multiple response messages. For example, the source WTRU may select multiple distinct time and/or frequency resources to be used by other WTRUs to respond to the request message. The source WTRU may reserve such resources by transmitting one or more reservation signals to the responding WTRUs. Such reservation signal or signals may be transmitted over a Physical Sidelink Control Channel (PSCCH) (e.g., as an SCI), or may be transmitted by upper layers (e.g., MAC or RRC). A WTRU may transmit the reservation for the response messages in combination with the reservation or indication of the PSSCH transmission of the request message. For example, a WTRU may perform resource selection for an initial transmission (e.g., to use for transmission of the request message) as well as for N response message transmissions, after which the WTRU may transmit an SCI which indicates the time, frequency, and/or beam resources used for the request message; indicates the decoding parameters (e.g., MCS) for the PSSCH transmission containing the request message; and/or indicates N (potentially distinct) time, frequency, and/or beam resources to be used by N different WTRUs transmitting response messages along with their SCI.

A source WTRU may also transmit transmission parameters required for response messages to the responding WTRUs. In such cases, the responding WTRU may transmit a limited size SCI which includes only a reservation signal, or may transmit no SCI at all.

A WTRU that receives a message providing resources for a response message may determine the specific timing of its own response message. The timing determination may be based on an explicit ordering of the responding WTRUs in the request message (e.g., to use the a particular one of a plurality of reserved resources); an implicit ordering based on WTRU ID (e.g., source L2 ID, C-RNTI, group ID, or similar); and/or an implicit ordering based on information from the application layer and/or NAS layer. For example, the receiving WTRU may determine from the upper layers whether it should respond to the request message, and if so, which of the response resources to use based on an ordering provided by the application layer.

In some examples, a responding WTRU may monitor and/or measure response messages from other responding WTRUs. A WTRU that receives a request message soliciting a response may also monitor response messages from other WTRUs as per the resources scheduled by the request message. The WTRU may perform measurements of the quality of the response message transmitted by each WTRU. For example, the WTRU may measure the quality of the response message based on a reference signal transmitted by each WTRU within the response resources.

A WTRU may maintain a list of quality measurements for each responding WTRU, and the WTRU may transmit a "connectivity report" which includes a list of WTRU responses that the WTRU was able to decode, e.g., along with WTRU ID and measured quality (e.g., RSRP, RSRQ, SINR, etc.); and/or a measured quality of the source WTRU (e.g., based on the transmitted request message and/or reference signals).

In some examples, a source WTRU may determine the members of a multicast group based on a received connectivity report. For example, a WTRU which receives connectivity reports may determine the WTRUs to be included in the multicast group, e.g., based on information such as whether a measurement between two WTRUs are above a specific threshold; and/or a requirement (e.g., from the application layer) that one WTRU needs to transmit to another WTRU. The WTRU which receives connectivity reports may indicate to upper layers which WTRUs will be considered to be included in the multicast group. The WTRU which receives connectivity reports may send a confirmation message to the other WTRUs, which may include an L2 ID to be used as the destination address for the group communication. After receiving the confirm message, a WTRU may inform upper layers that it has joined the multicast group (e.g., using a specific L2 address) if its own source WTRU ID is included in the confirmation message.

In some examples, the decision of to whether to establish a multicast group may be based on the number of WTRUs in the potential group. For example, a WTRU may decide whether to initiate and/or maintain an AS-layer groupcast communication for a group (e.g., following a request from upper layers, or upon receipt of a packet with a specific L2 destination ID) based on the number of WTRUs in the group. A WTRU may be provided with the number of WTRUs in the group directly from the upper layers. Alternatively, a WTRU may determine the number of WTRUs in the group based on the number of responses received from other WTRUs during link establishment signaling. A WTRU may be configured or preconfigured with a maximum number of WTRUs for which it may establish an AS-layer multicast group. This maximum number of WTRUs may depend on a measured CBR (e.g., a WTRU may consider a larger allowable multicast group when the measured CBR is lower); a measured pathloss or relative pathloss between any two WTRUs (e.g., a WTRU may determine the maximum number of WTRUs based on the maximum measured pathloss between two WTRUs, or a WTRU may determine that an AS-layer groupcast can be initiated or maintained when the maximum pathloss between any WTRUs in the group is below a threshold); and/or an expected QoS of the multicast link (e.g., any of the thresholds or criteria discussed above may be further modified based on the expected QoS of the link, such as where a WTRU may be configured with different thresholds associated with different VQI to be supported on the multicast link).

Figure 7:
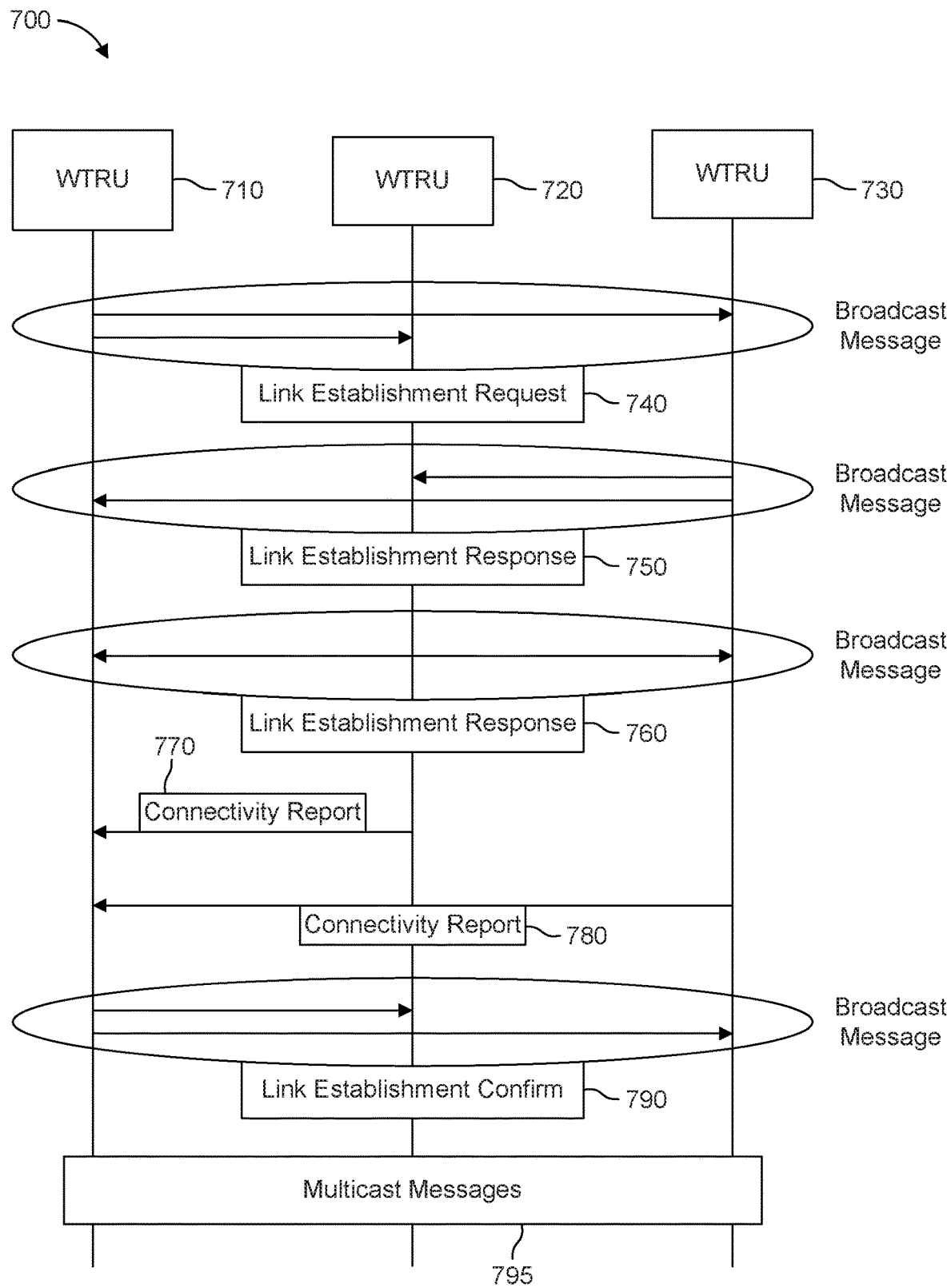
FIG. 7 is a message sequence chart which illustrates example multicast link establishment signaling.

FIG. 7 is a message sequence chart illustrating an example multicast link establishment procedure 700. Multicast link establishment procedure 700 includes a link establishment request 740 which is broadcast by WTRU 710 to WTRU 720 and WTRU 730, a link establishment response message 750 that is broadcast by WTRU 730 to WTRU 710 and WTRU 720, and a link establishment response message 760 that is broadcast by WTRU 720 to WTRU 710 and WTRU 730. After the link establishment request and responses, WTRU 720 and WTRU 730 transmit connectivity report 770 and connectivity report 780, respectively, to WTRU 710. After receiving connectivity report 770 and connectivity report 780 WTRU 710 broadcasts a link establishment confirmation message 790 to WTRU 720 and WTRU 730, after which multicast messages may commence among WTRU 710, WTRU 720, and WTRU 730 in step 795.

In procedure 700, the link establishment request and link establishment response messages are broadcast messages. The link establishment confirmation is also a broadcast message, and includes the WTRU IDs that are included in the group, and the destination address to be used for future multicast messages.

In some examples, a WTRU may determine a grouping of L2 IDs associated with multiple unicast links between the same WTRUs. For example, A pair of WTRUs may establish multiple unicast links between one another (i.e., multiple unicast links between the same pair of WTRUs), where the L2 IDs associated with each link (i.e., the source and destination) used by each WTRU are different. In some cases, it may be advantageous for the access stratum (AS) layer (at each WTRU) to be aware that the unicast links are actually between the same pair of WTRUs.

In some examples, a WTRU determines a grouping or association between different L2 source IDs used by a same peer WTRU. For example, a WTRU may determine that different L2 source and/or destination IDs associated with a unicast link at this WTRU are in fact associated with a same physical peer WTRU. The WTRU may group multiple destination L2 IDs to be used during transmission to different unicast links (i.e., the source L2 IDs of the peer WTRUs) together if the unicast link transmissions are associated with the same peer WTRU. A WTRU may group multiple source L2 IDs which it uses during transmission to different unicast links if the unicast links are set up with the same peer WTRU. A WTRU may maintain a single context associated with multiple unicast links which are grouped together using methods described below.

In some embodiments, a first WTRU in a potential group may learn, discover, or otherwise obtain knowledge of such associations among different L2 source IDs and/or among different L2 destination IDs through PC5-RRC signaling. Such PC5-RRC signaling may be associated with unicast link establishment (e.g., PC5 RRC signaling triggered during or after link establishment, such as a SL reconfiguration message). In some examples, a first WTRU may send an AS sidelink (SL) UE ID to a second WTRU during or following link establishment. In some examples, a WTRU may derive the AS SL UE ID based on a static or semi-static ID associated with the WTRU, such as an International Mobile Subscriber Identity (IMSI), Temporary Mobile Subscriber Identity (TMSI), Serving TMSI (S-TMSI), Globally Unique Temporary UE Identity (GUTI), Cell-Radio Network Temporary Identity (C-RNTI), etc; based on a randomly selected value; based on a value associated with its location and/or its selected resources; based on a value associated with its location and/or its selected resources; and/or based on a value associated with the WTRU's encoding of PSCCH and/or PSSCH and/or PSFCH.

For example, in some cases where the WTRU derives the AS SL UE ID based on a static or semi-static ID associated with the WTRU, the WTRU may send its IMSI to a peer WTRU to inform the peer WTRU that the unicast links are associated with the same pair of WTRUs. Similarly, the peer WTRU can also send its IMSI to the WTRU to inform the WTRU that the unicast links are associated with the same pair of WTRUs. In some cases where the WTRU derives the AS SL UE ID based on a randomly selected value, the WTRU may randomly select a number or ID from a subset of values and send the value, or a value based on that value, to the peer WTRU. Further, a WTRU may select such random value if it does not have a unicast link established. For example, a WTRU may select a random value for the first unicast link it establishes, and the WTRU may thereafter send the same selected value (or a value based on that value) for subsequent RRC links established. In some examples, a WTRU may delete the randomly selected value if it no longer has unicast links (e.g., if it no longer has any kind of unicast links) established at the WTRU. In some cases where the WTRU derives the AS SL UE ID based on a value associated with its location and/or its selected resources, the WTRU may send its current geolocation at the time of link establishment, or its current zone ID to its peer WTRU at the time of link establishment. In some examples, a WTRU may send an index to, or information of (e.g., time, frequency, beam, etc.) an associated resource selection procedure performed at some time. For example, a WTRU may send the index of the last time frequency resource that the WTRU reserved prior to link establishment. In some cases where the WTRU derives the AS SL UE ID based on a value associated with the WTRU's encoding of PSCCH and/or PSSCH and/or PSFCH, the value may include a value such as a scrambling code, an RS pattern, etc.

In some examples, a second WTRU in a potential group may receive a L2 source ID of the peer WTRU in PC5 RRC signaling or from upper layers (e.g., obtained during upper layer signaling between the WTRUs). In receiving such ID, a WTRU may determine whether such ID is associated with (or grouped with) another ID (i.e., for another unicast link) based on the AS SL UE ID received from the peer WTRU. For example, a WTRU may group the L2 IDs of the two unicast links if the WTRU receives an AS SL UE ID which matches an AS SL UE ID received from a peer WTRU that is associated with another ongoing unicast link at the WTRU; if the WTRU receives an AS SL UE ID associated with a geolocation which matches the last known geolocation of a peer WTRU associated with another ongoing unicast link at the UE; and/or if the WTRU receives an AS SL UE ID which indicates a time/frequency resource that was used by a peer WTRU with which the WTRU already has a unicast link established.

Such procedures for grouping L2 source IDs may be performed by either or both WTRUs. For example, a first WTRU may send its SL UE ID to a second WTRU during and/or after link establishment, and the second WTRU may determine whether to group the L2 ID for the unicast link with another L2 ID of an ongoing unicast link. Similarly, the second WTRU may send its own SL UE ID to the first WTRU (e.g. during and/or after the same link establishment procedure) and the first WTRU would perform a similar grouping determination.

In some examples, a WTRU may receive, from upper layers, an indication that an L2 ID of a peer WTRU (e.g., an L2 Source ID of the peer WTRU to be used as destination in its own transmission) is associated with another L2 ID previously provided by upper layers to the WTRU in another link establishment. A WTRU may receive various information from upper layers at various times.

For example, at T1 (i.e., the time of a first link establishment procedure initiated by upper layers), the WTRU may receive, from upper layers, an L2 source ID (ID1) of the peer WTRU for the unicast link with no association. Based on knowledge of the active unicast links, the WTRU may determine that it has only a single unicast link established with the peer WTRU. The WTRU may receive from upper layers ID1' as its own source ID for the unicast link, where ID1' may further be provided by upper layers.

In another example, at T2 (i.e., the time of a second link establishment procedure initiated by upper layers), the WTRU may receive, from upper layers, an L2 source ID (ID2) of the peer WTRU for the unicast link and an indication to associate it with another L2 ID (ID1). The WTRU may further receive from upper layers ID2' as its source ID for the unicast link with ID2. Based on the received ID2, ID2' and indication, the WTRU may group ID2 with ID1, and group its own ID2' and ID1' together.

In some examples, a WTRU may obtain an SLRB configuration for a specific PC5-5QI (PQI) and/or PC5 flow identifier (PFI) using on-demand SIB or dedicated signaling. For example, a WTRU may request the SLRB configuration associated with one or more PQI/PFI by a request to the network (e.g., to a gNB). In IDLE and/or INACTIVE mode, a WTRU may request the SLRB configuration using an on-demand SIB request. The WTRU may attach the PQI/PFI or other QoS parameters (e.g., range, GBR, etc.) to the on-demand request. The WTRU may trigger an on-demand SIB request following initiation of a flow which is not mapped to any SLRB that is part of the WTRU's SL configuration, and/or when the SL SIB does not broadcast the SLRB configuration associated with the flow. The WTRU may include, in the request, the PQI/PFI associated with the flow; the range value associated with the flow; the GBR associated with the flow; an index to a table giving all QoS parameters or the QoS profile, where such table may be predefined or configured or preconfigured; and/or a list of its current SLRBs which it has stored in its own configuration.

In some embodiments, a WTRU in CONNECTED mode may use a similar request for the SLRB configuration associated with one or more PQI/PFI using dedicated signaling. For example, a WTRU may send an RRC message (e.g., using a UESidelinkInformation) following initiation of a flow for which the WTRU does not have a mapping to a currently stored SLRB configuration.

In some examples, a WTRU's SLRB configuration and/or mapping of flow to SLRB may also or alternatively depend on measurements at the WTRU (e.g., CR, CBR, sensing results, CQI, etc.). For example, a WTRU may use a first configuration for an SLRB (or for a flow) if the measured quantity matches a first condition or conditions, and may use a second configuration for an SLRB (or for a flow) if the measured quantity matches a second condition or conditions.

In some examples, a WTRU uses a default SLRB configuration during the request for the SLRB configuration associated with one or more PQI/PFI. For example, a WTRU may use the default SLRB (i.e., map the new flow to the default SLRB) following initiation of a flow and there is no mapping of the flow to an SLRB in the WTRU's stored SLRB configuration. The default configuration may be configured, preconfigured, or predefined. The default configuration may be configured by the network, such as by a gNB. The default configuration may be preconfigured by a V2X preconfiguration at the WTRU. The default configuration may be predefined in the appropriate specification. After the WTRU receives a new SLRB configuration for the flow, the WTRU may move the flow from the default SLRB configuration to the newly received SLRB configuration. Alternatively, if the WTRU receives an indication that the new flow should be mapped to an existing SLRB (e.g., a SLRB stored in its stored configuration), the WTRU may move the flow from the default SLRB configuration to the indicated, stored, SLRB configuration.

In some examples, a WTRU receives an indication that it may use an SLRB configuration during a SLRB transition. For example, a WTRU may use the same SLRB configuration during transitions between IDLE/INACTIVE and CONNECTED states. In some examples, the WTRU may further receive an indication from the NW, such as from a gNB (e.g., in SIB or dedicated signaling), that it may do so.

Some examples include systems, methods, and devices for admission control for unicast and/or multicast on sidelink. In some examples, a transmission mode decision may be based on QoS. For example, a WTRU may determine its transmission mode for link to be established based on the QoS properties associated with that link. A WTRU may decide to establish a new link/radio bearer to address a unicast and/or multicast flow for a certain VQI and may determine the transmission mode for the packet on that link and/or bearer based on the VQI, QoS parameters derived from the VQI. A WTRU may select between NW controlled and WTRU autonomous mode based on VQI. Alternatively, if the WTRU selects WTRU autonomous mode, or the network allows a WTRU to use WTRU autonomous mode, the WTRU may further select between resource selection modes based on VQI. For example, a WTRU may determine whether to use fully autonomous resource selection; autonomous resource selection with assistance from another WTRU; configured or preconfigured grants; and/or WTRU scheduling resources for the link. For example, a WTRU may be configured or preconfigured with a table of VQI and allowable resource transmission/resource selection modes, where the WTRU may select a mode from one of the allowable modes for a specific VQI.

In some examples, a mode change is performed for admission control. For example, a WTRU may perform a mode change (e.g., from WTRU autonomous resource selection to network-based resource selection) for the purposes of admission control. In some examples, a WTRU which is operating in a WTRU autonomous mode may receive a new flow or may decide to initiate a new sidelink bearer. In doing so, a WTRU may indicate such to the network, and may implicitly change operating mode to NW controlled mode for at least the admission control/link and/or bearer establishment phase. The WTRU may continue in NW controlled mode until instructed to move back to WTRU autonomous mode by the network.

In some examples, admission control is scheduled by the NW. For example, a WTRU may send a request for sidelink unicast and/or multicast link establishment to the network, or a WTRU may send a request to the network for establishment of a unicast and/or multicast link and/or sidelink radio bearer. The WTRU may send such a request in response to indication from the upper layer that a link should be established. The WTRU may send the request to the gNB via RRC message, or MAC CE, and the request may include various information, such as the VQI or related QoS parameter or parameters associated with one or more flows for which the bearer should be established; an identification of the WTRU or WTRUs associated with the unicast and/or multicast link; and/or discovery results.

In some cases where the information includes the VQI or related QoS parameter or parameters associated with one or more flows for which the bearer should be established, the WTRU may be provided with a VQI from the NAS layer for a given flow and may initiate a link establishment request to the network including such VQI. In some cases where the information includes an identification of the WTRU or WTRUs associated with the unicast and/or multicast link, the WTRU may include the source IDs (e.g. L2 IDs) of the WTRUs with which the link should be established. In some cases where the information includes discovery results, the WTRU may send any AS-related information associated with discovery results, possibly associated with the WTRU or WTRUs with which the unicast and/or multicast link is to be established. The discovery results may include measurements or quality of reference signals or discovery signal transmissions; information indicating a supported WTRU capability; information indicating a synchronization source of the WTRU or WTRUs; information indicating in-coverage or out-of-coverage status of the WTRU or WTRUs; and/or information indicating a WTRU capability, such as a resource selection capability, carriers supported, power class, etc.

In some examples, a WTRU may send a unicast and/or multicast link establishment request towards the network based on one or more triggers or conditions, such as where the WTRU receives a new QoS flow from the upper layers; the WTRU decides to create a new sidelink radio bearer; the WTRU determines that a new QoS flow or radio bearer requires network controlled admission control; the WTRU receives a unicast and/or multicast establishment request from another WTRU; the WTRU receives a response to a unicast and/or multicast establishment request from another WTRU; and/or the WTRU is performing WTRU autonomous admission control and a new link and/or bearer establishment fails admission control based on WTRU-autonomous admission control mechanisms.

In some examples, a WTRU may use networked-controlled admission control if WTRU-autonomous admission control fails. For example, a WTRU may receive a new unicast and/or multicast flow from upper layers and may decide to initiate WTRU autonomous admission control for a new SL radio bearer for such flow (as described herein). If this WTRU-autonomous admission control fails, e.g., for reasons as described herein, the WTRU may initiate a network-controlled admission control, e.g., by transmitting a unicast and/or multicast link establishment request to the network.

In some examples, a WTRU may receive an acknowledgement of successful admission control with a resource and measurement configuration message. For example, a WTRU may receive an acknowledgement for successful admission control by the network, and following the acknowledgement, the WTRU may initiate transmission of data associated with one or more flows mapped to the established link or bearer. The WTRU may further receive resource usage information with such acknowledgement. The resource usage information may include a new resource pool or an indication of an existing resource pool; a periodic set of resources; arbitration rules; a WTRU-specific or cell-specific link and/or radio bearer identity; and/or a configuration of measurements to be reported to the network for link maintenance.

In some cases where the resource information includes a new resource pool or an indication of an existing resource pool, the resource pool may include a set of time, frequency, and/or beam resources, and may be used for transmitting data associated with the established link and/or bearer. In some cases where the resource information includes a periodic set of resources, the periodic set of resources may include a new SPS configuration, a configuration of configured grants (e.g., type 1 or type 2 grants) to be used for transmission of data associated with the established link and/or bearer, or an indication of an existing configuration to be used to transmit such data. In some cases where the resource information includes arbitration rules, the rules may include arbitration rules for a specific WTRU's usage of a resource shared between the WTRUs (e.g., where such WTRUs may or may not be the WTRUs associated with the unicast and/or multicast link). The arbitration rules may include a subset of time and/or frequencies which the WTRU may use on the overall resource configuration; a timing relationship between transmission and retransmissions to be used for the link and/or bearer; a transmission order or sequence for transmissions between multiple WTRUs in a multicast link; and/or a timing relationship between transmission and HARQ feedback (e.g., transmitted on either sidelink or uplink).

In some cases where the resource information includes a configuration of measurements to be reported to the network for link maintenance, the configuration may include a configuration of a reference signal transmission resource and power to be transmitted by a WTRU associated with a link; a configuration of a reference signal reception resource and expected power for measurement by a WTRU and reporting to the network; and/or a frequency (or periodicity) of such measurement reports to be sent by the WTRU based on measurements of the reference signal reception.

A WTRU, in response to receiving such configuration, may initiate measurements and reporting as per network configuration until the network releases the link and/or bearer via a bearer release message from the network.

In some examples, a WTRU may receive measurement configurations for admission control. For example, a WTRU may receive a measurement configuration for the purposes of reporting measurements on sidelink during admission control/link establishment. A WTRU may receive a measurement configuration which may initiate measurements and reporting that may last only during the link establishment phase. For example, a WTRU may be configured with: one or more source L2 addresses associated with messages for which WTRU should report measurements; one or more message types (e.g. a specific type of RRC message, such as a "Direct Communication Request" message); and/or a set of sidelink resources associated with transmission/reception of reference signals for measurements.

In some examples, a WTRU configured for measurement reporting may determine the RSRP of any message received from any of the specific L2 addresses configured in the measurement configuration, and potentially any of the RRC message types configured as part of the measurement configuration. In some examples, a WTRU may report measurements to the network at each reception of a message meeting the above criteria. In some examples, a WTRU may delete the configuration when the WTRU completes link establishment with the WTRUs indicated in the source L2 ID (i.e., in the measurement configuration).

In some examples, the WTRU autonomously controls admission control. Some examples include WTRU-autonomous admission control decisions. For example, during or prior to link establishment and/or bearer establishment, a WTRU associated with the link and/or bearer establishment may determine whether the link and/or bearer establishment is acceptable. The upper layers may initiate a unicast link establishment procedure, as discussed herein. During such procedure, the AS layer of any of the WTRUs may accept or reject the link and/or bearer establishment, e.g., based on AS-related factors which may be transparent to the upper layers.

In some examples, a WTRU may determine whether to initiate and/or accept or reject a unicast/groupcast link, or whether to admit a unicast/groupcast sidelink radio bearer (SLRB) based on one or more criteria.

The criteria may include network coverage of one or more of the WTRUs, e.g., where a WTRU may accept or reject a unicast/groupcast link or SLRB establishment based on whether that WTRU is in coverage of a gNB or based on whether that WTRU is in coverage of the same gNB of one or more of the other WTRUs that will be associated with the unicast link; QoS requirements associated with the link, e.g., where a WTRU may accept or reject a unicast/groupcast link or SLRB establishment based on the QoS requirements of link and/or bearer to be established; QoS requirements of other existing links and ability to pre-empt such existing links; location, motion, or relative location and/or motion, e.g., where a WTRU may accept or reject a unicast/groupcast link or SLRB establishment based on movement (e.g., speed, heading) of the WTRU and/or location of the WTRU, possibly in combination with information regarding the movement of another WTRU or WTRUs associated with the unicast/groupcast link; and/or, based on available resources (e.g., data and/or reference signal and/or feedback resources), e.g., where a WTRU may accept or reject a unicast/groupcast link or SLRB establishment based on determination of the available resources, potentially based on the available resources required for the unicast/groupcast link or SLRB, and/or the WTRU may predict the resources required for the link or SLRB based on QoS requirements of the link or SLRB.

Some examples include admission control based on network coverage. In some examples, a WTRU may determine, for a link requiring a specific QoS, to reject the link and/or SLRB if the WTRU is out of coverage, but to accept the link and/or SLRB if the WTRU is in coverage. For example, a certain value of VQI, PPPP, PPPR, or similar QoS parameter associated with the link may be configured or preconfigured to require mode 1 resource allocation mode or may require the WTRU to be in-coverage so that it may fallback to mode 1 in certain conditions. In some examples, a WTRU receiving a request for link and/or SLRB may reject the request when out of coverage. In some examples, a WTRU may be configured with a threshold Uu-based RSRP (e.g., possibly for each VQI or value of QoS-related parameter) below which a WTRU will reject a link and/or SLRB.

In some examples, a WTRU may reject a link/SRLB for a given QoS if the gNB on which the WTRU is currently connected and/or camped is not related to the gNB or gNBs on which the other WTRUs may be camped. The relationship may include, for example, the same gNB, gNB of an equivalent PLMN, gNBs broadcasting system information that is part of the same validity area. A link and/or SLRB may have one or more allowable relations.

Some examples include admission control based on relative location. In some examples, a WTRU may determine, for a link requiring a specific QoS such as a specific range requirement, or having an associated VQI, whether to accept or reject the link and/or SLRB based on the distance between the WTRUs, in combination with a range or QoS requirement. For example, a WTRU may be configured or preconfigured with a threshold distance for each value of VQI. The WTRU may receive location information regarding one or more other WTRUs associated with the link and/or bearer (e.g., during link establishment signaling) and may accept the link and/or SLRB if the distance to the other WTRU or WTRUs is below the threshold distance associated with the VQI.

Some examples include admission control based on availability of link-maintenance related resources/channels. In some examples, a WTRU may determine whether to accept or reject the link and/or SLRB based on the availability of resources or channels required for unicast/groupcast link maintenance. For example, each unicast/groupcast link may be associated with a set of resources or channels for transmission of RSs (e.g., for measurement of CSI), transmission of CQI, preemption resources, or for transmission of HARQ feedback. Such resources may be associated exclusively with the transmission of such information for a given unicast link. For example, a WTRU may be configured with a set of resources for RS transmission associated with a unicast link, and the WTRU select an unused configuration of these RS transmissions based on sensing of other unicast transmissions and/or information provided by the network, e.g., as further described herein. Alternatively, a WTRU may select an unused configuration for these RS transmissions based on information in UMUS signals transmitted by other WTRUs. In some examples, a WTRU may decide to reject a link and/or SLRB if it determines that all available RS configurations are currently being utilized by other WTRUs/links. Alternatively, (e.g., as discussed herein) the WTRU may decide to preempt an existing unicast link between a different set of WTRUs to accept the currently requested link and/or SLRB.

Some examples include transmission of a unicast and/or multicast usability signal to assist other WTRUs in performing admission control decisions in a shared resource pool (e.g., for determining or predicting resource usage/availability). For example, a WTRU may transmit a unicast and/or multicast usability signal (UMUS) when it is associated with one or more unicast and/or multicast links. In some examples, a WTRU may transmit such signal for each unicast and/or multicast link that is currently established at the WTRU. Alternatively, a WTRU may transmit a single signal if at least one link is established, where the usage signal may include information regarding all established links/SLRBs.

In some examples, a UMUS may be transmitted to facilitate the availability of resources on sidelink, such as on a resource pool, without reserving the resources ahead of time. For example, the UMUS for one or more links/SLRBs may indicate the resources that a bearer/link may eventually need to use or reserve. In such a case, the purpose of the UMUS may be to facilitate reservation of resources, when needed by a WTRU with specific QoS requirements, that will meet the QoS of an established unicast and/or multicast link. Alternatively, a UMUS signal may be transmitted to reserve specific resources or channels used for unicast/groupcast transmission associated specifically with this unicast link (e.g., HARQ feedback, RS transmission, CQI feedback, and/or preemption resources). For example, a UMUS may reserve specific resources, or an amount of resources, on a PSSCH, PSCCH, Physical Sidelink Broadcast Channel (PSBCH), sidelink feedback channel, and/or the like.

In some examples, a WTRU may perform decoding of UMUS transmissions from other WTRUs to determine the number of active links/SLRBs, and the resources they occupy. In some examples, the decoding may also determine the number of active links/SLRBs, and the resources they occupy, which are associated with a geographical area; a resource pool; a SL BWP; a carrier; a group of one or more WTRUs; and/or one or more associated QoS.

In some examples, a WTRU may decode and store a UMUS during regular SL reception. For example, the WTRU may determine average resource usage, actual reserved resources, and similar information, e.g., of the unicast links for the possible associations discussed above, based on reception of past UMUS signals. The WTRU may assume the contents of the UMUS to be valid for a configured or preconfigured or defined period. For example, a WTRU may start a timer upon reception of the UMUS signal associated with a single unicast and/or multicast identifier, L2 source/destination address, or other identifier carried by the UMUS. The WTRU may consider the resources associated with the transmitted UMUS signal to be active immediately upon reception of the UMUS signal. Upon expiry of the timer without reception of an updated UMUS signal associated with the same unicast and/or multicast identifier, L2 source/destination address, or other identifier, the WTRU may consider that the associated resources are no longer active. In some examples, the valid time may be determined based on a WTRU's motion, such as its speed, heading, and other related information.

In some examples, a WTRU may cancel, delete, or ignore any past received UMUS signals, and associated resource information, based on one or more triggers. Such trigger may include, for example, if the WTRU moves to a new geographical area, such as a new zone; if the WTRU changes BWP, carrier, or the like; if the WTRU joins or leaves a platoon; and/or if the WTRU receives a UMUS signal or similar signal indicating release and/or cancellation of the previous resources/reservation.

In some examples, a WTRU may transmit a UMUS signal via a broadcast SL transmission. In some examples, a WTRU may transmit a UMUS in a shared resource pool. Such resource pool may be shared by WTRUs which are performing WTRU autonomous transmissions. Such resource pool may be limited to WTRUs performing transmissions for unicast and/or multicast only. Alternatively, the pool may also include WTRUs performing broadcast transmissions.

In some examples, a WTRU may transmit a UMUS using an SCI or SCI like transmission on PSCCH; using information in a PSBCH (e.g., SL-MIB or similar); and/or using information transmitted on PSSCH, such as a MAC CE or SL-RRC message. For example, the WTRU may transmit the UMUS message using a MAC CE or SL-RRC message. Such message may be transmitted over SL using a special broadcast L2 destination address received by all WTRUs.

In some examples, a WTRU may transmit a UMUS in addition to normal transmission. For example, a WTRU may transmit a UMUS in a SCI format that contains both scheduling information and information about the unicast and/or multicast link. Alternatively, or additionally, a WTRU may transmit only a UMUS without combining it with data or scheduling information. For example, a WTRU may transmit a UMUS periodically. Such periodic UMUS transmission may be performed by an SCI with a specific format. The WTRU may determine when to transmit the UMUS based on expiry of a timer since its last transmission of UMUS; based on the number of SCI transmissions since its last transmission of UMUS; based on QoS properties of the unicast and/or multicast link(s) for which the WTRU is transmitting UMUS (e.g., a WTRU may transmit a UMUS signal more frequently if the associated unicast link has a higher reliability, a lower latency, etc.); based on occupancy of the shared resource pool as determined by the WTRU, such as a measure of CBR, number of available resources, or number of detected UMUS transmitted by other WTRUs; and/or, based on motion of the WTRU (e.g., WTRU speed, heading, etc.).

A WTRU may include various information in a UMUS. For example, such information may include VQI (or other QoS related parameters) associated with the unicast and/or multicast link (e.g., obtained from higher layers); a source and/or destination L2 address or addresses associated with the WTRU or WTRUs; properties of the resources required for the data to be transmitted on the unicast and/or multicast link; a number of QoS flows, or a number of AS SL radio bearers multiplexed on the unicast and/or multicast link (or each unicast and/or multicast link); a configuration of the reference signal channel/transmission by one or more WTRUs associated with the unicast and/or multicast link (e.g., a minimum/maximum RS transmission power, time, frequency, and/or beam resources for transmission of the RS signal, RS signal sequence, etc.), where this configuration may be indicated by transmitting the index of a predefined or configured or preconfigured configuration; a configuration of the HARQ feedback channel/transmissions associated with the unicast and/or multicast link; a configuration for CQI or CSI feedback transmission (e.g., time, frequency, and/or beam resources used for transmission of CQI feedback), where this configuration may be indicated by transmitting the index of a predefined or configured or preconfigured configuration; a configuration of preemption resources; BWP and/or a carrier on which resources are being reserved; and/or QoS-related metrics taken at a WTRU, e.g., reflecting WTRU SL transmission over a period of time.

In some cases where a configuration of HARQ feedback channel/transmissions associated with the unicast and/or multicast link are included in the UMUS, the configuration may include time, frequency, and/or beam resources used for transmission of HARQ, e.g., in the form of either a relation (time/frequency) between the data transmission and the HARQ feedback, or a number of HARQ resources associated with each transmission (e.g., for multiple HARQ feedback transmissions); rules/conditions for which HARQ may be enabled/disabled; and/or, rules for group-based HARQ transmission (e.g., transmit NACK only, transmit ACK and NACK). This configuration may be indicated by transmitting the index of a predefined or configured or preconfigured configuration.

In some cases where a configuration of preemption resources is included in the UMUS, the configuration may include time, frequency, and/or beam resources, which may be used by other WTRUs to transmit a preemption signal or message which can be used to preempt the associated unicast and/or multicast link or one or more SLRBs associated with that link. A preemption resource may be reserved per WTRU, or per unicast and/or multicast link or SLRB. This configuration may be indicated by transmitting the index of a predefined or configured or preconfigured configuration.

In some cases where measurements, averages, and/or ratios for the QoS metrics taken at the WTRU are included in the UMUS, they may include measurements, averages, and/or ratios of the number of transmissions required for unicast and/or multicast link; HARQ NACKs transmitted; successful resource selection procedures; LBT backoff operations during resource selection; increase in RSCP/RSSI threshold for determination of resource availability during resource selection; preemption transmission or reception; carrier and/or resource reselection due to CBR, resource availability, or the like; and/or packets successfully transmitted/received within the PDB or required latency.

In some cases where properties of the resources required for the data to be transmitted on the unicast and/or multicast link are included in the UMUS, the properties of the resources may include a link identifier; density of the resources (e.g., amount of time and/or frequency resources per unit of time); granularity or granularities of the resources used for that link; average, maximum, or minimum packet size and/or amount of time/frequency consecutive resources for the link; priority; reliability of the link; beam pattern (e.g., whether the link will be transmitted omni-directionally in a single beam, beam-swept, or beamformed and transmitted on a subset of beams (and possibly which beams); and/or geographical location indicating where the resources are required, such as a zone ID, directionality, or geolocation reference for which the resources are reserved. Such properties may be further associated with a profile or table identifier which may be configured or preconfigured in the WTRU or negotiated between WTRUs.

Some examples include the initiation and/or cancellation, and multiplexing, of information on UMUS. For example, a WTRU may multiplex the information of multiple unicast and/or multicast links and/or multiple radio bearers and/or multiple QoS flows onto the same UMUS. In some examples, a WTRU may initiate transmission of a new UMUS upon or following establishment of a unicast and/or multicast link. Alternatively, a WTRU may initiate transmission of a new UMUS or following establishment of the first unicast and/or multicast link, and or following establishment of additional links, may add information of all links to the existing UMUS. In such cases, the WTRU may cancel transmission of the UMUS or following release of one or all links at the WTRU.

In some examples, a WTRU may initiate transmission of a new UMUS or following establishment of a new radio bearer associated with a link. A WTRU may determine whether to transmit the new UMUS upon or following establishment of a radio bearer depending on the QoS characteristics of the data on the new radio bearer compared to existing radio bearers. For example, if the QoS characteristics of the new radio bearer are significantly different than those of the existing radio bearer, the WTRU may decide to transmit a new UMUS.

In some examples, admission control may be based on information included in a UMUS. A WTRU may perform admission control (e.g., determine whether a unicast and/or multicast link and/or a radio bearer can be established) based on information in one or more UMUS transmitted by other WTRUs in the same pool, BWP, carrier frequency, or the like. In some examples, the WTRU may detect and/or decode all UMUSs transmitted in a pool. In some examples, the WTRU may be configured with a rule for determining the possible resource usage associated with unicast and/or multicast transmissions in a pool (e.g., based on all UMUS) and for determining whether the pending link and/or bearer can be added, e.g., given the resource capacity of the pool.

In some examples, a WTRU may associate a number of time, frequency, and/or beam/density resources over a configurable time period with a unicast and/or multicast link and/or radio bearer (e.g., of a certain VQI). For example, the WTRU may make such association based on QoS properties associated with the link, such as the VQI; network configuration; and/or the measured CBR on the related pool. For example, a WTRU may be configured with a mapping of VQI and CBR to resource density, or to the number of resource blocks and time reference period. In another example, a WTRU may determine the number of resource blocks from a rate-based QoS parameter derived from the VQI associated with the link.

In some examples, a WTRU may apply a weighting factor to determine the amount of resources required for each link and/or SLRB based on QoS properties associated with the link. For example, a WTRU may apply a multiplicative factor (e.g., larger than 1) to a radio bearer/link with reliability requirements (or parameter thereof) above a threshold. In another example, a WTRU may apply a multiplicative factor (e.g., larger than 1) to a radio bearer/link with latency requirements, or parameter thereof, shorter than a threshold.

In some examples, a WTRU may monitor/receive the UMUSs over a period of time prior to the establishment of the link and/or bearer. For example, a WTRU may make an admission control decision based on the existing link and/or bearers that are established based on the UMUSs, detected over the time period, that identify unique links/bearers. In some examples, the WTRU may consider UMUSs of only a subset of the established links/bearers (UMUSs) in the decision, e.g., based on the QoS properties associated with the link and/or bearer and whether the link and/or bearer and its QoS has an impact on the QoS of the link to be established. A WTRU may further perform admission control by considering only links/bearers with a common QoS parameter and ensuring that the combination of such links/bearers do not result in exceeding another QoS parameter. In some examples, a WTRU may apply multiple decisions or criteria for determining whether admission control is successful, e.g., where admission control depends on each criterion being successful. A decision or criteria may be performed based on a total amount of resources indicated in UMUS (e.g., of a specific type); and/or a number (e.g., weighted) of established links/radio bearers in UMUS.

In some cases where criteria include a total amount of resources indicated in UMUS, a WTRU may first determine the total amount of resources that would be used by all unicast and/or multicast links in the resource pool as determined by UMUS transmissions. For example, the amount could be measured as the number of resource blocks over a fixed time period. The WTRU may determine the total amount of resources set aside by all UMUS's detected (e.g., by a sum of the densities or amount of resources).

In some examples, the WTRU may determine the number of resources in a fixed period used by an existing link based on the VQI or a similar QoS parameter (e.g. PPPP, PPPR) transmitted with the link (e.g., a WTRU may have a configured or preconfigured mapping between VQI value and corresponding number of resources (RBs) per time period); based on the number of SLRBs associated with the link in the UMUS (e.g., a WTRU may determine the total resource usage of a link based on the sum of resource usages of each SLRB on the link); and/or based on the transmitted average packet size or data rate in the UMUS signal itself (e.g., a WTRU may use a combination of VQI and packet size to resource amount mapping to determine the amount of resources used by a link), In some examples, the WTRU may determine admission control to be successful if the number of resources already set aside by UMUS (e.g., over the same time period) combined with the number of resources required by the link/radio bearer to be established is less than the total number of resources in the pool, some percentage of resources in the pool, or a configured or preconfigured threshold. In some examples, the configured or preconfigured threshold may depend on any of the QoS properties of the link to be established (e.g., priority), the QoS properties of the links already established (e.g., based on UMUS), or the CBR of the channel.

In some examples, the WTRU may determine the total amount of resources of a specific type that would be used from all UMUS transmissions and make an admission control determination based on the total number of available resources in the resource pool of that type. The type may be associated with time granularity (e.g., whether the resource is a slot or a symbol; numerology; and/or direction (e.g., one or more directions associated with transmission on one or more antenna beams).

In some cases where criteria include a number of established links/radio bearers indicated in UMUS, in some examples, a WTRU may determine the number of established links/radio bearers based on all UMUS transmissions and a WTRU may determine that admission control for a particular link/radio bearer succeeds if the total number of radio bearers/links in a pool remains below a configured or preconfigured threshold. In some examples, this threshold may depend on QoS properties of the link to be established; QoS properties of the links present in UMUS; and/or CBR of the channel. In some examples, the WTRU may apply a weighting factor to each radio bearer/link indicated in UMUS and/or to the current link/radio bearer to be established. The weighting factor may be based on QoS properties associated with the link; a received power of the UMUS (e.g., a WTRU may apply a multiplicative factor larger than 1 to a radio bearer/link for which the received UMUS RSRP is larger than a configured or preconfigured threshold); and/or measured CBR. In some examples, the measured CBR may be on resources reserved for only one type of transmission (e.g. broadcast transmissions only, unicast and/or multicast transmissions only).

In some cases where the threshold depends on QoS properties of the link to be established, in some examples, the WTRU may apply a multiplicative factor (e.g., larger than 1) to a radio bearer/link with reliability requirements, or parameter thereof, above a threshold. In some examples, a WTRU may apply a multiplicative factor (e.g., larger than 1) to a radio bearer/link with latency requirements, or parameter thereof, shorter than a threshold. In some examples, a WTRU may apply a multiplicative factor configured for use with the VQI associated with a radio bearer/link.

In some examples, a WTRU may also apply a weight of 0 (i.e., not consider a specific link and/or bearer) in the evaluation of number of established links/bearers.

In some examples, a WTRU may perform admission control based on the number of remaining available RS resource transmission configurations; remaining available preemption resource configurations; remaining available HARQ resource transmission configurations; and/or remaining available CQI resource transmission configurations. For example, a WTRU may determine the number of available configurations by excluding those configurations that are already in use, e.g., as determined by the received UMUS signals over a period of time. In some examples, the WTRU may determine that admission control succeeds if the number of available (i.e., unused) configurations is above a configured or preconfigured or predetermined threshold (e.g., 0); and/or if a configuration exists, and may be chosen for the link and/or SLRB to establish, that does not conflict with any existing configuration from the perspective of interference, capability, or the like (e.g., a WTRU may associated a RS transmit power with the QoS of the link to be established, and a WTRU may further determine whether a configuration exists with the associated transmit power which does not exceed the allowable WTRU TX power).

In some examples, a WTRU may determine the time period over which the WTRU considers UMUS signals to determine which configurations are already in use, based on a latency related aspect of its QoS. For example, the latency related aspect may include a mapping of VQI to average or worst-case PDB. In some examples, the WTRU may determine the amount of resources to be transmitted over that period based on a rate-related aspect of its QoS, for example, by adjusting its rate requirement, derived from VQI, to the worst case PDB. The WTRU may therefore assume its resource density, which is the number of resources per configurable period, to be the amount of resources used within its PDB. In some examples, the WTRU may perform the same computation on all established links/bearers to determine the current density of resource usability. In some examples, in this computation, the WTRU may further apply a multiplicative factor associated with QoS parameters or reliability/range to each link and/or bearer, including the link and/or bearer to be established. In some examples, this factor may be configured by the network for a given value of a reliability/range derived parameter (e.g., from VQI). In some examples, if the total amount of usability resources over the configurable period, including the resources for the link and/or bearer to be established, is less than a threshold percentage (e.g., X %) of the resources in the pool, admission control for the link and/or bearer may be considered to be successful. In this example, X % may be further configured by the network for each pool, and the WTRU may further select from one of a number of thresholds applicable to that pool based on the measured CBR. For example, the WTRU may receive a threshold (X %) to apply to each range of CBR values for that pool.

In some examples, the WTRU may perform admission control so that the number of active links/bearers having a specific type of rate requirement does not exceed a maximum number of bearers. In some examples, the maximum number of bearers may be determined based on a latency related requirement. For example, a WTRU performing admission control for a link and/or bearer that has a requirement for larger data burst sizes (e.g., which may be associated with one specific VQI value), may determine the number of links/bearers currently active with the same requirement. The WTRU may compute the allowable number of such active links by assuming each such link occupies a number of PRBs within the time frame of the minimum PDB associated with each link.

Some examples include modifying resource selection for broadcast transmissions based on UMUS. For example, a WTRU may perform resource selection, (e.g., for broadcast resources) and may consider the number of established unicast and/or multicast links during the resource selection process. In some examples, the WTRU may perform one or more actions during resource selection. The action or actions may include avoiding selection of a carrier if the number of links/bearers on that carrier or the amount of usable resources on that carrier for links/bearers is above a threshold; and/or scaling or changing certain resource selection parameters based on the presence/number of links or amount of usable resources in all UMUS. Such parameters may include a number of allowed consecutive resource reservations; a probability of keeping (e.g., renewing a reservation of) resources at each reservation period; CBR thresholds for selection of a carrier; RSRP thresholds for determining availability of a resource based on detection of an SCI; LBT parameters such as backoff, sensing time, detection sensitivity; minimum energy associated with a valid/acknowledged preemption signal; and/or a percentage of resources deemed available, based on sensing, for which the WTRU can proceed with resource selection.

In some examples, admission control is based on representative and/or past resource selection procedures. For example, a WTRU may perform a representative resource selection procedure, or a series of such procedures, to reserve resources for the specific link and/or bearer and may determine the outcome of the admission control based on the outcome of these resource selection procedures. In this situation, the representative resource selection procedure may not be performed to actually reserve or select any resources but may be performed in order to evaluate the occupancy of the channel. In this situation, the representative resource selection procedures may be performed on a set of stored sensing results from past time instances. In this situation, each representative resource selection procedure can represent the expected outcome had the resource selection actionally taken place at the past time instant corresponding to the sensing results stored at the WTRU corresponding to that time instant. Alternatively, resource selection procedures used for admission control may include resource selection procedures actually utilized for selecting resources for broadcast/unicast and/or multicast transmissions in the same pool, BWP, and/or carrier and having been performed for a configured or preconfigured time prior to the performance of the admission control. For example, a WTRU may maintain statistics of resource selection procedures performed prior to the time of the required admission control (e.g., a link establishment decision), and may perform admission control based on those statistics.

In some examples, the WTRU may be configured to perform multiple representative resource selection procedures, each having different resource selection parameters, such as different PDB or latency; different number of retransmissions; different MCS, power, or related transmission parameters; different packet size; and/or different packet periodicity (or no periodicity; e.g., one-shot resource selection).

In some examples, a WTRU may be configured to use a set (or multiple sets) of resource selection parameters, e.g., based on the QoS characteristics of the unicast and/or multicast link to which admission control is being performed. For example, a WTRU may be configured with a set of resource selection parameters to use for a unicast and/or multicast link having a specific VQI. After such configuration, the WTRU may perform multiple sequential resource selection procedures with these parameters to determine whether admission control for the specific link and/or bearer is successful. Alternatively, a WTRU may be provided with multiple sets of resource selection parameters for a specific VQI, and may perform representative resource selection procedures, either in parallel or sequentially, each with a different set of parameters in order to determine admission of a new link and/or bearer.

In some examples, a WTRU may be configured with specific criteria related to past resource selection procedures (e.g., such as those discussed herein) for which the WTRU should take into consideration the results of such past resource selection procedures. For example, for a link having a certain VQI, the WTRU may be configured to consider only past resource selection procedures for which the PDB is below a threshold, the number of retransmissions is above a threshold, or the like, as part of the resource selections for admission control. After such configuration, the WTRU may perform admission control for the link based only on those past resource selection procedures which meet these specific criteria.

In some examples, a WTRU may determine the results of admission control based on the number or frequency of successes of its representative and/or past resource selection procedures. For example, admission control may be determined to have succeeded if a threshold number (N), or threshold percentage (X %) of its representative and/or past resource selection procedures succeeds; if a threshold number (M) of the most recent representative and/or past resource selection procedures were all successful; and/or if a threshold average (Y %) of its resource selection procedures do not require a change of threshold to achieve a threshold availability target (e.g., 20% in LTE). In each of these cases, the values of N, X %, M, Y %, and the availability target may depend on a NW configuration; a WTRU-measured CBR; and/or QoS parameters related with the link to be established.

In some examples, a WTRU may determine the results of admission control based on a combination of results from past resource selection procedures and representative resource selection procedures. For example, a WTRU may be required to base its admission control on a minimum number of resource selection procedures (e.g., past and/or representative). In some examples, if the WTRU determines that it does not have a sufficient number of past resource selection procedures, it may perform representative resource selection procedures at the time of admission control to meet the configured minimum.

Figure 8:
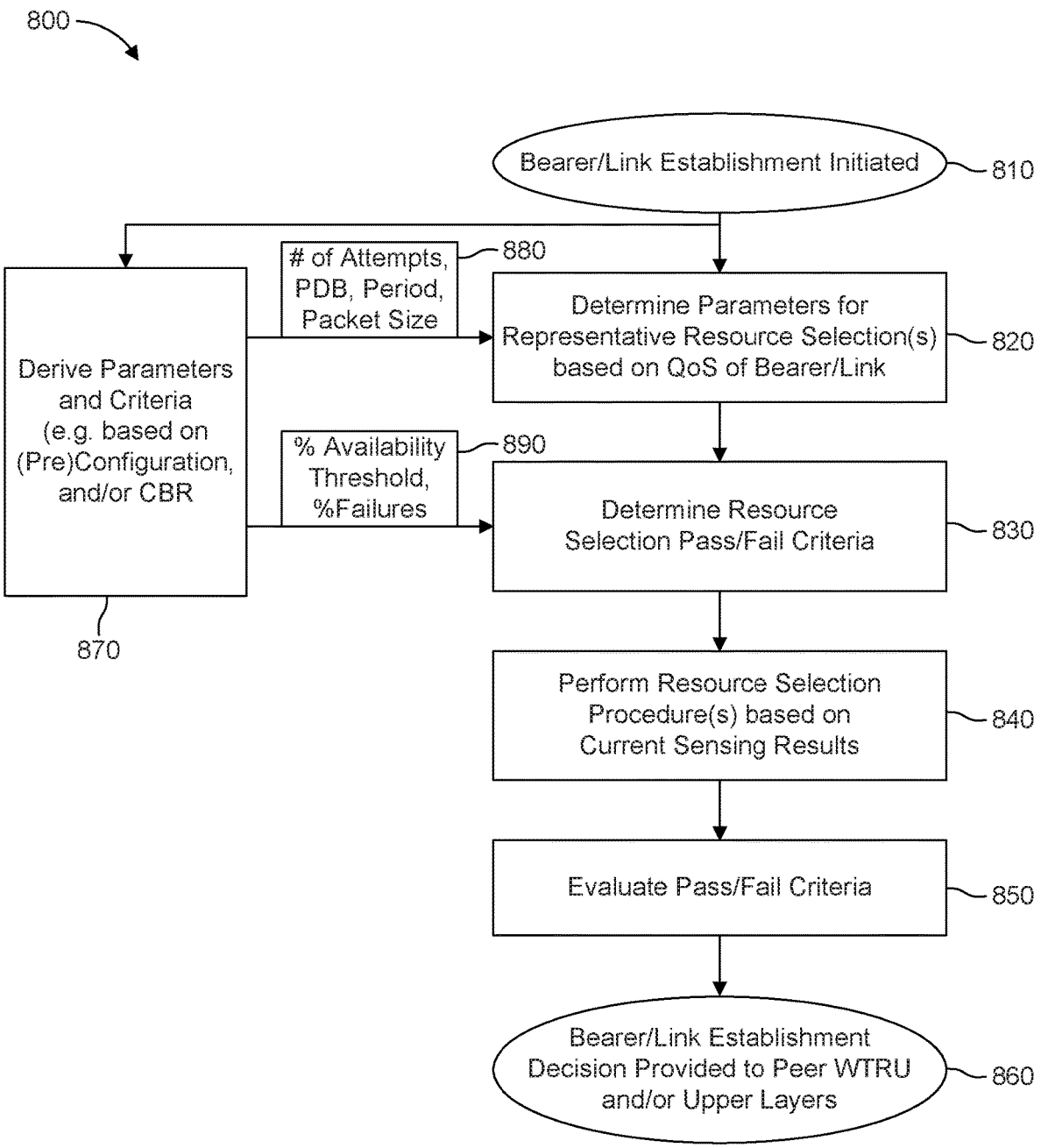
FIG. 8 is a flow chart which illustrates an example procedure for admission control based on representative resource selection.

FIG. 8 is a flow chart illustrating an example procedure 800 for admission control based on representative resource selection. In step 810, bearer and/or link establishment may be initiated with QoS information associated with the bearer/link. In step 870, the WTRU may use configuration, preconfiguration, and/or CBR to determine a number of resource selection attempts to perform for the admission control as well as the parameters to use for the resource selection attempts (e.g. PDB—packet delay budget, periodicity, and/or packet size for the resource selection, availability threshold, etc). These values may also be configured or preconfigured with each bearer QoS and/or CBR or predefined. In some examples, the WTRU may determine the number of successful resource selection procedures required to declare successful admission control. The number of successful resource selection procedures required to declare successful admission control may also be (pre)configured or predefined. For example, admission control may be determined to be successful if the number of successful resource selection procedures is above a configured amount. The WTRU may determine the success of a single resource selection procedure based on the configured or preconfigured availability threshold (i.e. the percentage of resources available for usage as determined by sensing procedure). For example, a single resource selection procedure is successful if the resources available based on sensing results is above the availability threshold.

In step 820, the WTRU may determine parameters for representative resource selection based on a QoS of the bearer and/or link. The parameters may include a number of representative resource selection attempts, as discussed herein, to be made in procedure 800, as well as a number of parameters inherent to each resource selection procedure to be performed. Specifically, a PDB (packet delay budget to be used in each resource selection procedure), a periodicity for the data, and a packet size to be used in each resource selection procedure, may be determined in step 870. In step 830, the WTRU may determine resource selection pass/fail criteria as discussed herein, namely, the criteria for determining that a representative resource selection procedure is successful or not. The pass/fail criteria for a resource selection procedure may defined in terms of the number of available resources based on sensing results being above/below a percentage availability threshold determine in step 870. The admission control pass/failure criteria may be defined in terms of the percentage of successful resource selection procedures being above/below a failure percentage threshold determined in step 870. In step 840, the WTRU may perform the representative resource selection procedure using its stored sensing results. Specifically, the UE may select resources among a set of shared resources (resource pool) using a set of (pre)configured parameters (e.g. latency/PDB, periodicity, etc) by determining the available resources from sensing results. The UE may perform the resource selection procedure using a number of attempts determined in step 870, potentially using different sensing results associated with different time instances. The representative resource selection procedure may be based on sensing results as discussed herein. Specifically, the UE may store sensing results taken at different time instances in the past, and may perform a resource selection procedure using the sensing results associated with a specific time instance in the past. In some examples, the resource selection procedure may include the WTRU determining available resources based on input parameters.

In step 850, the WTRU may evaluate the representative resource selection based on pass/fail criteria as discussed herein. Specifically, the WTRU may determine if each resource selection procedure is successful or not. The WTRU may the determine whether the total number or percentage successful resource selection procedures is above the configured threshold to determine whether admission control is successful. In step 860, the bearer and/or link establishment decision, based on the evaluation in step 850, is provided to a peer WTRU and/or upper layers of the WTRU. Specifically, the WTRU may inform upper layers that the bearer/link can be established if admission control is successful.

In some examples, if past resource selection procedures are used rather than representative resource selection procedures, procedure 800 may be modified by ignoring the step of performing the resource selection procedures in step 840 and instead using the results of past resource selection procedures which meet the criteria.

In some examples, admission control is based on sensing results. For example, a WTRU may perform admission control based on sensing or measurements maintained continuously at the WTRU and/or analyzed over a period of time prior to the trigger of admission control decision, and associated with one or more pools, carriers, and or BWPs, such as CBR measurements; a number of successful/failed LBT procedures over a configured time (e.g., based on its own access to the channel, or based on measured results transmitted in UMUS); a number of detected preemption signals over a configured time; sensing results (e.g., including information in the SCIs detected during the sensing of one or more pools); metrics (e.g., an average retransmission rate) related to other ongoing unicast links (e.g., links in the same pool) for the WTRU; measurements of the channel quality (e.g., CQI, pathloss) during a discovery procedure of procedures; and/or QoS related measurements at the WTRU or metrics at the WTRU, or measurements received from the other WTRUs or metrics received from the other WTRUs (e.g., in the UMUS).

A WTRU may be configured with a threshold measurement, or threshold for any of or a combination of the above measurements, where if satisfied (e.g., the measurement is below, or above, the threshold, as appropriate), admission control of a link and/or bearer is considered to be successful. In some examples, such threshold may depend on the QoS parameters associated with the link and/or bearer to be established.

Some examples include admission control based on CBR. For example, a WTRU may be configured with a CBR threshold for each VQI. If a WTRU initiates link and/or bearer establishment for a bearer with a specific VQI, admission control may be considered to have failed if the measured CBR is above the associated CBR threshold. In some examples, a WTRU may be configured with a CBR threshold for each (or any) of the QoS-related parameters of latency, reliability, priority, range, and rate. In some examples, a WTRU may determine the applicable QoS parameters for a radio bearer to be established based on the relevant QoS parameters of the flows which will be mapped to those radio bearers. In some examples, a WTRU may determine applicable values (e.g., priority, reliability, etc.) for the relevant QoS parameters associated with that bearer. In some examples, a WTRU may determine that admission control is successful for a radio bearer if the CBR is below each of the QoS-parameter-specific threshold for each of the relevant QoS parameters for that bearer.

In some examples, a WTRU performs admission control based on sensing results. For example, a WTRU may determine the admission control rules based on sensing results determined from SCI transmissions of other WTRUs over a period prior to the admission control decision. In some examples, the admission control decision may further depend on the QoS aspects of the link and/or bearer to be established. In some examples, a WTRU may continuously maintain sensing results and may define the admission control decision based on the results during a time (T) prior to the admission control decision. In some examples, sensing results used to perform admission control may be derived from one or multiple pools, BWPs, and/or carriers. In some examples, the admission control decision may depend on one factor, or a combination of a plurality of factors. In some examples, the factor or factors include an amount of observed aperiodic traffic, an amount of observed periodic traffic, a relative amount of periodic versus aperiodic traffic, an amount of observed unicast and/or multicast traffic, or a relative amount of observed unicast and/or multicast traffic as compared with broadcast traffic; QoS characteristics of the observed periodic, apreriodic, unicast, multicast, and/or broadcast traffic; and/or a number of reserved resources of a particular granularity.

In some cases where the admission control decision depends on the amount of observed aperiodic traffic, the WTRU may measure the amount or percentage of resources associated with aperiodic traffic (e.g., one-shot) and may allow the establishment of a link and/or bearer if this value is above/below a threshold. In some cases where the admission control decision depends on the amount of observed periodic traffic, the WTRU may measure the amount or percentage of resources reserved (e.g., using forward booking, or similar reservation method) and may allow the establishment of a link and/or bearer if this value is above/below a threshold. In some cases where the admission control decision depends on the relative amount of periodic vs aperiodic traffic, the WTRU may be configured with an acceptable ratio of periodic versus aperiodic traffic and allow the establishment of a link and/or bearer if the measured ratio is above/below the threshold. In some cases where the admission control decision depends on the amount of observed unicast and/or multicast traffic (e.g., possibly in comparison with broadcast), a WTRU may determine the amount or percentage of unicast and/or multicast traffic based on detection of a unicast indicator in the SCI; detection of a HARQ process ID or similar in the SCI; detection of HARQ transmissions (or resources reserved for HARQ transmissions); and/or detection of CSI reference signals or resources reserved for such transmissions and/or CSI feedback transmissions. In some such cases, the WTRU may allow the establishment of a link and/or bearer if the amount, or percentage of unicast and/or multicast transmissions or the ratio of such transmissions with broadcast transmissions is above or below a threshold, as appropriate. In some cases where the admission control decision depends on the QoS characteristics of the observed periodic, aperiodic, unicast, multicast, and/or broadcast traffic, a WTRU may determine the VQI or any QoS related parameter derived from VQI (e.g., reliability, latency, priority, rate, range) for a transmission from the SCI associated with such transmission. In some such cases, the WTRU may further modify or select any of the above thresholds based on worst, average, best, total, and/or majority QoS of the observed transmissions. In some cases where the admission control decision depends on the amount of reserved resources of a specific granularity, the WTRU may determine the amount or percentage of symbol-based or slot-based resources reserved and may perform admission control based on this value being above/below a threshold.

In some examples, the WTRU may perform admission control based on an estimate of the number of unicast and/or multicast links and/or SLRBs determined from monitoring the SCI over a period of time. In some examples, the WTRU may further determine an estimated amount or density of resource usage using methods similar to those related to reception of UMUS and may base admission control decisions on a determination of the percentage of used resources.

Some examples include admission control based on QoS-related measurements and/or metrics. For example, a WTRU may be configured with a rule for admission control based on QoS-related measurements and/or metrics, as described herein. In some examples, the WTRU may obtain such measurements and/or metrics from its own transmissions and/or based on metrics obtained from broadcasts by other WTRUs. For example, the WTRU may obtain such metrics from other WTRUs in a UMUS, or in another inter-WTRU message, and/or the WTRU may obtain such metrics during RRC signaling associated with link and/or SLRB establishment. In some examples, the WTRU may further limit which WTRUs of whom metrics are considered in the admission control decision based on geographical area, a unicast and/or multicast relationship, and/or a QoS or transmission type.

In some cases where the WTRU limits which WTRUs of whom metrics are considered in admission control decision based on geographical area, the WTRU may consider only metrics received from WTRUs in a geographical zone or other area that is relevant for the WTRU performing admission control. In some cases where the WTRU limits which WTRUs of whom metrics are considered in admission control decision based on a unicast and/or multicast relationship, the WTRU may consider only metrics received from WTRUs to which the WTRU is intending to establish a unicast and/or multicast link or SLRB, or WTRUs for which the WTRU currently has active unicast and/or multicast links/SLRBs. In some cases where the WTRU limits which WTRUs of whom metrics are considered in admission control decision based on a QoS or transmission type, the WTRU may consider only metrics received from WTRUs which have the same transmission type (e.g., unicast, multicast, broadcast, mode1, and/or mode2), or QoS (e.g., a same or similar VQI or QoS related properties) as the link and/or SLRB for which admission control is required.

In some examples, admission control criteria and/or WTRU measurements may depend on a dominant QoS characteristic. For example, some transmissions may have strict latency requirements, but less strict requirements (or no requirements at all) for reliability. For example, a WTRU may further determine an admission control measurement and/or criterion based on the QoS of the link and/or bearer to be established. In some examples, a WTRU may apply a different configured or preconfigured measurement and/or criteria (e.g., of those discussed herein) for admission control depending on the QoS of the link and/or bearer to be established. In some examples, the WTRU may be configured or preconfigured with a measurement and/or criterion for each VQI, and may apply the configured measurement and/or criteria according to the VQI of the associated link. In some examples, the WTRU may determine QoS characteristics (e.g., a dominant QoS characteristic or characteristics, which may include latency, reliability, etc.) from the VQI associated with the bearer/link to be established, and may use the configured measurement and/or criteria associated with such characteristic to make the admission control decision. For example, for a bearer/link which is latency dominant (e.g. has a latency stringent QoS requirement), the WTRU may use the measured amount of reserved resources of a specific granularity, and/or the measure of the total amount of reserved periodic resources. For a bearer/link which is reliability dominant, the WTRU may use the measured amount of aperiodic resources. For a bearer/link which is range dominant, the WTRU may use the channel measurements during discovery. Other combinations of measurements and/or criteria for a given QoS characteristic or VQI are also possible, and will be clear to those skilled in the art.

Some examples include preemption of existing unicast and/or multicast links. For example, a WTRU performing admission control may decide to perform preemption of one or more existing unicast and/or multicast link in order for admission control to be successful. In some examples, preemption may be performed on a link with which the WTRU is already established, or may be performed on a link between a different set of WTRUs.

In some examples, a WTRU may decide to preempt one or more established unicast and/or multicast links (e.g., either with its own links or links between other WTRUs) during admission control for establishment of its own unicast and/or multicast link. For example, the WTRU may determine to preempt a unicast and/or multicast link if it decides to establish a new link which cannot currently be established (e.g., based on the techniques described herein) due to the existance of one or more existing unicast and/or multicast links, or if establishment of the link results in potential failure to meet QoS requirements of the link or of other already established links, (e.g., other links which are higher priority). In some examples, the WTRU may be aware of the existing unicast and/or multicast links based on having received UMUS signals transmitted by other WTRUs. Alternatively, a WTRU may decide to preempt one or more radio bearers and/or QoS flows multiplexed onto a unicast link.

Without the loss of generality, while various examples of preemption may be discussed herein with respect to preemption of a link, or preemption of a radio bearer, it is noted that preemption may apply to either link or radio bearer, or both link and radio bearer, despite examples, embodiments, situations, and scenarios only referencing one of the two for ease of description.

In some examples, a WTRU may transmit a preemption signal to suspend a unicast and/or multicast link for a period of time. For example, a WTRU may preempt one of its existing radio bearers in the link establishment signaling used to set up a new link or radio bearer with the same WTRU or WTRUs. In some examples, the WTRU may transmit a preemption signal to force a unicast and/or multicast link to use a different pool, BWP, carrier, or similar set of resources. In some examples, a WTRU may determine whether it can perform preemption based on a QoS of the link to be established; a current occupancy of the channel; a configuration; and/or the presence of suitable unicast and/or multicast link(s) to preempt.

In some cases where the WTRU determines whether it can perform preemption based on a QoS of the link to be established, the WTRU may be configured with a threshold associated with one of its QoS characteristics, and/or with a threshold priority above which the WTRU can perform preemption of another link. In some cases where the WTRU determines whether it can perform preemption based on a current occupancy of the channel, a WTRU may be configured with a threshold value of CBR and may perform preemption of a unicast and/or multicast link only if the currently measured CBR is above the threshold. In some cases where the WTRU determines whether it can perform preemption based on a configuration, configured to be allowed to perform preemption, and this configuration may be specific to a WTRU, specific to the QoS class of the link to be established (e.g. VQI associated with the link/radio bearer), or specific to the pool/BWP/carrier.

In some cases where the WTRU determines whether it can perform preemption based on the presence of suitable unicast and/or multicast link or links to preempt, the WTRU may perform preemption if it is able to find a unicast and/or multicast link (e.g. based on monitoring of UMUS) which it may use for preemption. In some examples, the conditions for finding such a link may be the same as those described in the selection of the link, as described herein. For example, a WTRU may perform preemption of a unicast link if there is an existing unicast and/or multicast link having a lower priority than the link to be established.

In some examples, a WTRU which cannot perform preemption and cannot achieve the required QoS for the link on a given pool, carrier, and/or BWP, or set of pools, carriers, and/or BWPs (e.g., based on failure of the admission control procedure) may inform upper layers of the failure.

In some examples, a WTRU may select a unicast and/or multicast link or links to preempt based on a priority and/or QoS; based on satisfaction of the properties of the link to be established; based on which WTRU or WTRUs are associated with the link; location; and/or usage of a similar resource pattern and/or signature.

In some cases where the WTRU selects a unicast and/or multicast link or links to preempt based on a priority and/or QoS, the WTRU may select the unicast and/or multicast link having the lowest priority based on the set of active detected links, such as from monitoring of UMUS. The WTRU may use any of, or combination of, priority, data rate, latency, range, or reliability to decide which link to preempt. For example, a WTRU may select one of the links (e.g., from those it determines in received UMUS signals) for which the priority is below the priority of the link to be established, possibly by a configured or preconfigured number of priority levels. The WTRU may transmit a preemption signal to preempt the chosen unicast and/or multicast link.

In some cases where the WTRU selects a unicast and/or multicast link or links to preempt based on satisfaction of the properties of the link to be established, for example, the WTRU may select the link which reserves the most similar amount of resources, or has the most similar QoS characteristics (e.g., packet size, reliability, etc.) to the link it needs to establish, or the WTRU may select the link(s) which minimizes the number of links that need to be preempted in order to satisfy the requirements of the link to be established). In another example, a WTRU may select the link(s) which minimizes the number of links which need to be pre-empted in order to satisfy the requirements of the link to be established. In another example, a WTRU may select the unicast and/or multicast link having packet arrival time which is closest to the estimated packet arrival time of the link to be established. For instance, the WTRU may determine the packet arrival times of existing unicast links transmitting periodic traffic. Such determination may be made by sensing of the SCI over a period of time. The WTRU may select the unicast link to be preempted as the one having the closest packet arrival times to the link to be established and which has a priority lower than the link to be established.

In some cases where the WTRU selects a unicast and/or multicast link or links to preempt based on which WTRU or WTRUs are associated with the link, for example, the WTRU may preempt one of its own ongoing links, or the link of a WTRU for which it has an ongoing link with. In some examples, a WTRU may consider its own SLRBs or SLRBs between different WTRUs equally, e.g., for selection of the SLRB to be preempted, and/or for the selection criteria. In some examples, the WTRU may preempt its own SLRBs before it considers preemption of other SLRBs. For example, the selection of a SLRB to be preempted may be based on the following rules: 1) a WTRU may select first one of its own SLRBs if it has an active SLRB which satisfies the above criteria, otherwise, it may select another SLRB; and/or 2) a WTRU may select between its own SLRB and another WTRU SLRBs by applying a bias to any parameter used in the selection procedure that biases the decision towards its own SLRB or another WTRU's SLRB (e.g., the threshold priority level below which an SLRB is selected for preemption, for which such threshold may be relative to the priority of the new SLRB, may be different for a WTRU's own SLRB and another WTRU's SLRB).

In some cases where the WTRU selects a unicast and/or multicast link or links to preempt based on location, for example, a WTRU may consider preemption only on links for which resources are reserved in the same area (e.g., zone, geographical location, and/or direction) as the zone required for the new unicast link. In some examples, the WTRU may select the unicast and/or multicast link in which the communicating WTRU or WTRUs are closest to the WTRU or WTRUs that will be associated with the unicast and/or multicast link to be established. In some examples, a WTRU may determine the proximity of an ongoing unicast and/or multicast link or links based on detection of the WTRU location in the SCI/UMUS or a similar transmission or transmissions by the WTRU (possibly combined with a speed/heading; and/or based on a measurement of RSRP, or the like, of transmissions by the WTRUs in a unicast link. In some examples, a WTRU may select to preempt the unicast link that is closest to its own location (e.g., highest received RSRP) and which has lower priority, based on one or more of such measurements.

In some cases where the WTRU selects a unicast and/or multicast link or links to preempt based on usage of a similar resource pattern and/or signature, a WTRU may select the unicast and/or multicast link that uses a resource usage pattern (e.g., a pool, or a pattern of time/frequency resources assigned to a unicast link) which is the same as, or overlaps with, the resource usage pattern selected for the unicast and/or multicast link to be established. In some examples, such a pattern may also include a transmission signature, such as a scrambling code, hopping sequence, or the like. In some examples, a WTRU may select to preempt a WTRU that has a lower priority than the link to be established based on the same (or overlapping) pattern/signature.

In some examples, link preemption selection may be performed at the WTRU transmitting the preemption signal or at the WTRU receiving it. For example, a WTRU may first determine the unicast and/or multicast link to be preempted, and may indicate that link in the preemption signal sent to one or more of the WTRUs associated with the unicast and/or multicast link. In some examples, the WTRU receiving the preemption may preempt the unicast and/or multicast link and/or SLRB indicated in the preemption signal. Alternatively, a WTRU may select the WTRU to which the preemption is sent, and the WTRU receiving the preemption signal may decide which unicast and/or multicast link and/or SLRB it is associated with to preempt, using the rules discussed herein.

In some examples, a WTRU may consider all ongoing unicast and/or multicast links having lower or equal priority with the planned unicast and/or multicast link to be established for preemption. For example, based on these links, the WTRU may first decide to preempt an existing link having a same or substantially similar QoS profile or a same or substantially similar values of QoS properties (i.e., other than priority) to the link to be established, and may select that link to be preempted.

In some examples, a WTRU that decides to preempt a unicast and/or multicast link may transmit a preemption signal (e.g., a request) using information in a SCI, or anther transmission, on PSCCH; using a MAC CE or RRC message transmitted on PSSCH; using a MIB transmission on PSBCH; and/or using a message on a channel dedicated for transmission of a preemption signal.

In some examples, a WTRU may include information in a preemption signal. The information may include a UE ID of the WTRU transmitting the preemption signal; a UE ID of the WTRU or WTRUs whose unicast and/or multicast link is being preempted; a link ID of the link to be preempted; a radio bearer ID of the radio bearer to be preempted; a destination address or addresses identifying one or more of the WTRUs associated with the unicast and/or multicast link; a period of time for which the link/radio bearer should be preempted; QoS parameter(s) associated with links/bearers that should be preempted, and/or a QoS parameter or parameters and/or Ia ink/bearer ID associated with the links/bearers or packets whose admission caused the preemption of the link and/or SLRB.

In cases where the WTRU includes a QoS parameter or parameters associated with links/bearers that should be preempted, the parameter or parameters may include a priority or priorities associated with the links which should be preempted (e.g., a WTRU may preempt all unicast links having lower priority that a certain priority level); and/or a VQI or set of VQIs (e.g., a WTRU may send a preemption signal which can be associated with one or a set/range of VQI values for which preemption applies.)

Some examples include reservation of preemption resources during link establishment. For example, a WTRU may reserve resources that can be used for preemption of a unicast/groupcast link and/or bearer during establishment of that link and/or bearer. In some examples, the WTRU may broadcast preemption resources to be used to preempt a given link and/or SLRB to other WTRUs using a reservation signal, or using the UMUS, discussed further herein.

In some examples, a WTRU may select the time and/or frequency resources, and/or a periodicity of the preemption resources based on a configured or preconfigured set or pool of allowable resources and/or periodicities. For example, a pool of resources to be used for preemption may be configured or preconfigured for each WTRU. Each unicast link may further reserve a subset or pattern of such resources within the preemption pool. The WTRU may select the specific preemption resource from the allowed set based on one or more criteria, such as QoS of the link or SLRB(s) to be established; predefined patterns within the preemption pool; and/or resource availability.

In some cases where the WTRU selects the specific preemption resource from the allowed set based on a QoS of the link or SLRB(s) to be established, the WTRU may select a set of resources for preemption of a link which occur more frequently if the priority of the link or SLRBs is larger, or if the latency of the link or SLRBs is lower. In some examples, this provides more opportunities to preempt the link or associated SLRBs when the link/SRLB is associated with high priority and/or low latency. In some examples, such larger opportunities may be consistent with a condition where a higher priority link and/or SLRB may only be preempted by still higher priority links/SLRBs.

In some cases where the WTRU selects the specific preemption resource from the allowed set based on predefined patterns within the preemption pool, a WTRU may only select preemption resources to associated with a link and/or SLRB based on some pre-defined pattern (e.g., RB 1 in subframe 1, repeated every N subframes, as an example single pre-defined pattern).

In some cases where the WTRU selects the specific preemption resource from the allowed set based on resource availability (e.g., based on sensing and measurements), a WTRU may perform a sensing procedure (e.g., SCI decoding, RSSI measurement, etc.) to determine the available or occupied resources and may select the preemption resources from the set of available resources. Alternatively, a WTRU may exclude the preemption resources associated with already existing unicast links (e.g., as determined by all received UMUS from other WTRUs) and may select the preemption resources for the link and/or SLRB to be established from the remaining allowable resources.

In some examples, a set of predefined patterns of preemption resources may exist and may each be associated with one or more VQIs. For example, a WTRU may select among the predefined patterns associated with the VQI, or highest VQI, associated with the link to be established. In some examples, a WTRU may exclude any patterns currently in use by other WTRUs based on detection of UMUS transmissions by other WTRUs over a period. In some examples, a WTRU may select the pattern of preemption resources randomly (e.g., from the remaining set of patterns), or may select the pattern having the lowest measured RSSI over a period. In some examples, after a pattern is selected, a WTRU may transmit an index or identifier associated with such pattern in the reservation signal, or UMUS.

Some examples may include transmission of a preemption message on the reserved preemption resources for that link. For example, a WTRU that decides to preempt an existing link and/or SLRB may transmit a preemption message only on the resources associated with preemption of that link and/or SLRB. In some examples, a WTRU may determine such resources based on detection of UMUS transmissions by other WTRUs. In some examples, a WTRU may further decide whether and which unicast link and/or SLRB to preempt based on decoding of UMUS transmissions that were received over a time (T) prior to the preemption decision. For example, a WTRU may select the link and/or SLRB having the lowest priority of all established links it is aware of based on UMUSs received over T. In some examples, after the link and/or SLRB is selected, a WTRU may transmit the preemption message on the resources indicated in the UMUS for that link and/or SLRB.

Some examples include acknowledgment signaling. In some examples, a WTRU may wait for the reception of a preemption acknowledgment signal from one or more of the WTRUs associated with the unicast and/or multicast link before it initiates/completes link establishment. In some examples, a WTRU may repeat transmission of a preemption signal if it has not received a preemption acknowledgement for a threshold amount of time. In some examples, a WTRU may determine successful preemption of a link, and therefore may initiate/complete link establishment, based on receipt of at least one preemption acknowledgement signal. Alternatively, a WTRU may determine the successful preemption of a link based on receipt of an acknowledgement from a threshold number (N) of WTRUs. In some examples, N may be equal to the number of WTRUs associated with the unicast and/or multicast link (e.g., 2 for unicast), or N may be configured or preconfigured.

Some examples include receipt of a preemption signal. In some examples, a WTRU may determine that a preemption signal it has received is applicable to a bearer/link it currently has established if the preemption signal includes a destination address which matches the WTRU's own source address or unicast address; if the preemption signal includes the radio bearer ID of one of the WTRU's active bearers; and/or if the preemption signal includes a VQI or QoS related parameter that matches the VQI or QoS related parameter of one of the WTRU's established links/bearers.

In some examples, a WTRU may perform one or more based upon receipt of a preemption signal. For example, based upon receipt of a preemption signal, the WTRU may transmit a preemption acknowledgement signal or message to the preempting WTRU; inform the upper layers of the release or suspension of a radio bearer or unicast and/or multicast link; delay transmission of packets associated with the radio bearer/link in question for the period of time indicated in the preemption signal; send a radio bearer release or link release message to the peer WTRU or WTRUs in the unicast and/or multicast link; inform the gNB of the release or delay of a radio bearer or link; and/orinitiate a procedure with a peer WTRU or WTRUs to perform a carrier switch, BWP switch, or pool switch (e.g., by sending a channel switch message).

In some examples, a preemption signal may be transmitted in the same message as a threshold VQI or a threshold QoS level (e.g., a threshold priority level). In some examples, the preemption signal may be broadcast to all WTRUs. A WTRU, upon receipt of this preemption signal, may preempt all unicast and/or multicast links having a lower priority than the threshold value in the preemption signal. The WTRU may then inform upper layers of the preemption and/or may initiate a release signaling with the peer WTRU(s) in the link.

Some examples include admission control for broadcast transmissions. For example admission control may take place at service establishment and/or service initiation. In some examples, a WTRU may perform admission control following indication of the establishment or initiation of a broadcast service by upper layers. In some examples, a WTRU may receive an indication from upper layers of the initiation of such a service. The indication may include information, such as a desired QoS, a period and/or duration of the service, and/or an admission control policy. In cases where the indication includes a desired QoS, the indication may include a worst case or range of QoS properties of each of the packets that will be transmitted for the associated service, such as VQI/VQI range, PPPP/PPPP range, PPPR/PPPR range, etc. In cases where the indication includes a period/duration of service, the indication may include an expected duration of the service in some increment of time. In cases where the indication includes an admission control policy, the admission control policy may include a guaranteed QoS or better effort QoS, an indication of whether the AS layer should indicate to upper layers when and/or whether the QoS for such service can be met or whether admission control and/or monitoring should be performed; and/or whether preemption of existing broadcast services and/or unicast and/or multicast links/SLRBs are permitted for initiation of the service, and/or rules associated with such preemption (e.g., which services or priority levels can be preempted).

In some examples, a WTRU may perform an admission control decision using the same or substantially methods as for unicast link and/or SLRB establishment cases described herein. Without loss of generality, admission control for a broadcast transmission service may follow methods for unicast, with the exception that decisions for admission control may be taken entirely at the WTRU that receives the indication from upper layers, rather than based on signaling associated with link establishment.

In some examples, a WTRU may decide to preempt an ongoing broadcast or unicast and/or multicast SLRB in order to admit a broadcast service. Rules for determining whether to preempt an SLRB may be determined based on upper layer policy information and may be similar to rules for initiation of a unicast and/or multicast link and/or bearer establishment.

In some examples, a WTRU may initiate creation of a broadcast SLRB upon indication from the upper layers and a successful admission control decision at the WTRU. Without loss of generality, SLRB establishment may be performed at the WTRU using similar methods to those described for unicast and/or multicast link and/or SLRB establishment. For example, a WTRU may initiate transmission of a UMUS upon broadcast SLRB initiation, with the information in the UMUS reflecting one, more, or all broadcast services active at the WTRU. Some procedures (e.g., initiation of reference signal transmissions) may not be required for broadcast SLRB establishment.

Admission control for a single packet may result one or more actions by the WTRU. Such actions may include a successful admission control, where the packet may be submitted for transmission to the lower layers (e.g., MAC/PHY layers), subject to normal resource selection procedures; a failed admission control, where the WTRU may initiate preemption of its own transmissions (e.g., by releasing a SLRB) or another WTRUs transmissions (e.g., by transmission of a preemption signal); a failed admission control, where the WTRU may inform upper layers of the failure; and/or a failed admission control, where the WTRU may negotiate and/or choose new QoS-related properties for the broadcast service, and the WTRU may submit packets associated with the service with the new QoS-related properties.

Some examples include per-packet admission control. For example, a WTRU may perform per-packet admission control at each reception of a packet from upper layers for transmission on SL. In some examples, an admission control decision for a single packet may be based on methods described for unicast and/or multicast link establishment admission control, possibly including certain changes and/or constraints. Such changes and/or constraints may include that estimates of the WTRU measurements, metrics, and/or resource usage used for admission control may be limited to the PDB or latency requirements associated with the packet to be transmitted; that estimates of the WTRU measurements, metrics, and/or resource usage may use worst-case values rather than average values; that decision criteria (e.g., thresholds for comparison with WTRU measurements/metrics/resource usage) may be different for per-packet admission control compared with link and/or SLRB admission control; that failed admission control may be tolerated based on conditions described herein, such as concerning the temporary admission of packets despite failed admission control, where the advantage of failed admission control may be to avoid tearing down an established link and/or SLRB (e.g., as a result of preemption) in order to satisfy QoS of a single or small number of packets. In some such cases, the packet or packets that fail admission control may be allowed temporarily, e.g., since the expectation is that the service may exceed QoS capabilities of the resources temporarily.

In some examples, a WTRU may perform one of a number of operations depending on the results of admission control, such as: where the admission control succeeds, the packet may be submitted for transmission to the lower layers (e.g., MAC/PHY layers), subject to normal resource selection procedures; where admission control fails, the WTRU may initiate preemption of its own transmissions (e.g., by releasing a SLRB) or another WTRUs transmissions (e.g., by transmission of a preemption signal); where the admission control fails, the WTRU may inform upper layers of the failure; where the admission control fails, the WTRU may negotiate and/or choose new QoS-related properties for the broadcast service, where the WTRU may submit packets associated with the service with the new QoS-related properties; and/or, where the admission control fails, the WTRU may still transmit the packet that failed the admission control based on the rules discussed herein regarding temporary admission of failed admission control packet.

Some examples include temporary admission of packets despite failed admission control for the packet. For example, a WTRU may be configured or preconfigured with a rule to allow (i.e., admit) packets that fail admission control. In some examples, if a packet fails admission control this may mean or indicate that the WTRU cannot maintain QoS for the existing links while ensuring the QoS of the service undergoing per-packet admission control.

In some examples, a rule for per-packet admission control may be based on a total number of admitted packets failing admission control that is allowed for a given service. For example, the WTRU may determine a total (i.e., maximum) number of packets which fail admission control for the duration of the service, where if this number is exceeded during the life of a service, the WTRU may no longer admit such packets which fail admission control.

In some examples, a rule for per-packet admission control may be based on a rate of failing admission control packets that may be transmitted, or a fixed number of failing admission control packets allowed for every predefined time period or time window, where the rate/number/window may be defined per broadcast service or across all broadcast services. For example, the WTRU may determine a rate, such as failed packets per second, which is allowed and additional failed admission control packets that exceed the rate may not be transmitted and/or an indication may be initiated to upper layers and/or preemption procedure may be initiated.

In some examples, a rule for per-packet admission control may be based on a maximum number of consecutive broadcast packets, potentially associated with a given service, which fail admission control. For example, the WTRU may determine a number of consecutive packets that fail admission control prior to indication to upper layers and/or performance of preemption.

In some examples, a rule for per-packet admission control may be based on an allowable time between packets which fail admission control, possibly associated to a single broadcast service or across all broadcast services. For example, the WTRU may determine a minimum required time between packets that fail admission control and continue to transmit such packets, without taking failure actions, e.g., as long as the time difference between failed admission control is larger than the computed minimum.

Some examples may include factors for determining parameters relating to temporary admission. For example, a WTRU may determine any of the parameters discussed above for temporary admission of packets failing admission control based on one or a number of factors.

In some examples, the factors for determining parameters relating to temporary admission may include the number of unicast and/or multicast and/or broadcast links/SLRBs currently established on the carrier, carriers, BWP, BWPs, pool and/or pools in which packet transmission is required. In some examples, the factors for determining parameters relating to temporary admission may include the QoS properties (e.g., VQI associated with) of one or more of the currently established links/SLRBs on the same pool, BWP, and/or carrier as transmission of the broadcast service. In some examples, the factors for determining parameters relating to temporary admission may include the QoS properties (e.g., VQI associated with) of the packet to be transmitted, such as the latency, priority, PDB, reliability, and the like, of the transmission. In some examples, the factors for determining parameters relating to temporary admission may include the measured CBR of the pool, carrier, and/or BWP on which the service and/or packet may be transmitted. Such determination (e.g., relation between allowable failure rate and VQI of currently established SLRB or SLRBs) may further be configured or preconfigured at the WTRU.

In some examples, a WTRU may be configured to perform admission control for a packet associated with a broadcast service by measuring the CBR of the resource pool or pools that can be used for transmission of the packet. For example, a WTRU may determine that admission control for a packet fails if the measured CBR on that pool is above a configured threshold. In some examples, the WTRU may further allow transmission by lower layers despite failed admission control for a packet if the time between arrivals of a packet with failed admission control is at least a threshold time (e.g., X). The value of X may be determined by the WTRU, e.g., based on a configured mapping of VQI, of the particular broadcast packet that fails admission, to X.

In some examples, a WTRU may be configured to perform admission control for a broadcast packet by determining the worst-case resource usage associated with all established SLRBs, e.g., based on decoding of UMUS and comparing the percentage resource usage, over total amount of resources, with a threshold. In some examples, admission control may be considered to have failed for the packet if the computed resource usage is above the threshold at the arrival of the broadcast packet. In some examples, the threshold may be determined by the WTRU based on a configured or preconfigured mapping of VQI of the broadcast packet. In some examples, the WTRU may permit a rate of failing broadcast packet admission control where the WTRU still performs transmission of such broadcast packets. The permitted rate of failing broadcast packet admission control may be configured or preconfigured based on the VQI of the worst-case or best-case QoS of any active SLRB determined by UMUS. For example, the WTRU may be configured or preconfigured with a mapping of VQI (i.e., for worst-case or best-case SLRB) to allowable failure rate, and may use such a rate to temporarily allow packets which fail admission control.

Some examples include methods, systems, and devices for unicast and/or multicast link maintenance. For example, a WTRU may be configured to transmit a reference signal or signals at the establishment of a link. In some examples, the WTRU may be configured to transmit a reference signal or signals at the establishment of a link for sidelink link maintenance. For example, a WTRU may start transmitting such reference signal or signals following the successful establishment of the link from upper layers or from RRC, and may stop transmitting these reference signals following release of the link. In some examples, a WTRU may change its reference signal configuration based on the number and/or type of radio bearers established for the link.

A WTRU may transmit one reference signal configuration for all unicast and/or multicast links which are established. In such a case, a WTRU may start transmitting reference signals at the establishment of the first link, and stop transmitting reference signals when the last remaining link is released. Alternatively, a WTRU may transmit a different set of reference signals (e.g., different time/frequency resources, different sequence, different PHY layer properties) for each unicast and/or multicast link and may start/stop reference signal transmission for the associated link upon establishment/release of the link.

Some examples include reference signal reception. For example, a WTRU may monitor and/or measure reference signals for link monitoring following establishment of a unicast and/or multicast link. A WTRU may be configured (e.g., via RRC) with the specific time, frequency, and/or beam resources associated with the location of the reference signals. In some examples, such configuration may be provided to the WTRU by the peer WTRU or by the gNB during link establishment signaling. In some examples, a WTRU may stop monitoring/measuring reference signals for a specific unicast and/or multicast link following release of the link, or following release of the last active link for that WTRU.

Some examples include determination of reference signals, unicast configuration, and/or monitoring of multicast links. For example, a WTRU may select a reference signal configuration from shared resources. In some examples, a mode 2 WTRU may determine the time, frequency, and/or beam location of reference signals it needs to transmit and/or the time, frequency, and/or beam location of the reference signals transmitted by other WTRUs in the unicast and/or multicast link. For example, a WTRU may perform resource selection to reserve a set of time, frequency, and/or beam resources for reference signal transmission by itself, and possibly by other WTRUs in the unicast and/or multicast group. In some examples, after the WTRU selects the resources, the WTRU may transmit a long-term reservation signal to indefinitely reserve such RS resources. In some examples, such a reservation signal may be transmitted on PSCCH (e.g., SCI-like transmission) and may include the resource configuration for the reference signals, e.g., from a configured or preconfigured set.

In some examples, a WTRU may perform a resource selection procedure to select one or more resource sets and/or configurations for transmission of reference signals from a set of usable or predefined/preconfigured resources. For example, the WTRU may select the preconfigured resource set for RS based on sensing results, similar to data resource selection. In some examples, the WTRU may perform one or more actions during resource selection for reference signal resources. In some examples, the action may include limiting the WTRU (e.g., via configuration) to selection of a set of resources associated with a resource set, where a resource set is associated with transmission reference signals for a single unicast and/or multicast link, from a number of predefined or preconfigured sets only. In some examples, the action may include the WTRU using a different threshold for the determination of resource occupancy based on data transmission, or using the threshold associated with the largest or smallest priority, reliability, and/or range value configured by the network. In some examples, the action may include the WTRU selecting the resource set which has the minimum RSSI if multiple sets of resources are determined available during resource selection. In some examples, the action may include the WTRU selecting the resource set based on a hashing function associated with the link ID, source L2 ID, or destination L2 ID if multiple sets of resources are determined available during resource selection. In some examples, the action may include the WTRU transmitting a preemption signal to preempt other transmissions which may be utilizing resources if the WTRU is unable to find available resources for reference signals, where the preemption may be directed to preemption of transmission associated with a specific type of transmission (e.g., broadcast, unicast, or multicast) of a specific priority, or a specific other QoS parameter (VQI); and/or a WTRU may consider transmission of the reference signals as highest priority during resource selection procedure.

Some examples include determining a reference signal configuration based on a unique WTRU ID, link ID, or bearer ID. For example, a WTRU may transmit reference signals on a set of time, frequency, and/or beam resources which are reserved for reference signal transmission. In some examples, such resources may not be used for transmission of PSSCH and PSCCH. In some examples, a WTRU may be configured with one or more sets and/or configurations of reference signal resources per carrier and/or BWP. Alternatively, a WTRU may be configured with one or more sets and/or configurations of reference signal resources per transmit pool and may only select a reference signal configuration for unicast and/or multicast transmission associated with the pool it will use for such a transmission.

In some examples, to avoid collision between reference signal transmissions, a WTRU may select a resource configuration for reference signal transmission. The WTRU may make this selection based on a unicast and/or multicast link ID, potentially assigned by the network or the upper layers (e.g., where the ID is unique); based on a source ID of the WTRU transmitting the reference signal; based on a destination ID of the WTRU to which reference signals are transmitted, or the L2 ID associated with the unicast and/or multicast link, if one exists; based on a destination ID associated with the service; based on the WTRU's C-RNTI; based on a radio bearer ID.

In some examples, a WTRU associated with a unicast and/or multicast link may monitor reference signals associated with that link, and may determine the time, frequency, and/or beam location of those reference signals based on a reference signal configuration; based on a unique ID associated with the unicast and/or multicast link, which may be equal to the L2 source ID, L2 destination ID, an assigned unicast and/or multicast link ID from upper layers or from the network; based on a radio bearer ID; and/or based on a WTRU ID unique within the unicast and/or multicast group.

Some examples include configuring a reference signal for a multicast link (e.g., a link which includes more than 2 WTRUs). In some examples, a WTRU may monitor a different set of reference signals for each WTRU transmitting in a multicast group, and may associate each set of reference signals with transmissions from a different WTRU. In some examples, a transmitting WTRU may transmit its link-based reference signals on the set associated with its own transmissions.

In some examples, a WTRU may be provided with a configuration of the possible reference signal time, frequency, and/or beam locations associated with a dedicated physical channel. In some examples, the WTRU may further be configured with a mapping of the resources that are associated with each other (e.g., a definition of a resource set). In some examples, the WTRU may select the resource set to be used for transmission and/or reception of reference signals based on the configured unicast and/or multicast link ID using a modulo operation (e.g., where the reference set modulo WTRU ID=0).

In another example, a WTRU may identify reference signals or a reference resource set transmitted by a specific WTRU within a unicast group based on a unique WTRU ID assigned to the WTRU that is unique within the group. For example, in a multicast group of 3 WTRUs, the WTRUs may be assigned distinct IDs 1, 2, and 3, and reference signals transmitted by one of the WTRUs (WTRUx) may correspond to the "xth" reference signal set assigned for the multicast link.

Some examples include bearer-specific reference signal configurations. For example, a WTRU may be configured with a different set of resources for reference signal transmission and/or reception for different radio bearers within the same multicast link. In some examples, a transmitting and/or receiving WTRU may transmit and/or receive a larger density of reference signals for a radio bearer having more stringent reliability requirements. In some examples, a WTRU may transmit and/or receive on different sets of reference signal resources for different active radio bearers. Alternatively, a WTRU may transmit and/or receive on a set of reference signal resources associated with the radio bearer having the worst-case performance requirements. In such cases, a WTRU may change reference signal configuration (e.g., from configuration 1 to configuration 2) if a radio bearer is established or torn down, or if a WTRU keeps the same configuration. In some examples, the decision of whether to change or maintain a configuration may depend on the QoS characteristics associated with the bearer. In some examples, the WTRU may be configured with a mapping of radio bearer (e.g., radio bearer type) to reference signal configuration.

Some examples include procedures for changing a reference signal configuration due to an ID change. For example, a WTRU may need to change its source L2 ID, e.g., for security purposes, e.g., based on a decision by upper layers. In some examples, the WTRU's transmitting and receiving reference signals may need to be synchronized during the change of ID.

In some examples, a WTRU that receives an indication to change an ID used to determine the reference signal location may determine a subframe and/or slot (n) relative to the time of reception of the upper layer indication. In subframe/slot n, a WTRU may stop the transmission of reference signals with the old configuration and may start transmission of reference signals with the new configuration. In some examples, a WTRU monitoring reference signals may behave in the same way, or substantially the same way, from the reception point of view. For example, at a subframe or slot (N), the WTRU may stop monitoring reference signals according to the old configuration, and may start monitoring reference signals according to the new configuration. In such cases, the transmitting and/or receiving WTRU may determine the value of N based on an indication from an upper layer; based on a defined time location following reception of the upper layer indication changing the ID (e.g., a subframe N may be the first occurrence of subframe 0 after reception of the upper layer indication which is at least a threshold (k) subframes following the indication); and/or based on a reception in RRC signaling (e.g., the source WTRU may determine the timing of the change of reference signal configuration and indicate this to the other WTRU(s) in the unicast and/or multicast link using an RRC message). In some examples, a receiving WTRU may be configured to immediately interrupt monitoring of reference signals for a period of time following the reception of the upper layer indication. In some examples, the WTRU may start monitoring based on the new configuration at subframe N following reception of the indication, where N may be determined with the same methods described previously.

In some examples, a WTRU may determine its sidelink monitoring parameters based on the active SL radio bearers. In some examples, a WTRU may perform a sidelink monitoring procedure based on a measurement of reference signals transmitted by other WTRUs on sidelink. In some examples, the WTRU may perform multiple independent SL monitoring procedures. Such monitoring procedures may be performed per unicast and/or multicast link, per radio bearer on each unicast and/or multicast link (e.g., if multiple radio bearers are associated with a single link); and/or for each WTRU associated with a multicast link. In some examples, the sidelink monitoring procedure may include monitoring a quality metric (e.g., RS-RSRP, BLER on PSCCH or PSSCH, etc) from the reference signals transmitted by another WTRU and indicating to the upper layers when the metric is below a threshold for a threshold time.

A WTRU may determine its RLM/RLF parameters and procedures based on the VQI associated with a bearer. For example, a SL bearer may be associated with one or more VQIs. In some examples, a WTRU may further be configured with an RLM/RLF configuration for each VQI and may apply the associated configuration if a bearer with such VQI is active. In some examples, a bearer with multiple mapped VQIs may be associated with the VQI based on the numeric value of the VQI, where the WTRU selects the VQI with the lowest or highest number; and/or based on one or more QoS parameters derived from the VQI, where the WTRU may derive a set of QoS related parameters from VQI, such as priority, latency, reliability, and the like. In some examples, the WTRU may determine one or more derived QoS parameters (e.g., reliability only) and may determine use of the VQI with the most stringent value of those requirements. In some examples, a WTRU may implicitly change its monitoring procedure and/or parameters as bearers are added and/or removed, e.g., based on the above rules.

In some examples, a VQI-specific RLM/RLF configuration may include a target PSSCH/PSCCH BLER; a target RS-RSRP; a frequency of RLM-like indications to the upper layers (e.g., RRC; e.g., how often a PHY layer can report RSRP below target); and/or timers (e.g., an RLF-Like timer).

Some examples include monitoring procedures and/or parameters per unicast and/or multicast link. In some examples, a WTRU may determine its monitoring procedure and/or quality metric based on the QoS characteristics of one or more of its active SL bearers. For example, a WTRU may perform a single monitoring procedure with a single set of parameters and select such procedure/monitoring parameters based on the set of currently active SL radio bearers for a unicast and/or multicast link. In some examples, a WTRU may select the procedure and/or parameters based on the "worst-case" bearer requirements. For example, RB-Type 1 and RB-Type2 may be configured at the WTRU, each with their own procedure/parameters, where RB-Type 1 is considered higher priority than RB-Type 2. In some examples, if both bearers are configured simultaneously, the WTRU may perform monitoring based on the parameters of RB-Type1. Otherwise, when a single bearer is active, the WTRU may apply the procedure and/or parameter associated with that bearer.

In some examples, a WTRU may be configured with a parameter derivation function (e.g., average BLER, weighted average BLER, etc.) to derive the monitoring procedure and/or parameters for a combination of active radio bearers, and may apply the said procedure and/or parameters if the combination of bearers is active. Otherwise, when a single bearer is active, the WTRU may apply the procedure and/or parameters associated with that bearer.

In some examples, a WTRU may maintain multiple procedures and/or parameters. For example, a WTRU may maintain a parallel procedure (e.g., executed in parallel and independently) and parameter set per SL radio bearer, potentially associated with the same or different unicast and/or multicast links, or set of SL radio bearers. For example, a WTRU may report a measured quality of reference signals (RS_QUAL)<target independently for each radio bearer where each SL radio bearer may be configured with a different set of reference signals. In another example, the same set of reference signals may be transmitted for all radio bearers but the WTRU may monitor based on different target qualities and report events independently for each of the different qualities.

In some examples, a WTRU may maintain multiple procedures and/or parameters for a single SL radio bearer if the SL radio bearer is configured with different VQI, possibly associated with different VQI ranges. For example, a WTRU may be configured with a set of procedures and/or parameters for each VQI range. In some examples, if a radio bearer is established which contains flows from different VQI ranges, the WTRU may perform multiple monitoring procedures with independent parameters associated with each range for the said bearer.

In some examples, a WTRU may be configured with different link failure timers (e.g., T1 and T2) which may be used to monitor different qualities. Depending on the monitored quality which fails, a WTRU may initiate the appropriate timer and indicate link failure to upper layers (e.g., NAS) or to the network when or after such timer expires. A WTRU may further indicate which of the link timers expired if a link failure is declared.

In some examples, a WTRU may maintain independent procedures and/or parameters per WTRU in a multicast link. In some examples, a WTRU may independently report RLM-like events to the upper layers for each WTRU in a multicast link. In some examples, a WTRU may determine the target quality measure based on the initial measurements derived during link establishment. For example, the target quality for link monitoring may be a percentage or some value derived from the measured quality of discovery or link establishment message transmission during unicast and/or multicast link establishment.

In some examples, a WTRU associated with a multicast link may require link failure procedures associated with that multicast link. In some examples, link failure may be associated with various conditions, such as a determination that the link quality, based on reference signal monitoring, is below a target for some, potentially consecutive, time period.

In some examples, a WTRU may report link failure independently for each WTRU in the multicast link. For example, a WTRU may declare link failure associated with a multicast link and further indicate the WTRU or WTRUs for which the link failure occurred (e.g., based on independent monitoring of reference signals transmitted by each of those WTRUs).

In some examples, a WTRU may report link failure if the monitoring associated with a subset of WTRUs in the multicast link indicates quality is below a target for a configured time period. In some examples, the WTRU may determine the specific subset of WTRUs based on an upper layer configuration (e.g., application or RRC), or a relative location.

In cases where the WTRU determines the specific subset of WTRUs based on an upper layer configuration, the WTRU may be explicitly configured with the set of WTRUs for which link failure should occur, or the WTRU can derive the subset of WTRUs based on another configuration aspect, such as a relaying configuration, a platoon configuration and identification of the role of each WTRU, a resource selection configuration, if resource selection based on WTRU assistance is used, and/or a synchronization source configuration. In cases where the WTRU determines the specific subset of WTRUs based on a relative location, the WTRU may indicate link failure if the subset of WTRUs which are closest/furthest to the said WTRU experience a link failure.

Some examples include additional triggers for link failure based on admission control metrics. For example, a WTRU with an established radio bearer may perform the same, or substantially the same or substantially similar measurements to those of admission control, and may declare link failure based on failure of one or successive admission control evaluations associated with the SL radio bearer. In some such cases, a WTRU may utilize any of the mechanisms described herein regarding admission control, assuming that the bearer to be added is the bearer on which link monitoring is being performed. In some examples, a WTRU may perform such admission control independently for each of the SL bearers established. In some examples, a WTRU may perform the associated admission control procedure with different timing, depending on the SLRB.

Without loss of generality, the WTRU may perform link monitoring by performing one or more admission control procedures as described herein, performed while the link or SLRB is active. In some examples, link failure may further result in any of the failure actions described for admission control, such as an indication to upper layers, tearing down of a link and/or SLRB, and/or preemption of another SLRB/link.

In some examples, a WTRU may be configured with a periodicity for the derivation of admission control procedures. In some examples, this periodicity may be determined per bearer. In some examples, based on failure of a single admission control procedure, a WTRU may change the frequency of admission control procedure performance, or may perform a number of subsequent admission control procedures for the radio bearer until the procedure succeeds, or until the maximum number of failed performances is reached. In some examples, a WTRU may thereafter trigger link failure if the admission control procedure fails a threshold number (N) consecutive times.

In some examples, a WTRU may periodically evaluate the information in the UMUS signals and based on the information, may determine whether the total usability for a given pool exceeds a specific amount. In some examples, for the usability of the bearer being monitored, a WTRU may consider: the usability resources broadcast for that bearer; the actual number of resources used by the bearer over a past configuration in time; and/or the amount of data available at the WTRU's buffers that are associated with that bearer.

Some examples may include additional triggers for link failure based on resource selection metrics. For example, a WTRU may declare link failure based on the failure of a resource selection, or based on certain aspects related to the results or intermediate quantities related to the resource selection algorithm. In some examples, the WTRU may consider the resource selection algorithm results of intermediate quantities for resource selection specific to that link or bearer when considering the link failure for a specific link and/or bearer. In some examples, the WTRU may declare link failure for a unicast and/or multicast link or for one or more SL bearers associated with such link based on certain events occurring one or more, potentially consecutive, times. Such events may include where resource selection was not able to find a threshold amount (X %) of resources available without a change in the resource availability thresholds; where resource selection was not able to reserve a sufficient amount of resources to meet the QoS of a bearer on a single carrier/BWP; where resources selected for transmission of PSCCH and/or PSSCH have a RSRP/RSSI above a threshold; where a percentage of "low-latency" type resources (e.g. symbol based resources) deemed available by sensing is below a threshold; where a WTRU receives a NACK for a unicast and/or multicast transmission; where a WTRU fails LBT procedure; and/or where a WTRU receives a preemption signal for a radio bearer, possibly for a time larger than a threshold (T).

In some examples, a WTRU may be configured with a different set of link failure criteria to apply depending on the specific radio bearer. For example, a WTRU may be configured with one or more of the above criteria based on the VQI or QoS related parameters associated with the bearer. In some examples, the WTRU may also be configured with different parameters (e.g., number of successive failures leading to link failure declaration, X %, value of T, other parameters discussed herein, etc.).

Some examples may include additional triggers for link failure based on CBR. For example, a WTRU may declare link failure based on the measured value of CBR. Specifically, a WTRU may monitor CBR on the pool(s)/carrier(s)/BWP(s) used for the unicast and/or multicast link. A WTRU may be configured with a CBR target per radio bearer, or a CBR target per VQI/QoS. A WTRU may declare link failure of the measured CBR on the pool(s)/carrier(s)/BWP(s) that fall above the configured threshold. The WTRU may further declare link failure when such a target is exceeded for a configurable time period.

In some examples, a WTRU that detects a link failure may perform one or more actions, depending on the type of link failure. Such actions may include a trigger group QoS negotiation/resource selection with new resources (e.g., if the link failure procedure is based on failure of a specific radio bearer or QoS target, the WTRU may choose to initiate QoS renegotiation procedure, similar to that performed during initial link establishment); informing upper layers and/or other WTRUs of the removal of one of more of the WTRUs from a multicast group (e.g., if the link failure is associated with only one or a subset of WTRUs in the multicast group); initiate a temporary fallback to broadcast procedure as discussed herein); changing resource selection mode from one type of mode to another (e.g., the WTRU may initiate a request to change resource selection mode to mode 1 for a specific bearer); informing upper layers and/or the network of the failure to meet QoS requirements; initiating link release signaling; and/or releasing all resources associated with the link, including TX/RX of reference signals, indefinitely reserved resources, and stopping transmission of UMUS.

In some examples, a WTRU may include information with any link failure declaration signaling, either to upper layers, to other WTRUs in the link, or to the network. Such information may include the RLM/RLF process/procedure ID which declared failure; the WTRU or WTRUs in the multicast link which failed; the specific bearer or bearers which triggered failure; and/or the reason for failure (e.g. CBR above a threshold, etc) and any associated values.

In some examples, a WTRU may initiate a temporary fallback to a broadcast-based transmission. In some examples, a WTRU may continue to transmit data received for a specific SL bearer, but may transmit such data in broadcast fashion, and with lower layer AS parameters set to broadcast. For example, a WTRU may change from using a unicast address to a broadcast address; may change from radio-bearer-based resource selection/reservation to non-radio-bearer-based resource selection/reservation; may change from using HARQ based transmissions to HARQ-less/blind retransmissions; may change from a beam-based transmission to omni-direction or beam-swept transmission; may disable the transmission/monitoring of reference signals for RLM and/or beam management; disable ciphering and/or integrity protection on transmitted data; and/or may change the AS layer configuration of any other parameters from a unicast-based configuration to a broadcast-based configuration. During temporary fallback to broadcast, the WTRU may maintain the unicast and/or multicast configuration for the temporary fallback.

In some examples, a WTRU may initiate any part or parts of a link establishment procedure during the fallback. Alternatively, the WTRU may initiate a link establishment procedure or link re-establishment procedure whereby at least some parts of the current configuration (e.g., QoS, AS, etc.) is maintained. In some examples, a WTRU may inform upper layers of the fallback immediately. Alternatively, a WTRU may inform upper layers a time (T) after the fallback occurs and if link establishment and/or reestablishment is not successful.

In some examples, a WTRU may perform a temporary fallback procedure if it detects a link failure, potentially associated with certain causes; if it receive a preemption signal, potentially associated with a value of preemption time which is below a threshold (e.g., associated to the QoS of the bearer); and/or if it moves out of coverage, potentially if the unicast and/or multicast link is being managed by the network (e.g., mode 1).

Some examples include methods, systems, and devices for flow to bearer mapping for SL unicast and/or multicast. For example, in SL bearer modeling, a SL bearer or SL logical channel may be created if one or multiple flows is initiated. In some examples, a SL bearer or SL logical channel is associated with an AS layer configuration. The AS layer configuration may include a set of reserved resources, or be associated with an amount of resources required; may include a resource selection and/or reservation method (e.g., LBT, sensing, periodic resources, use of WTRU assistance, etc.); may include resource selection pools, carriers, BW, and/or BWP; may include resource selection parameters e.g., a resource selection window (T2), LBT backoff timers, sensing thresholds, periodicity of resources, an amount of resources per period, number of repetitions, number of beams, etc.; may include a number of carriers; may include an indication of an ability to use preemption, and a preemption resource configuration; may include a directionality of transmission and/or beam configuration; may include a pool, BWP, or the like; may include PHY and/or MAC layer parameters (e.g., HARQ configuration, duplication); may include a RLM/RLF configuration (e.g., RLF timer, RLM target BLER/RSRP); and/or may include a QoS configuration, such as rules for mapping of flows to bearers, QoS profile information, and mapping of bearer types to AS configuration.

In some examples, a WTRU may be configured to initiate or create a bearer with a certain configuration or configuration range if a flow having certain QoS requirements is initiated. In some examples, such requirements may be determined based on the VQI for the flow (e.g., flows of certain VQI or VQI range may require a bearer with a specific configuration). In some examples, a WTRU may be configured with the bearer type or bearer configuration to VQI mapping.

In some examples, a WTRU may be configured with a mapping of flow to radio bearer based one or more rules or principles. For example, the WTRU may be configured such that flows that have less stringent QoS characteristics than established radio bearer may be mapped to that bearer (e.g., rate related flows require new bearer); the WTRU may be configured such that flows with very different QoS characteristics require establishing a new radio bearer (e.g., a WTRU may be configured or preconfigured with a VQI to radio bearer type mapping, or a WTRU may be configured or preconfigured with a maximum discrepancy in flow characteristic, such as the discrepancy in data rate); and/or the WTRU may be configured for directionality (e.g., flows with the same intended direction or geographic location may be mapped to the same radio bearer or flows that are a subset of the radio bearer directionality).

In some examples, a WTRU may perform a bearer reconfiguration or a new bearer creation depending on whether a new flow may be mapped to an existing bearer type.

Figure 9:
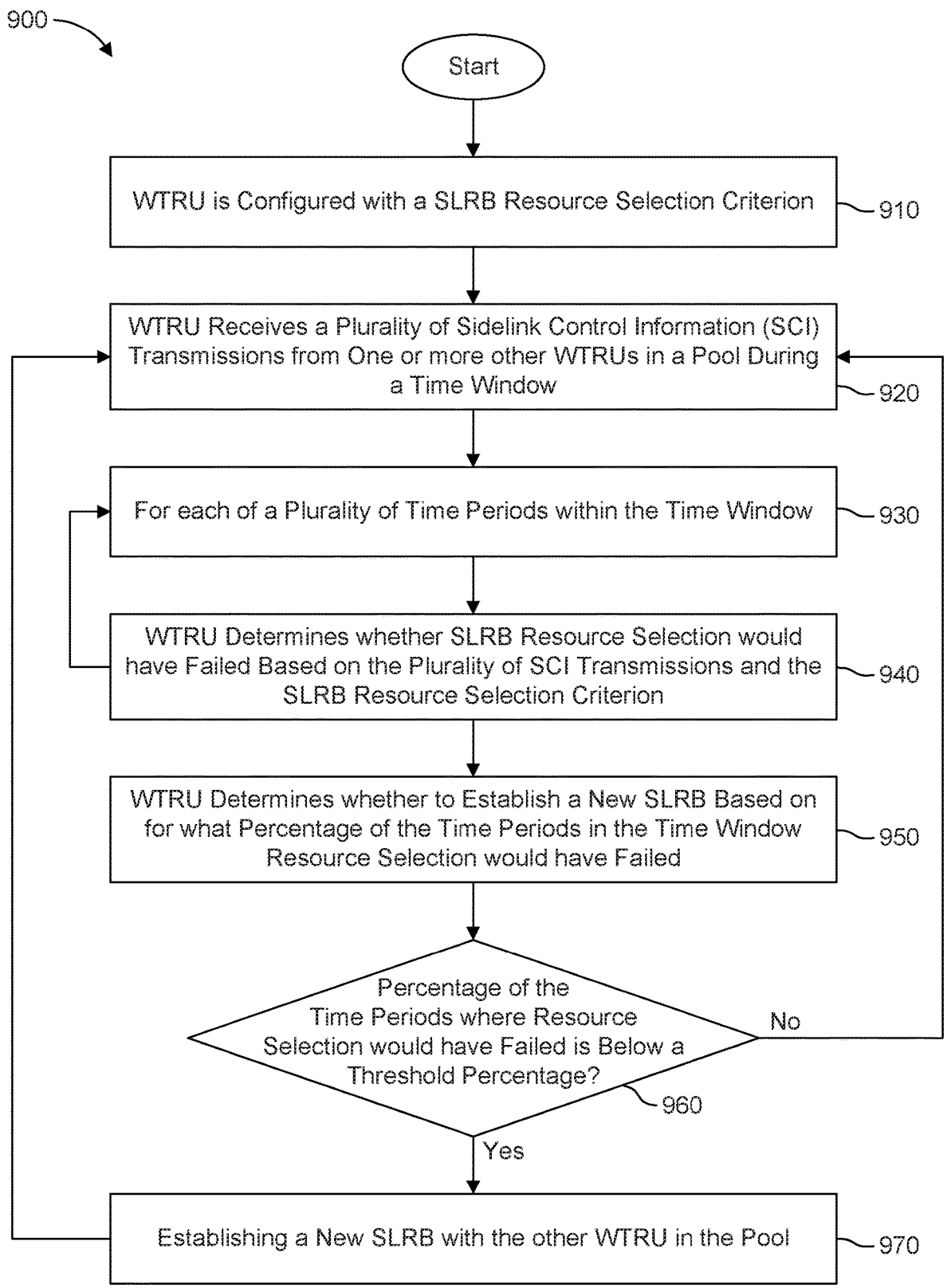
FIG. 9 is a flow chart which illustrates an example method for determining whether to establish a sidelink radio bearer (SLRB)

FIG. 9 is a flow chart which illustrates an example method 900 for determining whether to establish a SLRB.

In step 910, a WTRU is configured with a SLRB resource selection criterion. The resource selection criterion may include a service quality indicator (VQI).

In step 920, the WTRU receives a plurality of SCI transmissions from at least one other WTRU in a pool during a time window.

In step 930, for each of a number of time periods within a time window, the WTRU determines, in step 940, whether a SLRB resource selection procedure would have failed based on the plurality of SCI transmissions and the SLRB resource selection criterion. In some examples, the WTRU determines whether SLRB resource selection would have failed based only on time periods, of the plurality of time periods, where a packet delay budget (PDB) is below a threshold. In some examples, the WTRU determines whether SLRB resource selection would have failed based only on time periods, of the plurality of time periods, where a number of retransmissions is above a threshold.

In step 950, the WTRU determines a percentage of the SLRB resource selection procedures that would have failed. In some examples, determining the percentage of SLRB resource selection procedures that would have failed includes determining what percentage of the time periods within the time window include a SLRB resource selection procedure that would have failed, or includes determining what percentage of the SLRB resource selection procedures in the time window would have failed.

On condition 960 that the percentage of time periods within the time window that SLRB resource selection would have failed is below a threshold percentage, the WTRU establishes a new SLRB with another WTRU in the pool. On either condition 960, the WTRU returns to step 920 to begin the procedure again for the next time window, or ends if appropriate.

Figure 10:
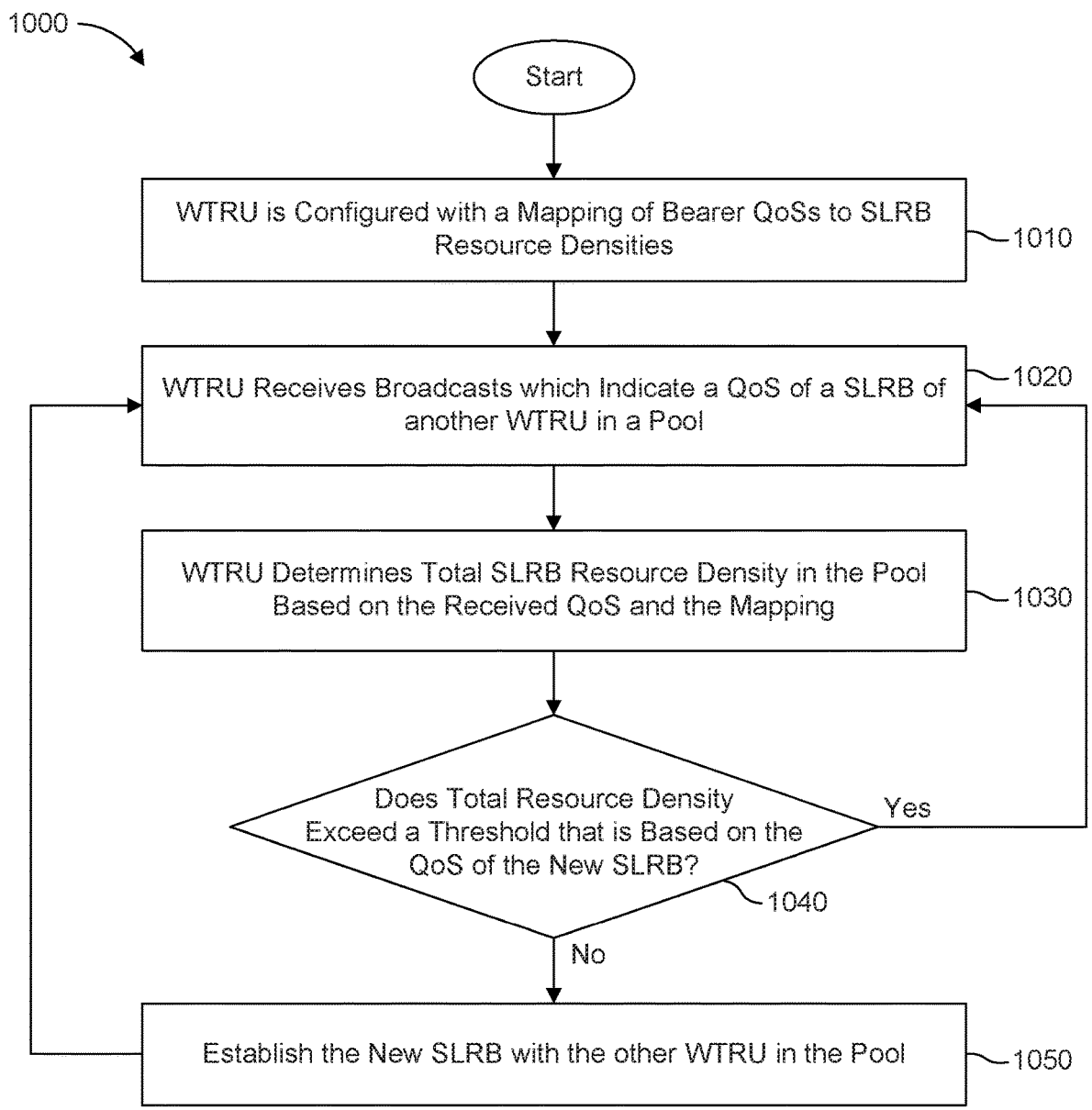
FIG. 10 is a flow chart which illustrates another example method for determining whether to establish a SLRB.

FIG. 10 is a flow chart which illustrates another example method 1000 for determining whether to establish a SLRB.

In step 1010, a WTRU is configured with a mapping of bearer QoSs to SLRB resource densities.

In step 1020, the WTRU receives broadcasts (e.g., periodic broadcasts) which indicate a QoS of a SLRB of another WTRU in a pool with the WTRU. In some examples, the broadcasts are from a plurality of other WTRUs in the pool, each indicating a QoS of a SLRB of the WTRU from which it is received.

In step 1030, the WTRU determines the total SLRB resource density in the pool based on the received QoS from the broadcasts, and the mapping. In some examples, the WTRU determines the total SLRB resource density based on the broadcasts from the plurality of other WTRUs in the pool.

On condition 1040 that the total resource density does not exceed a threshold, which may be based on the QoS of the new SLRB, the WTRU establishes a new SLRB with another WTRU in the pool in step 1050. On either condition 1040, the WTRU returns to step 1020 to begin the procedure again, or ends if appropriate.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method implemented in a wireless transmit/receive unit (WTRU) for establishing a sidelink radio bearer (SLRB) for a quality of service (QOS) flow, the method comprising:
    receiving a plurality of SLRB configurations;
    mapping the QoS flow to an SLRB configuration, based on one or more values associated with the QoS flow and the plurality of SLRB configurations; and
    transmitting a sidelink reconfiguration message to a peer WTRU of the WTRU, the sidelink reconfiguration message including a subset of the mapped SLRB configuration associated with the SLRB as received by the WTRU, the subset of the mapped SLRB configuration being based on a capability of the SLRB;
    receiving a confirmation message from the peer WTRU of the WTRU responsive to the sidelink reconfiguration message;
    establishing the SLRB responsive to the confirmation message; and
    transmitting data associated with the QoS flow to the peer WTRU of the WTRU on the established SLRB;
    wherein at least one value of the one or more values associated with the QOS flow comprises a quality indicator; and
    wherein the quality indicator comprises a PC5 quality indicator (PQI).

2. The method of claim 1, wherein the at least one value associated with the QoS flow comprises a vehicle-to-everything (V2X) service quality indicator (VQI).

3. The method of claim 1, wherein the sidelink reconfiguration message comprises a RRCReconfiguration message.

4. The method of claim 1, wherein the SLRB configuration associated with the SLRB comprises a logical channel (LCH) configuration, feedback configuration, channel quality indicator (CQI) configuration, and/or flow-to-SLRB mapping.

5. The method of claim 1, wherein the subset of the SLRB configuration comprises a logical channel (LCH) configuration, feedback configuration, channel quality indicator (CQI) configuration, and/or flow-to-SLRB mapping.

6. The method of claim 1, further comprising triggering establishment of the SLRB responsive to the QoS flow being mapped to the SLRB.

7. The method of claim 1, further comprising releasing the SLRB responsive to a condition where no QoS flows are mapped to the SLRB.

8. A wireless transmit/receive unit (WTRU) configured to establish a sidelink radio bearer (SLRB) for a quality of service (QOS) flow, comprising:

a processor operatively coupled to a transmitter and a receiver;

the receiver configured to receive a plurality of SLRB configurations;

the processor configured to map the QoS flow to an SLRB configuration based on one or more values associated with the QoS flow and the plurality of SLRB configurations; and the transmitter configured to transmit a sidelink reconfiguration message to a peer WTRU of the WTRU, the sidelink reconfiguration message including a subset of the mapped SLRB configuration associated with the SLRB as received by the WTRU, the subset of the mapped SLRB configuration being based on a capability of the SLRB;

the receiver configured to receive a confirmation message from the peer WTRU of the WTRU responsive to the sidelink reconfiguration message;

the processor and the transmitter configured to establish the SLRB responsive to the confirmation message; and the transmitter configured to transmit data associated with the QoS flow to the peer WTRU of the WTRU on the established SLRB;

wherein at least one value of the one or more values associated with the QoS flow comprises a quality indicator; and wherein the quality indicator comprises a PC5 quality indicator (PQI).

9. The WTRU of claim 8, wherein the at least one value associated with the QoS flow comprises a vehicle-to-everything (V2X) service quality indicator (VQI).

10. The WTRU of claim 8, wherein the sidelink reconfiguration message comprises a RRCReconfiguration message.

11. The WTRU of claim 8, wherein the SLRB configuration associated with the SLRB comprises a logical channel (LCH) configuration, feedback configuration, channel quality indicator (CQI) configuration, and/or flow-to-SLRB mapping.

12. The WTRU of claim 8, wherein the subset of the SLRB configuration comprises a logical channel (LCH) configuration, feedback configuration, channel quality indicator (CQI) configuration, and/or flow-to-SLRB mapping.

13. The WTRU of claim 8, wherein the processor is further configured to trigger establishment of the SLRB responsive to the QoS flow being mapped to the SLRB.

14. The WTRU of claim 8, wherein the processor is further configured to release the SLRB responsive to a condition where no QoS flows are mapped to the SLRB.

15. A method implemented in a wireless transmit/receive unit (WTRU) for establishing a sidelink radio bearer (SLRB) for a quality of service (QOS) flow, the method comprising:

receiving a plurality of SLRB configurations;

mapping the QoS flow to an SLRB configuration based on one or more values associated with the QoS flow and the plurality of SLRB configurations; and transmitting a sidelink RRCReconfiguration message to a peer WTRU of the WTRU, the sidelink RRCReconfiguration message including a subset of the mapped SLRB configuration associated with the SLRB as received by the WTRU, the subset of the mapped SLRB configuration being based on a capability of the SLRB, the sidelink RRCReconfiguration message further including information indicating a gNB on which the WTRU is camped, an area identity currently being used by the WTRU, location information regarding the WTRU, motion-relating information including speed and heading, and group-based scheduling information;

receiving a sidelink RRCReconfiguration confirmation message from the peer WTRU of the WTRU responsive to the sidelink RRCReconfiguration message;

establishing the SLRB responsive to the sidelink RRCReconfiguration confirmation message;

transmitting data associated with the QoS flow to the peer WTRU on the established SLRB;

triggering establishment of the SLRB responsive to the QoS flow being mapped to the SLRB; and releasing the SLRB responsive to a condition where no QoS flows are mapped to the SLRB;

wherein at least one value of the one or more values associated with the QOS flow comprises a quality indicator;

wherein the quality indicator comprises a PC5 quality indicator (PQI);

wherein the SLRB configuration comprises a logical channel (LCH) configuration; and wherein the subset comprises a flow-to-SLRB mapping.

* * * * *